United States Patent
Saito et al.

(10) Patent No.: US 9,907,064 B2
(45) Date of Patent: *Feb. 27, 2018

(54) COMMUNICATION APPARATUS AND COMMUNICATION METHOD FOR RECEIVING CONTROL INFORMATION OVER A SEARCH SPACE

(71) Applicant: Panasonic Intellectual Property Corporation of America, Torrance, CA (US)

(72) Inventors: Yoshiko Saito, Kanagawa (JP); Ayako Horiuchi, Kanagawa (JP); Seigo Nakao, Singapore (SG); Akihiko Nishio, Osaka (JP); Daichi Imamura, Beijing (CN); Alexander Golitschek Edler Von Elbwart, Darmstadt (DE); Sujuan Feng, Frankfurt am Main (DE)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,964

(22) Filed: Dec. 1, 2015

(65) Prior Publication Data

US 2016/0088597 A1    Mar. 24, 2016

Related U.S. Application Data

(63) Continuation of application No. 14/698,014, filed on Apr. 28, 2015, now Pat. No. 9,237,571, which is a (Continued)

(30) Foreign Application Priority Data

Jul. 21, 2010   (JP) .................. 2010-164307
Mar. 2, 2011    (JP) .................. 2011-045088

(51) Int. Cl.
  H04W 72/04    (2009.01)
  H04L 5/00     (2006.01)
  H04J 11/00    (2006.01)

(52) U.S. Cl.
  CPC ....... *H04W 72/042* (2013.01); *H04J 11/0079* (2013.01); *H04L 5/001* (2013.01);
  (Continued)

(58) Field of Classification Search
  CPC . H04W 72/042; H04J 11/0079; H04L 5/0053; H04L 5/0051; H04L 5/001; H04L 5/0094
  See application file for complete search history.

(56) References Cited

U.S. PATENT DOCUMENTS 7,944,850 B2    5/2011   Harada et al.
8,189,502 B2    5/2012   Kwak et al.
(Continued)

FOREIGN PATENT DOCUMENTS

CN    101677306 A    3/2010
JP    2010-114780 A   5/2010
(Continued)

OTHER PUBLICATIONS

Search Report for Chinese Patent Application No. 201180034284.0 dated Nov. 17, 2014.
(Continued)

*Primary Examiner* — Tejis Daya
(74) *Attorney, Agent, or Firm* — Pearne & Gordon LLP

(57) ABSTRACT

A communication apparatus has a receiver and a decoder. The receiver receives a control signal including first downlink control information and second downlink control information, and receives decoding area information that indicates whether the extended Physical Downlink Control Channel (PDCCH) should be decoded for each of a plurality of terminal apparatuses. The decoder decodes each of a
(Continued)

plurality of first mapping candidates in the PDCCH area or decodes each of the plurality of first mapping candidates in the PDCCH area and each of the plurality of second mapping candidates in the extended PDCCH. A number of the second mapping candidates included in the user-specific search space equals to or is more than a number of the first mapping candidates included in the common search space.

16 Claims, 25 Drawing Sheets

Related U.S. Application Data continuation of application No. 13/811,031, filed as application No. PCT/JP2011/003899 on Jul. 7, 2011, now Pat. No. 9,049,709.

(52) U.S. Cl.
CPC .......... *H04L 5/0051* (2013.01); *H04L 5/0053* (2013.01); *H04L 5/0094* (2013.01)

(56) References Cited

U.S. PATENT DOCUMENTS

| | | | |
|---|---|---|---|
| 2009/0088148 A1* | 4/2009 | Chung | H04L 5/0007 455/423 |
| 2009/0257449 A1 | 10/2009 | Chen et al. | |
| 2010/0246527 A1* | 9/2010 | Montojo | H04L 5/005 370/330 |
| 2010/0279628 A1* | 11/2010 | Love | H04L 5/0091 455/70 |
| 2011/0038275 A1* | 2/2011 | Kim | H04W 48/16 370/252 |
| 2011/0076962 A1* | 3/2011 | Chen | H04L 5/001 455/68 |
| 2011/0110316 A1* | 5/2011 | Chen | H04L 5/0053 370/329 |
| 2011/0170496 A1* | 7/2011 | Fong | H04L 5/0053 370/329 |
| 2011/0194523 A1* | 8/2011 | Chung | H04L 5/0053 370/329 |
| 2011/0222491 A1 | 9/2011 | Vajapeyam et al. | |
| 2011/0261679 A1 | 10/2011 | Lie et al. | |
| 2011/0274031 A1* | 11/2011 | Gaal | H04L 5/0051 370/315 |
| 2011/0310817 A1 | 12/2011 | Okubo et al. | |
| 2012/0106501 A1* | 5/2012 | Kishiyama | H04L 1/0026 370/330 |
| 2012/0128039 A1* | 5/2012 | Kim | H04L 5/0048 375/211 |
| 2013/0058240 A1* | 3/2013 | Kim | H04L 5/0007 370/252 |
| 2013/0114528 A1 | 5/2013 | Chen et al. | |
| 2013/0265934 A1* | 10/2013 | Zeng | H04L 5/0023 370/315 |

FOREIGN PATENT DOCUMENTS

| | | | | |
|---|---|---|---|---|
| WO | WO 2009116816 A2 * | 9/2009 | | H04W 48/16 |
| WO | 2011-074265 A1 | 6/2011 | | |
| WO | 2011-114743 A1 | 9/2011 | | |

OTHER PUBLICATIONS

LG-Nortel, Resource wastage in R-PDCCH for TDM+FDM configurations, Feb. 22-26, 2010, R1-101027.
Fujitsu, Search Space design for Downlink Control Channel, Feb. 6-10, 2012, R1-120752.
ZTE, Further CA enhancement on PDCCH, Aug. 22-26, 2011, R1-112245.
LG-Nortel, Consideration regarding the number of REGs in R-PDCCH, May 10-14, 2010, R1-103144.
3GPP TS 36.211 V9.1.0, "Physical Channels and Modulation (Release 9)," Mar. 2010.
3GPP TS 36.212 V9.2.0, "Multiplexing and channel coding (Release 9)," Jun. 2010.
3GPP TS 36.213 V9.2.0, "Physical layer procedures (Release 9)," Jun. 2010.
3GPP TS 36.213 V10.0.1, "Physical layer procedures (Release 10)," Dec. 2010.
3GPP TSG RAN WG1 meeting, R1-092641, "PDCCH design for Carrier aggregation and Post Rel-8 feature," Jun. 2009.
3GPP TSG RAN WG1 meeting, R1-102700, "Blackhaul Control Channel Design in Downlink," May 2010.
3GPP TSG RAN WG1 meeting, R1-102881, "R-PDCCH placement," May 2010.
3GPP TSG RAN WG1 meeting, R1-103040, "R-PDCCH search space design" May 2010.
3GPP TSG RAN WG1 meeting, R1-103062, "Supporting frequency diversity and frequency selective R-PDCCH transmissions" May 2010.
RSG-RAN WG1 #61, R1-102915, ZTE, "the mapping schemes of R-PDCCH Design," May 2010.
3GPP TSG-RAN WG1 #61 bis, R1-104118, CMCC, Un R-PDCCH Design,: Jun. 2010-Jul. 2010.
3GPP TSG-RAN WG1 Meeting #61, R1-102969, Nokia Siemens Networks, Nokia, "On DL Blackhaul Control Channel Design Aspects," May 2010.
International Search Report for Application No. PCT/JP2011/003899 dated Aug. 2, 2011.

\* cited by examiner

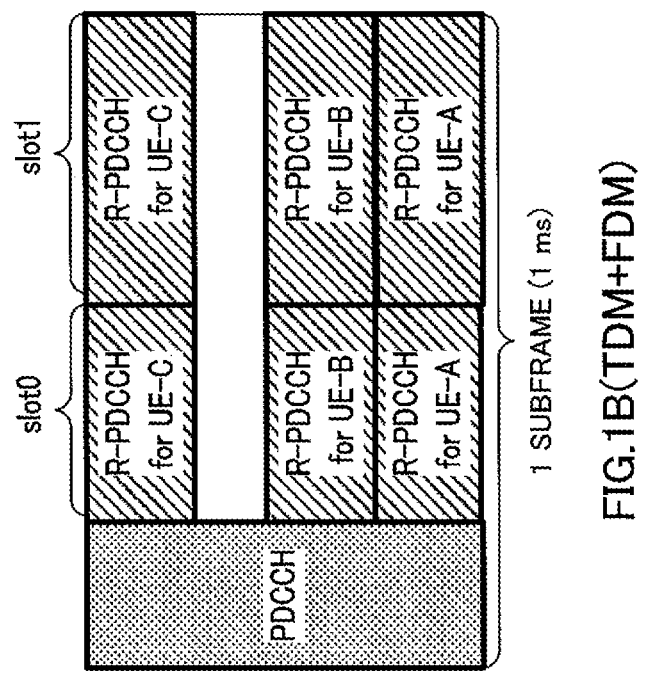
FIG.1B(TDM+FDM)
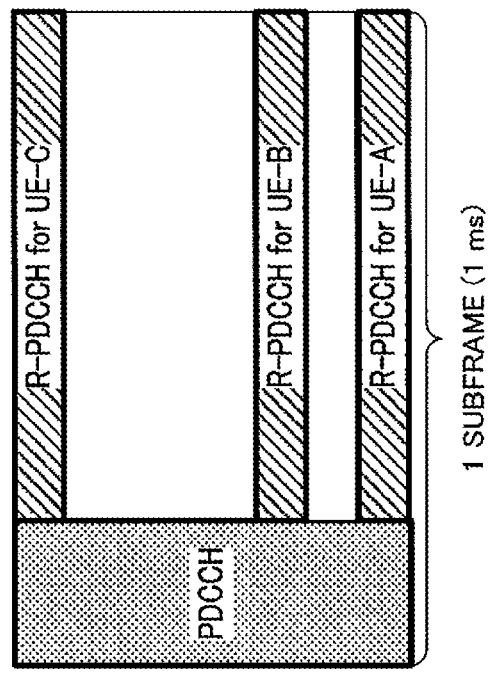
FIG.1A(FDM)

| | PRECODING (FOR RS AND FOR DATA) | FOR TERMINAL (UE) | DISPOSITION IN FREQUENCY-DOMAIN | EFFECT |
|---|---|---|---|---|
| CRS | ABSENT | COMMON | DISTRIBUTED DISPOSITION | FREQUENCY DIVERSITY EFFECT |
| DM-RS | PRESENT | SPECIFIC | LOCALIZED DISPOSITION | RECEIVED SIGNAL POWER IMPROVED |

FIG.3

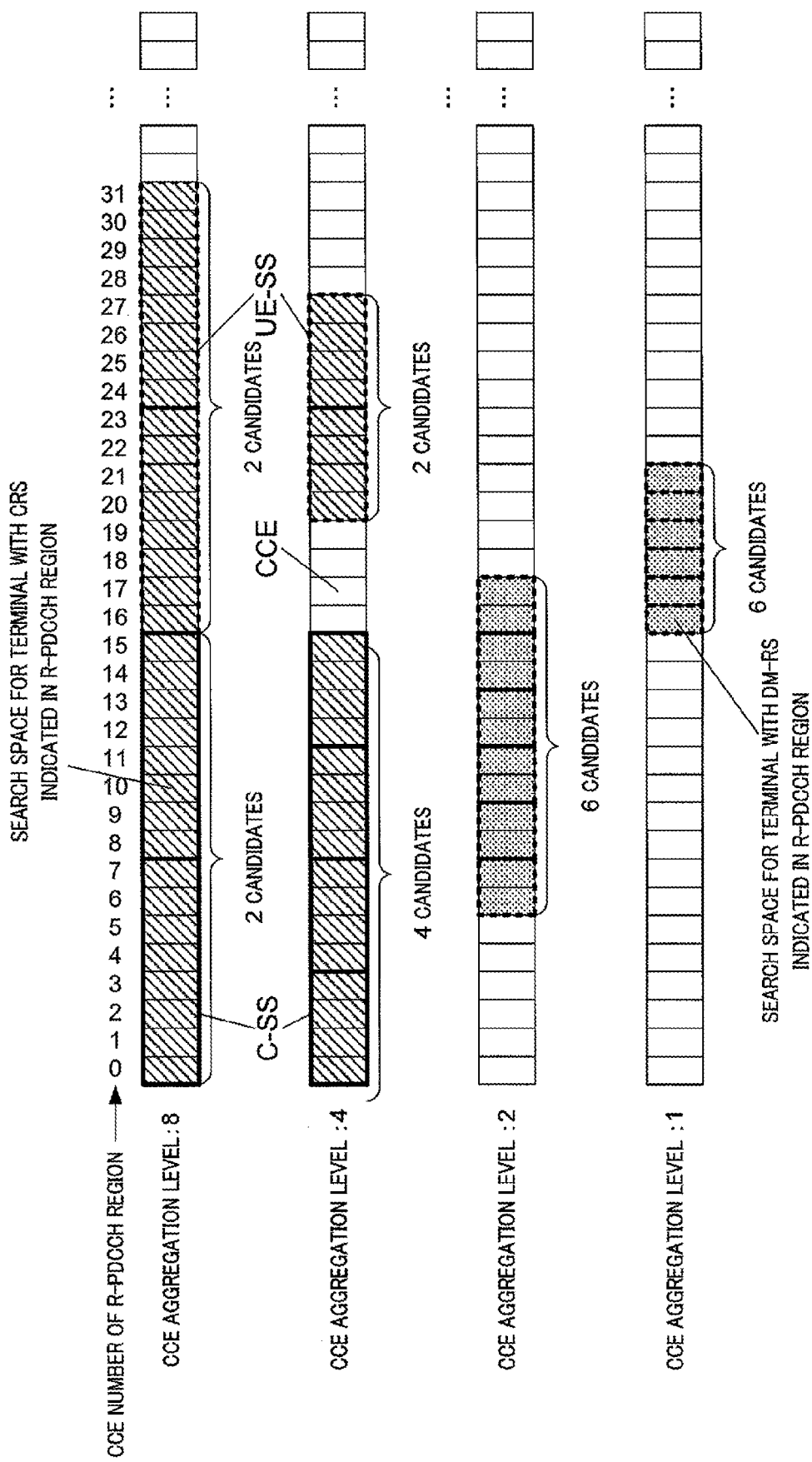

| | PDCCH REGION | R-PDCCH REGION |
|---|---|---|
| PDCCH(CRS)+R-PDCCH(CRS) | $N_A$ | $N_B$ |
| PDCCH(CRS)+R-PDCCH(DM-RS) | $N_C$ | $N_D$ |

FIG.10

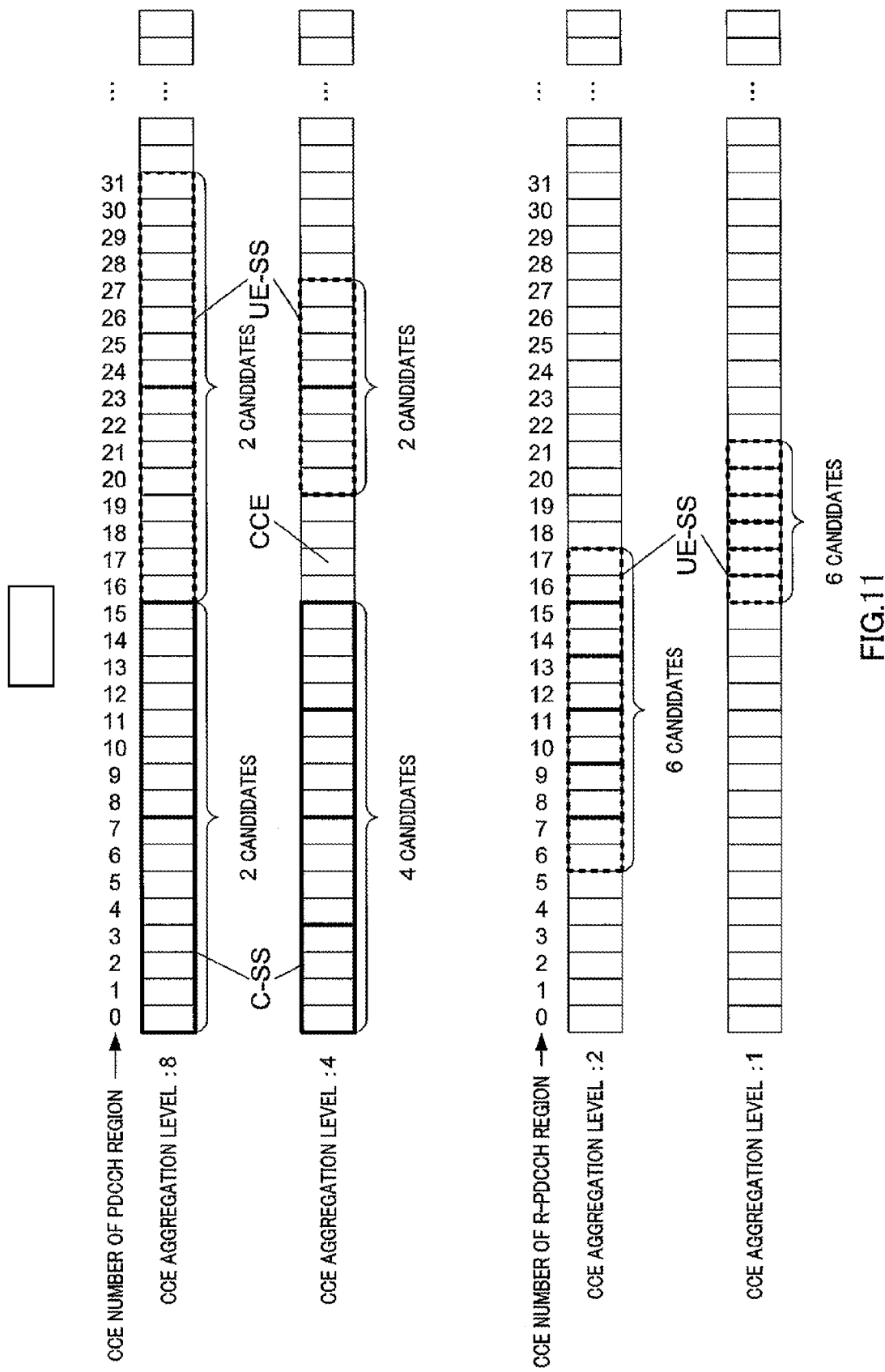

| Pattern Number | SS, CCE Aggregation Level / Allocation Region | C-SS 1C | C-SS 0/1A | UE-SS 0/1A | UE-SS 0A,0B | UE-SS 1,2,2A |
|---|---|---|---|---|---|---|
| 0 | PDCCH REGION | O | O | O | O | O |
|   | R-PDCCH REGION | - | - | - | - | - |
| 1 | PDCCH REGION | O | O | - | O | O |
|   | R-PDCCH REGION | - | - | O | - | - |
| 2 | PDCCH REGION | O | O | O | - | O |
|   | R-PDCCH REGION | - | - | - | O | - |
| 3 | PDCCH REGION | O | O | O | O | - |
|   | R-PDCCH REGION | - | - | - | - | O |
| 4 | PDCCH REGION | O | O | - | - | O |
|   | R-PDCCH REGION | - | - | O | O | - |
| 5 | PDCCH REGION | O | O | - | O | - |
|   | R-PDCCH REGION | - | - | O | - | O |
| 6 | PDCCH REGION | O | O | O | - | - |
|   | R-PDCCH REGION | - | - | - | O | O |
| 7 | PDCCH REGION | O | O | - | - | - |
|   | R-PDCCH REGION | - | - | O | O | O |
| 8 | PDCCH REGION | O | - | O | O | O |
|   | R-PDCCH REGION | - | O | - | - | - |
| 9 | PDCCH REGION | O | - | - | O | O |
|   | R-PDCCH REGION | - | O | O | - | - |
| 10 | PDCCH REGION | O | - | O | - | O |
|    | R-PDCCH REGION | - | O | - | O | - |
| 11 | PDCCH REGION | O | - | O | O | - |
|    | R-PDCCH REGION | - | O | - | - | O |
| 12 | PDCCH REGION | O | - | - | - | O |
|    | R-PDCCH REGION | - | O | O | O | - |
| 13 | PDCCH REGION | O | - | - | O | - |
|    | R-PDCCH REGION | - | O | O | - | O |
| 14 | PDCCH REGION | O | - | O | - | - |
|    | R-PDCCH REGION | - | O | - | O | O |
| 15 | PDCCH REGION | O | - | - | - | - |
|    | R-PDCCH REGION | - | O | O | O | O |
| 16 | PDCCH REGION | - | O | O | O | O |
|    | R-PDCCH REGION | O | - | - | - | - |
| 17 | PDCCH REGION | - | O | - | O | O |
|    | R-PDCCH REGION | O | - | O | - | - |
| 18 | PDCCH REGION | - | O | O | - | O |
|    | R-PDCCH REGION | O | - | - | O | - |
| 19 | PDCCH REGION | - | O | O | O | - |
|    | R-PDCCH REGION | O | - | - | - | O |
| 20 | PDCCH REGION | - | O | - | - | O |
|    | R-PDCCH REGION | O | - | O | O | - |
| 21 | PDCCH REGION | - | O | - | O | - |
|    | R-PDCCH REGION | O | - | O | - | O |
| 22 | PDCCH REGION | - | O | O | - | - |
|    | R-PDCCH REGION | O | - | - | O | O |
| 23 | PDCCH REGION | - | O | - | - | - |
|    | R-PDCCH REGION | O | - | O | O | O |
| 24 | PDCCH REGION | - | - | O | O | O |
|    | R-PDCCH REGION | O | O | - | - | - |
| 25 | PDCCH REGION | - | - | - | O | O |
|    | R-PDCCH REGION | O | O | O | - | - |
| 26 | PDCCH REGION | - | - | O | - | O |
|    | R-PDCCH REGION | O | O | - | O | - |
| 27 | PDCCH REGION | - | - | O | O | - |
|    | R-PDCCH REGION | O | O | - | - | O |
| 28 | PDCCH REGION | - | - | - | - | O |
|    | R-PDCCH REGION | O | O | O | O | - |
| 29 | PDCCH REGION | - | - | - | O | - |
|    | R-PDCCH REGION | O | O | O | - | O |
| 30 | PDCCH REGION | - | - | O | - | - |
|    | R-PDCCH REGION | O | O | - | O | O |
| 31 | PDCCH REGION | - | - | - | - | - |
|    | R-PDCCH REGION | O | O | O | O | O |

FIG.13

| REFERENCE SIGNAL | PDCCH REGION<br>CRS | R-PDCCH REGION<br>DMRS |
|---|---|---|
| DISPOSITION IN FREQUENCY-DOMAIN | DISTRIBUTED DISPOSITION | LOCALIZED DISPOSITION |
| EFFECT | (COMMON TO TERMINALS)<br>FREQUENCY DIVERSITY | (TERMINAL-SPECIFIC)<br>FREQUENCY SELECTIVITY<br>PRECODING GAIN |

FIG.15

| format 1A | YES | NO | NO |
|---|---|---|---|
| DATA ALLOCATION | YES/NO | YES | NO |
| format 0 | PDCCH | PDCCH | R-PDCCH 2nd Slot |

FIG.20

|  | PDCCH REGION | R-PDCCH REGION | |
|---|---|---|---|
|  |  | 1st slot | 2nd slot |
| CASE 1 | ○<br>format 0/1A | DATA | DATA |
| CASE 2 | ○<br>format 0 | TM-specific DL grant | DATA |
| CASE 3 | OTHER UE AVAILBLE | TM-specific DL grant | ○<br>format 0 |

SELECTABLE BY BASE STATION ACCORDING TO DL GRANT FORMAT, PRESENCE/ABSENCE OF DATA ALLOCATION

FIG.21

| PATTERN NUMBER | ALLOCATION REGION | SS, CCE AGGREGATION LEVEL | C-SS | | UE-SS | | | |
|---|---|---|---|---|---|---|---|---|
| | | | 4 | 8 | 1 | 2 | 4 | 8 |
| 0 | PDCCH REGION | | 4 | 2 | 6 | 6 | 2 | 2 |
| | R-PDCCH REGION | | – | – | – | – | – | – |
| 1 | PDCCH REGION | | 4 | 2 | – | 6 | 2 | 2 |
| | R-PDCCH REGION | | – | – | 6 | – | – | – |
| 2 | PDCCH REGION | | 4 | 2 | – | – | 2 | 2 |
| | R-PDCCH REGION | | – | – | 6 | 6 | – | – |
| 3 | PDCCH REGION | | 4 | 2 | – | – | – | 2 |
| | R-PDCCH REGION | | – | – | 6 | 6 | 2 | – |
| 4 | PDCCH REGION | | 4 | 2 | – | – | – | – |
| | R-PDCCH REGION | | – | – | 6 | 6 | 2 | 2 |
| 5 | PDCCH REGION | | – | – | – | – | – | – |
| | R-PDCCH REGION | | 4 | 2 | 6 | 6 | 2 | 2 |
| 6 | PDCCH REGION | | – | – | – | – | – | 2 |
| | R-PDCCH REGION | | 4 | 2 | 6 | 6 | 2 | – |
| 7 | PDCCH REGION | | – | – | – | – | 2 | 2 |
| | R-PDCCH REGION | | 4 | 2 | 6 | 6 | – | – |
| 8 | PDCCH REGION | | – | – | – | 6 | 2 | 2 |
| | R-PDCCH REGION | | 4 | 2 | 6 | – | – | – |
| 9 | PDCCH REGION | | – | – | 6 | 6 | 2 | 2 |
| | R-PDCCH REGION | | 4 | 2 | – | – | – | – |
| 10 | PDCCH REGION | | – | 2 | 6 | 6 | 2 | 2 |
| | R-PDCCH REGION | | 4 | – | – | – | – | – |
| 11 | PDCCH REGION | | – | 2 | – | 6 | 2 | 2 |
| | R-PDCCH REGION | | 4 | – | 6 | – | – | – |
| 12 | PDCCH REGION | | – | 2 | – | – | 2 | 2 |
| | R-PDCCH REGION | | 4 | – | 6 | 6 | – | – |
| 13 | PDCCH REGION | | – | 2 | – | – | – | 2 |
| | R-PDCCH REGION | | 4 | – | 6 | 6 | 2 | – |
| 14 | PDCCH REGION | | – | 2 | – | – | – | – |
| | R-PDCCH REGION | | 4 | – | 6 | 6 | 2 | 2 |
| 15 | PDCCH REGION | | 4 | – | 6 | 6 | 2 | 2 |
| | R-PDCCH REGION | | – | 2 | – | – | – | – |
| 16 | PDCCH REGION | | 4 | – | – | 6 | 2 | 2 |
| | R-PDCCH REGION | | – | 2 | 6 | – | – | – |
| 17 | PDCCH REGION | | 4 | – | – | – | 2 | 2 |
| | R-PDCCH REGION | | – | 2 | 6 | 6 | – | – |
| 18 | PDCCH REGION | | 4 | – | – | – | – | 2 |
| | R-PDCCH REGION | | – | 2 | 6 | 6 | 2 | – |
| 19 | PDCCH REGION | | 4 | – | – | – | – | – |
| | R-PDCCH REGION | | – | 2 | 6 | 6 | 2 | 2 |

FIG.22

COMMUNICATION APPARATUS AND COMMUNICATION METHOD FOR RECEIVING CONTROL INFORMATION OVER A SEARCH SPACE

CROSS-REFERENCE TO RELATED APPLICATIONS

This application is a continuation of U.S. patent application Ser. No. 14/698,014 filed on Apr. 28, 2015, which is a continuation of U.S. patent application Ser. No. 13/811,031, filed on Jan. 18, 2013, which was the National Stage of International Application No. PCT/JP2011/003899, filed on Jul. 7, 2011, the contents of each of which are herein incorporated by reference in their entirety. U.S. patent application Ser. No. 14/698,014 issued as U.S. Pat. No. 9,237,571 on Jan. 12, 2016. U.S. patent application Ser. No. 13/811,031 issued as U.S. Pat. No. 9,049,709 on Jun. 2, 2015.

TECHNICAL FIELD

The present invention relates to a base station apparatus, a terminal apparatus, a transmission method and a reception method.

BACKGROUND ART

In 3rd Generation Partnership Project Radio Access Network Long Term Evolution (3GPP-LTE (hereinafter, referred to as LTE)), Orthogonal Frequency Division Multiple Access (OFDMA) is adopted as a downlink communication scheme, and Single Carrier Frequency Division Multiple Access (SC-FDMA) is adopted as an uplink communication scheme (e.g., see NPL-1, NPL-2, and NPL-3).

In LTE, a base station apparatus for radio communications (hereinafter, abbreviated as "base station") performs communications by allocating a resource block (RB) in a system band to a terminal apparatus for radio communications (hereinafter, abbreviated as "terminal") for every time unit called "subframe."

The base station also transmits allocation control information (i.e., L1/L2 control information) for the notification of the result of resource allocation of downlink data and uplink data to the terminal. As this allocation control information, Downlink Control Information (DCI) which is downlink allocation control information is transmitted. There are two types of DCI (which will be described later); common DCI targeting all terminals and specific DCI targeting a specific terminal (specific terminal or terminal in a specific group).

Furthermore, control information such as DCI is transmitted to a terminal using a downlink control channel such as a Physical Downlink Control Channel (PDCCH). Here, the base station controls the resource amount, that is, the number of OFDM symbols, used for transmission of a PDCCH in subframe units according to the number of terminals allocated or the like. To be more specific, the resource amount used for transmission of a PDCCH is set variably over the entire system band in the frequency-domain, and three OFDM symbols from a leading OFDM symbol to a third OFDM symbol of one subframe in the time-domain. The base station reports to the terminal, a Control Format Indicator (CFI) which is information indicating the number of OFDM symbols available for transmission of a PDCCH with the leading OFDM symbol of each subframe using a Physical Control Format Indicator Channel (PCFICH). The terminal receives DCI according to the CFI detected from the received PCFICH. Furthermore, the base station transmits a HARQ Indicator (HI) indicating delivery acknowledgment information (ACK/NACK) for uplink data to the terminal using a Physical Hybrid ARQ Indicator CHannel (PHICH) (e.g., see NPL-1). In LTE a frequency band having a system bandwidth of up to 20 MHz is supported.

Each PDCCH also occupies a resource composed of one or more consecutive control channel elements (CCEs). A CCE is a minimum unit of radio resource allocated to a PDCCH. (REs). Furthermore, a CCE is made up of a plurality of consecutive resource element groups (REGs) composed of resource elements (REs). For example, one REG is made up of four REs. To be more specific, a CCE is made up of a plurality of consecutive REGs (e.g., nine consecutive REGs) among REGs not allocated as radio resources for the aforementioned PCFICH and PHICH. Furthermore, the base station may also perform interleaving processing in REG units with resources for a PDCCH for each terminal in order to randomize interference.

In LTE, the number of CCEs occupied by a PDCCH (the number of concatenated CCEs: CCE aggregation level) is selected from 1, 2, 4, and 8 depending on the number of information bits of allocation control information or the condition of a propagation path of a terminal. At this time, allocatable CCEs are predetermined for each CCE aggregation level (e.g., see PTL 1). For example, when the CCE aggregation level is n (e.g., n=1, 2, 4, 8), the base station can allocate to a PDCCH for the terminal, only n consecutive CCEs starting from a CCE with a CCE index (CCE number) corresponding to a multiple of n. On the other hand, since the terminal cannot know which CCE is allocated to a PDCCH for the terminal and what the CCE aggregation level is, the terminal has to try decoding (blind decoding) on a PDCCH for all CCEs which may be allocated to the PDCCH for the terminal using a round-robin method. For this reason, as described above, it is possible to reduce the number of trials of PDCCH decoding at the terminal by providing constraints (tree-based structure) of CCEs allocatable to the PDCCH.

Furthermore, if a base station allocates a plurality of terminals to one subframe, the base station transmits a plurality of items of DCI via a plurality of PDCCHs at a time. In this case, in order to identify a terminal to which each PDCCH is transmitted, the base station transmits the PDCCH with CRC bits included therein, the bits being masked (or scrambled) with a terminal ID of the transmission destination terminal. Then, the terminal performs demasking (or descrambling) on the CRC bits of a plurality of PDCCHs for the terminal with its own ID, thereby trial-decoding (hereinafter, referred to as "blind-decoding") the DCI to detect the DCI for the terminal.

Also, for the purpose of reducing the number of DCI blind decoding operations on a terminal, a method for limiting CCEs targeted for blind decoding for each terminal is under study. This method limits a CCE region that may be targeted for blind decoding by each terminal (hereinafter, referred to as "search space (SS)"). There are two types of search space; common search space (hereinafter, referred to as "C-SS") and terminal (UE) specific search space (or UE specific by C-RNTI Search Space: hereinafter, referred to as "UE-SS"). The terminal performs blind decoding on DCI in a C-SS and DCI in a UE-SS corresponding to the terminal.

A C-SS is a search space common to all the terminals, indicating a range of CCEs in which all the terminals perform blind decoding on DCI. A C-SS is allocated with a PDCCH which is simultaneously reported to a plurality of terminals for transmitting control information for data allocation common to terminals (e.g., dynamic broadcast channel (D-BCH), paging channel (PCH) and RACH response or the like) (hereinafter, referred to as "allocation control information for a common channel"). A C-SS includes six candidates targeted for blind decoding in total, namely, 4 candidates (=16 CCEs (=4 CCEs×4 candidates)) and 2 candidates (=16 CCEs (8 CCEs×2 candidates)) with respect to the CCE aggregation level, 4 and 8, respectively.

On the other hand, a UE-SS is a search space specific to each terminal and is randomly configured for each terminal. For example, a UE-SS in each terminal is configured using a terminal ID of each terminal and a hash function which is a function for randomization. The number of CCEs that forms this UE-SS is defined based on the CCE aggregation level of a PDCCH. For example, the number of CCEs forming search spaces is 6, 12, 8, and 16 in association with CCE aggregation levels of PDCCHs 1, 2, 4, and 8 respectively. That is, the number of blind decoding region candidates is 6 (6 CCEs (=1 CCE×6 candidates)), 6 (12 CCEs (=2 CCEs×6 candidates)), 2 (8 CCEs (4 CCEs×2 candidates)), and 2 (16 CCEs (=8 CCEs×2 candidates)) in association with CCE aggregation levels of PDCCHs 1, 2, 4, and 8 respectively. That is, blind decoding region candidates are limited to 16 candidates in total. For example, a UE-SS is allocated with a PDCCH for transmitting uplink scheduling information and downlink scheduling information directed to the target terminal.

Thus, each terminal needs only to perform blind decoding on only a group of blind decoding region candidates in search spaces (C-SS and UE-SS) allocated to the terminal in each subframe, allowing the number of blind decoding operations to be reduced.

Here, a C-SS and a UE-SS may be configured so as to overlap each other, or UE-SSs may also be configured so as to overlap each other. However, when UE-SSs for a plurality of terminals overlap each other, a case may be assumed where the base station cannot allocate CCEs to a PDCCH directed to a specific terminal. Thus, the probability that the base station is not allowed to allocate CCEs to a PDCCH is referred to as "blocking probability."

For example, a case will be described where 32 CCEs of CCE0 to CCE31 (CCE numbers 0 to 31) are defined. In this case, the base station sequentially allocates CCEs to a PDCCH for each terminal.

Here, suppose, for example, CCE2 to CCE9, and CCE13 to CCE19 have already been allocated to a PDCCH. In this case, when a UE-SS corresponding to the next PDCCH (CCE aggregation level=1) is configured of CCE4 to CCE9, the base station cannot allocate CCEs to this PDCCH because CCE4 to CCE9 (all CCEs in the UE-SS) are already allocated to the other PDCCH.

Furthermore, suppose, in another example, CCE0, CCE1, CCE6 to CCE9 and CCE13 to CCE19 are already allocated to a PDCCH. In this case, when a UE-SS corresponding to the next PDCCH (CCE aggregation level=4) is configured of CCE0 to CCE7, the base station cannot allocate CCEs to this PDCCH (CCE aggregation level=4). This is because the CCE aggregation level is based on a tree-based structure, and so the base station can allocate only 4 CCEs of CCE0 to CCE3 or 4 CCEs of CCE4 to CCE7 to this PDCCH (CCE aggregation level=4). That is, CCE0 and CCE1 among 4 CCEs of CCE0 to CCE3 are already allocated to the other PDCCH, and CCE6 and CCE7 among 4 CCEs of CCE4 to CCE7 are already allocated to the other PDCCH.

Thus, when the base station fails to allocate CCEs to the PDCCH for the terminal, the base station changes the CCE aggregation level and allocates a plurality of consecutive CCEs to the PDCCH for the terminal based on the changed CCE aggregation level.

For example, as in the case of the aforementioned example, suppose CCE2 to CCE9, and CCE13 to CCE19 are already allocated. In this case, when a UE-SS corresponding to the next PDCCH (CCE aggregation level=1) is CCE4 to CCE9, CCEs cannot be allocated to this PDCCH as described above. In this case, the base station changes the CCE aggregation level from 1 to 2. This causes the UE-SS corresponding to the PDCCH (CCE aggregation level=2) to be changed from CCE4 to CCE9 (6 CCEs) to CCE8 to CCE19 (12 CCEs). As a result, the base station can allocate CCE10 and CCE11 to this PDCCH (CCE aggregation level=2). Even when the CCE aggregation level is changed in this way, if CCEs cannot yet be allocated to the PDCCH, the base station attempts transmission or the like in the next subframe.

Furthermore, downlink control information transmitted from the base station is called "DCI" as described above, and contains information on resource allocated to the terminal by the base station (resource allocation information), and modulation and channel coding scheme (MCS). The DCI has a plurality of formats. That is, examples thereof include an uplink format, downlink multiple input multiple output (MIMO) transmission format, and downlink non-consecutive band allocation format. The terminal needs to receive both downlink allocation control information (downlink-related allocation control information) and uplink allocation control information (uplink-related allocation control information).

For example, for the downlink control information (DCI), formats of a plurality of sizes are defined depending on a method for controlling a transmission antenna of a base station and a method for allocating a resource. Among the formats, a downlink allocation control information format for consecutive band allocation (hereinafter, simply referred to as "downlink allocation control information") and an uplink allocation control information format for consecutive band allocation (hereinafter, simply referred to as "uplink allocation control information") have the same size. These formats (i.e., DCI formats) include type information (for example, a one-bit flag) indicating the type of allocation control information (downlink allocation control information or uplink allocation control information). Thus, even if DCI indicating downlink allocation control information and DCI indicating uplink allocation control information have the same size, a terminal can determine whether specific DCI indicates downlink allocation control information or uplink allocation control information by checking type information included in allocation control information.

For example, the DCI format in which uplink allocation control information for consecutive band allocation is transmitted is referred to as "DCI format 0" (hereinafter, referred to as "DCI 0"), and the DCI format in which downlink allocation control information for consecutive band allocation is transmitted is referred to as "DCI format 1A" (hereinafter, referred to as "DCI 1A"). DCI 0 and DCI 1A are of the same size and distinguishable from each other by referring to type information as described above. Hereinafter, DCI 0 and DCI 1A will be collectively referred to as DCI 0/1A.

In addition to these DCI formats, there are other formats for downlink, such as DCI format used for common channel allocation (DCI format 1C: hereinafter, referred to as "DCI 1C"), DCI format used for non-consecutive band allocation on a downlink (DCI format 1: hereinafter, referred to as "DCI 1") and DCI format used for allocating spatial multiplexing MIMO transmission (DCI formats 2, 2A, 2B and 2C: hereinafter, referred to as "DCI 2, 2A, 2B and 2C"). Furthermore, there are also other DCI formats, such as DCI formats 1B and 1D (hereinafter, referred to as "DCI 1B and 1D"). Here, DCI 1, 1B, 1D, 2, 2A, 2B and 2C are formats used depending on the downlink transmission mode of the terminal (format of specific DCI). That is, DCI 1, 1B, 1D, 2, 2A, 2B and 2C are formats configured for each terminal. On the other hand, DCI 0/1A is a format independent of the transmission mode and available to a terminal in any transmission mode. That is, DCI 0/1A is a format commonly used for all the terminals (common DCI format). If DCI 0/1A is used, single-antenna transmission or a transmission diversity scheme is used as a default transmission mode. In the above description, specific DCI formats (DCI 2, 2A, 2B and 2C) in which spatial multiplexing MIMO transmission corresponding to a plurality of layers may also be generically called "DCI family 2." Furthermore, specific DCI formats (DCI 1, 1B and 1D) corresponding to a single layer may also be generically called "DCI family 1." A correlation between a DCI format and a transmission mode is defined (e.g., see Table 7-1-5 of NPL-4).

Here, DCI 1A used for common channel allocation and DCI 0/1A used for terminal-specific data allocation have the same size, and terminal IDs are used to distinguish between DCI 1A and DCI 0/1A. To be more specific, the base station applies CRC masking to DCI 1A used for common channel allocation so as to be distinguishable with a terminal ID common to all the terminals. Furthermore, the base station applies CRC masking to DCI 0/1A used for terminal-specific data allocation so as to be distinguishable with a terminal ID assigned in a terminal-specific manner. Therefore, the base station can transmit DCI 0/1A used for terminal-specific data allocation also using a C-SS without increasing the number of blind decoding operations of the terminal.

Also, the standardization of 3GPP LTE-Advanced (hereinafter, referred to as "LTE-A"), which provides a data transfer rate higher than that of LTE, has been started. In LTE-A, a downlink transfer rate of maximum 1 Gbps or higher and an uplink transfer rate of maximum 500 Mbps or higher are achieved. Therefore, a base station and a terminal capable of communicating at a wideband frequency of 40 MHz or higher (hereinafter, referred to as "LTE-A terminal") will be introduced. An LTE-A system is also required to support a terminal designed for an LTE system (hereinafter, referred to as "LTE terminal") in addition to an LTE-A terminal.

In LTE-A, a transmission method using non-consecutive band allocation and a transmission method using MIMO will be introduced as new uplink transmission methods. Accordingly, the definitions of new DCI formats (e.g., DCI formats 0A, 0B and 4: hereinafter, referred to as DCI 0A, 0B and 4)) are being studied (e.g., see NPL-4 and NPL-5). In other words, DCI 0A, 0B and 4 are DCI formats dependent on an uplink transmission mode.

As described above, in LTE-A, if a DCI format dependent on a downlink transmission mode (one of DCI 1, 1B, 1D, 2, 2A, 2B and 2C), a DCI format dependent on an uplink transmission mode (one of DCI 0A, 0B and 4), and a DCI format independent of a transmission mode and common to all the terminals (DCI 0/1A) are used in a UE-SS, then the terminal performs blind decoding (monitoring) on PDCCHs of the abovementioned three DCI formats respectively. For example, since 16 blind decoding operations (blind decoding region candidates: 16 candidates in total) in one DCI format need to be performed, 48 (=16×3) blind decoding operations in total are performed.

Furthermore, in LTE-A, if DCI 1C and DCI 1A which are common channel allocation formats are used in a C-SS, then the terminal performs blind decoding (monitoring) on PDCCHs of the abovementioned two DCI formats. For example, since 6 blind decoding operations (blind decoding region candidates: 6 candidates in total) in one DCI format need to be performed in a C-SS, 12 (=6×2) blind decoding operations in total are performed. Therefore, the terminal performs 60 (=48+12) blind decoding operations in total per subframe.

Additionally, in LTE-A, to achieve an increased coverage, the introduction of radio communication relay apparatus (hereinafter, referred to as "relay station") has been specified. Accordingly, the standardization of downlink control channels from base stations to relay stations (hereinafter, referred to as "R-PDCCH (Relay-Physical Downlink Control CHannel)") is under way (e.g., see NPLs-6, 7, 8 and 9). As a resource region to which an R-PDCCH is mapped (hereinafter, referred to as "R-PDCCH region"), a resource region to which downlink data is mapped (hereinafter, referred to as "PDSCH (Physical Downlink Shared CHannel) region") is used.

At present, the following matters are being studied in relation to the R-PDCCH.

(1) A mapping start position in the time-domain of an R-PDCCH is fixed to a fourth OFDM symbol from a leading symbol of one subframe, and thus does not depend on the rate at which a PDCCH occupies OFDM symbols in the time-domain.

(2) As a mapping method in the frequency-domain of an R-PDCCH, two disposing methods, "localized" and "distributed" are supported.

(3) As reference signals for demodulation, Common Reference Signal (CRS) and Demodulation Reference Signal (DM-RS) are supported. The base station notifies the relay station of which one of the reference signals is used.

(4) Each R-PDCCH is divided into slot 0 (slot 0 or first slot) and slot 1 (slot 1 or second slot) in one subframe in the time-domain.

(5) Each R-PDCCH occupies a resource configured of one or a plurality of consecutive Relay-Control Channel Elements (R-CCEs).

(6) A PDCCH notifying downlink resource allocation (hereinafter referred to as "DL grant") is transmitted using slot 0 and a PDCCH notifying uplink resource allocation (hereinafter referred to as "UL grant") is transmitted using slot 1.

(7) When a data signal (hereinafter, referred to as "PDSCH") is indicated by an R-PDCCH, a PDSCH is transmitted using only slot 1 or both slot 0 and slot 1 (that is, data transmission using only slot 0 is not possible).

CITATION LIST

Patent Literature

PTL 1
Japanese Patent Application Laid-Open No. 2010-114780

Non-Patent Literature

NPL 1
3GPP TS 36.211 V9.1.0, "Physical Channels and Modulation (Release 9)," March 2010

NPL 2
3GPP TS 36.212 V9.2.0, "Multiplexing and channel coding (Release 9)," June 2010
NPL 3
3GPP TS 36.213 V9.2.0, "Physical layer procedures (Release 9)," June 2010
NPL 4
3GPP TS 36.213 V10.0.1, "Physical layer procedures (Release 10)," December 2010
NPL 5
3GPP TSG RAN WG1 meeting, R1-092641, "PDCCH design for Carrier aggregation and Post Rel-8 feature," June 2009
NPL 6
3GPP TSG RAN WG1 meeting, R1-102700, "Backhaul Control Channel Design in Downlink," May 2010
NPL 7
3GPP TSG RAN WG1 meeting, R1-102881, "R-PDCCH placement," May 2010
NPL 8
3GPP TSG RAN WG1 meeting, R1-103040, "R-PDCCH search space design" May 2010
NPL 9
3GPP TSG RAN WG1 meeting, R1-103062, "Supporting frequency diversity and frequency selective R-PDCCH transmissions" May 2010

SUMMARY OF INVENTION

Technical Problem

In the future, it is anticipated that various devices for machine to machine (M2M) communication or the like will be introduced as radio communication terminals or the number of terminals applying spatial multiplexing MIMO transmission to improve throughput will increase in response to an increase in the volume of content communicated, that is, the number of pieces of control information with the large amount of information will increase. In consideration of these anticipations, there is concern that there may be a shortage of resources in a resource region to which a PDCCH is mapped (hereinafter, referred to as "PDCCH region"). When a PDCCH cannot be mapped due to a shortage of resources, downlink data cannot be allocated to the terminal, and therefore even when there is free space in the resource region to which downlink data is mapped (hereinafter, referred to as "PDSCH region"), the free space cannot be used, and there is concern that the system throughput may deteriorate.

Thus, LTE-A is studying the possibility of mapping DCI for a terminal connected to a base station (the terminal under the control of the base station) to the aforementioned R-PDCCH region in addition to the PDCCH region. When transmitting a PDCCH for a terminal also in the R-PDCCH region, a frequency division multiplexing (FDM) configuration (see FIG. 1A) and a time division multiplexing+frequency division multiplexing (TDM+FDM) configuration (see FIG. 1B) as shown in FIG. 1 are possible. In the FDM configuration shown in FIG. 1A, signals in the R-PDCCH region are not multiplexed in the time-domain but multiplexed only in the frequency-domain. On the other hand, in the TDM+FDM configuration shown in FIG. 1B, the R-PDCCH region is configured of two slots (called slot 0 and slot 1, or 1st slot and 2nd slot) in the time-domain. Furthermore, in the TDM+FDM configuration, signals in the R-PDCCH region are multiplexed in both the time-domain and the frequency-domain.

However, simply adding an R-PDCCH region in addition to a PDCCH region as a region for transmitting DCI for a terminal connected to a base station may disadvantageously lead to an increase in the number of blind decoding operations to be performed by the terminal, resulting in increases in power consumption, processing delay of the terminal, and circuit scale. For example, according to the above-described configuration of a search space, in one subframe, a search space is configured for each of a PDCCH region, an R-PDCCH region of slot 0 and an R-PDCCH region of slot 1. Thus, if the number of blind decoding operations to be performed by a terminal in each region is 60 as mentioned above, the terminal would repeat 180 blind decoding operations (=60×3 regions) in total for each subframe. In other words, the number of blind decoding operations increases and the configuration of a terminal becomes complicated.

On the other hand, another possible approach of configuring the search space is allocation of a search space to each of a PDCCH region and an R-PDCCH region (slot 0 and slot 1) under the assumption that the total number of region candidates for blind decoding to be performed by a terminal in one subframe (i.e., the total number of blind decoding operations) is set to the number used in the related art as described (e.g., 60 operations). However, in this case, the size of a search space in each of the PDCCH region, the R-PDCCH region of slot 0 and the R-PDCCH region of slot 1 is substantially reduced to ⅓, and thus the aforementioned blocking probability may increase. For that reason, inefficient use of resources may cause a decrease in system throughput.

Furthermore, an environment in which various modes of cell such as a femto cell and pico cell in addition to a macro cell coexist (e.g., heterogeneous network (HetNet) environment made up of macro cell and pico cell/femto cell) is under study. However, in an environment in which cells in various modes coexist, there is concern that interference in a PDCCH region of each cell may increase due to influences from other cells. When, for example, a terminal connected to a macro cell (Non-closed Subscriber Group (Non-CSG) terminal) is located in proximity of a femto cell, the Non-CSG terminal receives large interference from the femto cell. Alternatively, when a terminal connected to a pico cell is located near a cell edge of the pico cell (e.g., range expansion region), the terminal receives large interference from the macro cell. For this reason, in the PDCCH region, PDCCH reception performance of each terminal deteriorates.

Thus, when a search space is allocated to each of a PDCCH region and an R-PDCCH region (slot 0 and slot 1), there are problems that system throughput and the PDCCH reception performance in each terminal deteriorates depending on the configuration of the search space in each region.

It is an object of the present invention to provide a base station, a terminal, a transmission method and a reception method that can prevent deterioration of system throughput and secure desired receiving quality in the terminal even when a PDCCH for the terminal connected to the base station is mapped to both a PDCCH region and an R-PDCCH region.

Solution to Problem

A base station according to a first aspect of the present invention is a base station apparatus that can transmit control information using a first control channel using a common reference signal that can be received by all terminal apparatuses and a second control channel using the common reference signal or a specific reference signal for each terminal apparatus, and adopts a configuration including: a search space configuring section that configures a search space having a plurality of allocation candidates in a first resource region to which the first control channel is mapped and a second resource region to which the second control channel is mapped; and an allocating section that allocates the control information to a resource in one allocation candidate from among the plurality of allocation candidates in the search space, in which a ratio of a number of the allocation candidates in the second resource region to a number of the allocation candidates in the first resource region in the search space configured in the terminal apparatus using the specific reference signal in the second control channel is equal to or greater than a ratio of a number of the allocation candidates in the second resource region to a number of the allocation candidates in the first resource region in the search space configured in the terminal apparatus using the common reference signal in the second control channel.

A terminal according to a second aspect of the present invention adopts a configuration including: a first receiving section that blind-decodes a search space having a plurality of allocation candidates configured in a first resource region to which a first control channel using a common reference signal that is receivable by all terminal apparatuses is mapped and a second resource region to which a second control channel using the common reference signal or a specific reference signal for each terminal apparatus is mapped and obtains control information transmitted using the first control channel or the second control channel; and a second receiving section that receives a downlink data signal based on the control information for the terminal apparatus allocated to one of the plurality of allocation candidates, in which a ratio of a number of the allocation candidates in the second resource region to a number of the allocation candidates in the first resource region in the search space configured in the terminal apparatus using the specific reference signal in the second control channel is equal to or greater than a ratio of a number of the allocation candidates in the second resource region to a number of the allocation candidates in the first resource region in the search space configured in the terminal apparatus using the common reference signal in the second control channel.

A transmission method according to a third aspect of the present invention is a transmission method performed by a base station apparatus that transmits control information using a first control channel using a common reference signal that is receivable by all terminal apparatuses and a second control channel using the common reference signal or a specific reference signal for each terminal apparatus, the transmission method including: configuring a search space having a plurality of allocation candidates, in a first resource region to which the first control channel is mapped and a second resource region to which the second control channel is mapped; and allocating the control information to a resource in one allocation candidate from among the plurality of allocation candidates in the search space, in which a ratio of a number of the allocation candidates in the second resource region to a number of the allocation candidates in the first resource region in the search space configured in the terminal apparatus using the specific reference signal in the second control channel is equal to or greater than a ratio of a number of the allocation candidates in the second resource region to a number of the allocation candidates in the first resource region in the search space configured in the terminal apparatus using the common reference signal in the second control channel.

A reception method according to a fourth aspect of the present invention is a reception method that adopts a configuration including: blind-decoding a search space having a plurality of allocation candidates configured in a first resource region to which a first control channel using a common reference signal that is receivable by all terminal apparatuses is mapped and a second resource region to which a second control channel using the common reference signal or a specific reference signal for each terminal apparatus is mapped and obtaining control information transmitted using the first control channel or the second control channel; and receiving a downlink data signal based on the control information for the terminal apparatus allocated to one of the plurality of allocation candidates, in which a ratio of a number of the allocation candidates in the second resource region to a number of the allocation candidates in the first resource region in the search space configured in the terminal apparatus using the specific reference signal in the second control channel is equal to or greater than a ratio of a number of the allocation candidates in the second resource region to a number of the allocation candidates in the first resource region in the search space configured in the terminal apparatus using the common reference signal in the second control channel.

Advantageous Effects of Invention

According to the present invention, even when a PDCCH for a terminal connected to a base station is mapped to both a PDCCH region and an R-PDCCH region, desired receiving quality can be secured in the terminal without causing deterioration of system throughput.

BRIEF DESCRIPTION OF DRAWINGS

FIGS. 1A and 1B illustrate examples of multiplexed configuration of R-PDCCH regions;

FIG. 3 is a diagram for explaining features of a reference signal according to Embodiment 1 of the present invention;

FIG. 9B is a diagram illustrating an example of search space configuration in an R-PDCCH region according to Embodiment 1 of the present invention;

FIG. 10 is a diagram illustrating the number of DCI allocation region candidates (number of blind decoding region candidates) in a PDCCH region and an R-PDCCH region according to Embodiment 1 of the present invention;

FIG. 11 is a diagram illustrating an example of search space configuration according to Embodiment 2 of the present invention (configuration method 1);

FIG. 13 is a diagram illustrating search space patterns according to Embodiment 3 of the present invention;

FIG. 15 is a diagram illustrating features of a reference signal arranged in each transmission region according to Embodiment 5 of the present invention;

FIG. 20 is a diagram illustrating an example of search space configuration according to Embodiment 7 of the present invention;

FIG. 21 is a diagram illustrating a data allocation example in each transmission region according to Embodiment 7 of the present invention; and FIG. 22 is a diagram illustrating search space patterns according to the present invention.

DESCRIPTION OF EMBODIMENTS

Figure 2:
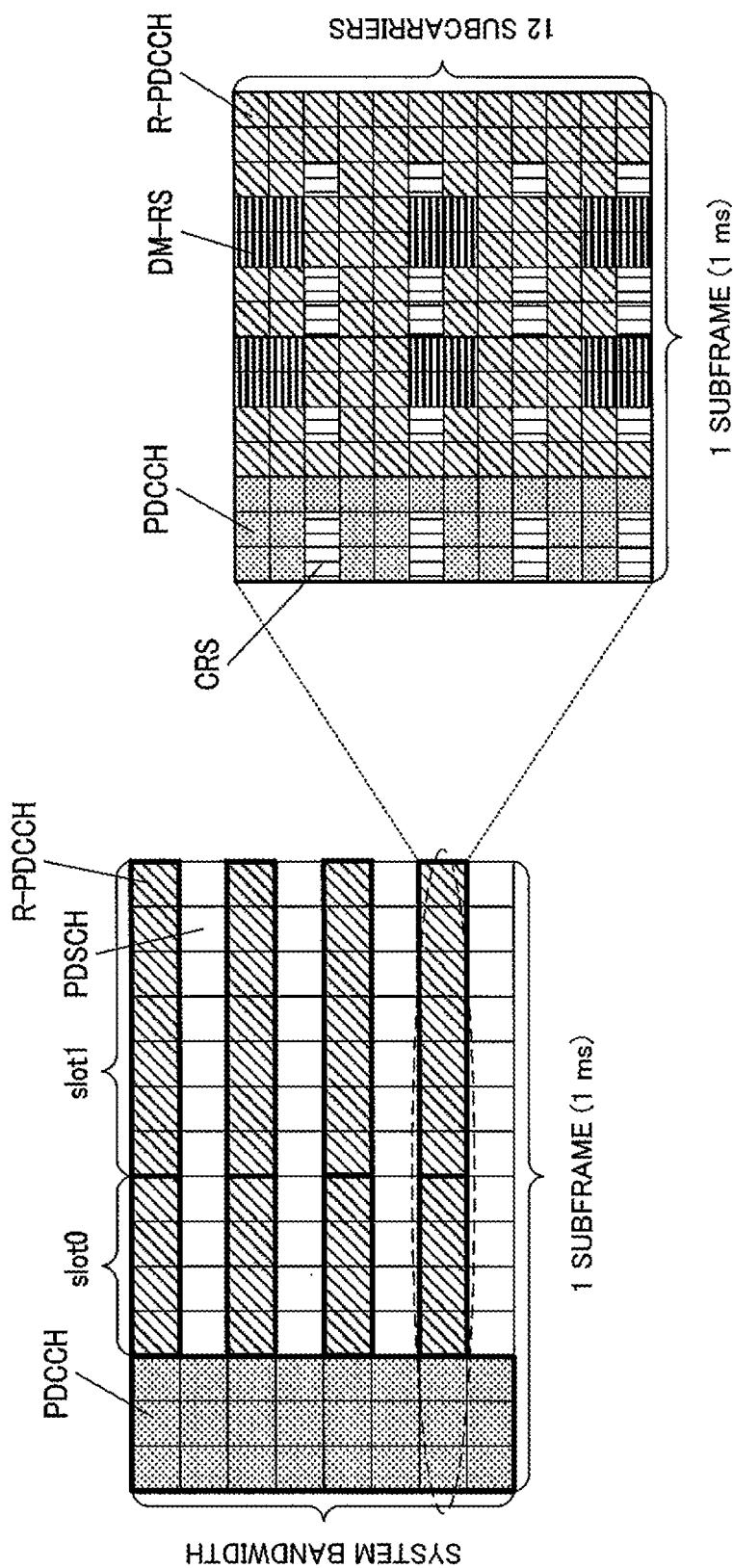
FIG. 2 is a diagram illustrating downlink resources according to Embodiment 1 of the present invention.

Embodiments of the present invention will be described in detail with reference to the accompanying drawings. In the embodiments, the same reference numerals are used for denoting the same components, and a redundant description thereof is omitted.

The following matters are assumed as premises in the description below.

That is, as for a region for which DCI for a terminal connected to a base station according to the present invention is transmitted (PDCCH transmission region), a case will be described as an example where only a PDCCH region shown on the left side of FIG. 2 is used and where both a PDCCH region and an R-PDCCH region shown on the left side of FIG. 2 are used. Furthermore, as shown on the left side of FIG. 2, when a TDM+FDM configuration is applied in the R-PDCCH region, the R-PDCCH region is divided into slot 0 and slot 1 within one subframe in the time-domain.

Furthermore, in the PDCCH region, as shown on the right side of FIG. 2, a CRS is used as a reference signal (RS) for demodulation. In contrast, in the R-PDCCH region as shown on the right side of FIG. 2, a CRS or DM-RS is used as a reference signal (RS) for demodulation. That is, in the PDCCH region and R-PDCCH region, there are two combinations of reference signals used for DCI demodulation by a terminal under the control of the base station; (1) CRS (PDCCH region)+CRS (R-PDCCH region) and (2) CRS (PDCCH region)+DM-RS (R-PDCCH region).

Here, features of CRS and DM-RS are shown in FIG. 3. When a reference signal to be used is a CRS, the CRS itself and control information demodulated using the CRS are not precoded (weighted on the transmitting side) (no precoding). That is, a CRS is an RS common to all the terminals, which is a reference signal that can be received by all the terminals. Furthermore, a CRS is disposed distributed over the entire frequency-domain (that is, a CRS is disposed over the entire frequency-domain), and so there is no constraint on the disposition of control information demodulated using the CRS in the frequency-domain, and therefore the control information can also be disposed distributed over the entire system bandwidth (distributed disposition) and it is possible to obtain a frequency diversity effect with respect to the control information. Therefore, use of CRS is effective in reducing influences of a variation in the received signal level in the frequency-domain caused by the terminal moving at a high speed.

On the other hand, when a reference signal used is a DM-RS, the DM-RS itself and control information demodulated using the DM-RS is subjected to precoding (weighting on the transmitting side) optimized for a certain terminal. For this reason, it is difficult for all the terminals to receive a DM-RS while securing desired receiving quality. That is, a DM-RS is a specific RS for each terminal. Furthermore, since a DM-RS is subjected to precoding optimized for a specific terminal in the frequency-domain, its disposition in the frequency-domain is a concentrated disposition (localized disposition) on a certain frequency band. This makes it possible to improve received signal power of control information for a specific terminal. Therefore, use of a DM-RS is effective for a terminal located at a cell edge or the like (terminal whose received signal level is low).

In FIG. 3, it is assumed that a CRS is disposed distributed over the entire frequency-domain, but the CRS may be disposed only in part of the frequency-domain (that is, localized disposition). Furthermore, the present invention is not limited to the use of CRS and DM-RS. That is, not only a CRS and DM-RS but also any reference signal that satisfies one of the features of reference signals shown in FIG. 3 (presence or absence of precoding, target terminal (common or specific) and disposition in the frequency-domain (distributed disposition or localized disposition)) may be used instead of a CRS and DM-RS.

Embodiment 1

Overview of Communication System

A communication system according to Embodiment 1 of the present invention includes base station 100 and terminal 200. Base station 100 is an LTE-A base station, and terminal 200 is an LTE-A terminal.

In a communication system according to the present embodiment, allocation control information is transmitted from base station 100 to terminal 200 through a PDCCH using CRSs which is a common reference signal that can be received by all the terminals and an R-PDCCH using CRSs or DM-RS which is a specific reference signal for each terminal.

Figure 4:
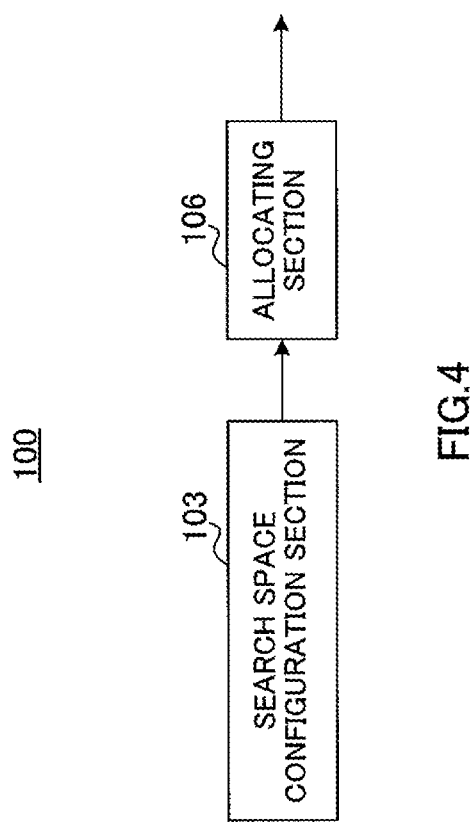
FIG. 4 is a principal block diagram of a base station according to Embodiment 1 of the present invention.

FIG. 4 illustrates principal components of base station 100 according to the present embodiment. In base station 100 shown in FIG. 4, search space configuration section 103 configures search spaces having a plurality of DCI allocation region candidates in a PDCCH region and an R-PDCCH region, and allocating section 106 allocates allocation control information (that is, DCI) to resources in one DCI allocation region candidate among a plurality of DCI allocation region candidates in a search space (resource composed of one or a plurality of CCEs in a PDCCH region or resource composed of one or a plurality of R-CCEs in an R-PDCCH region).

Figure 5:
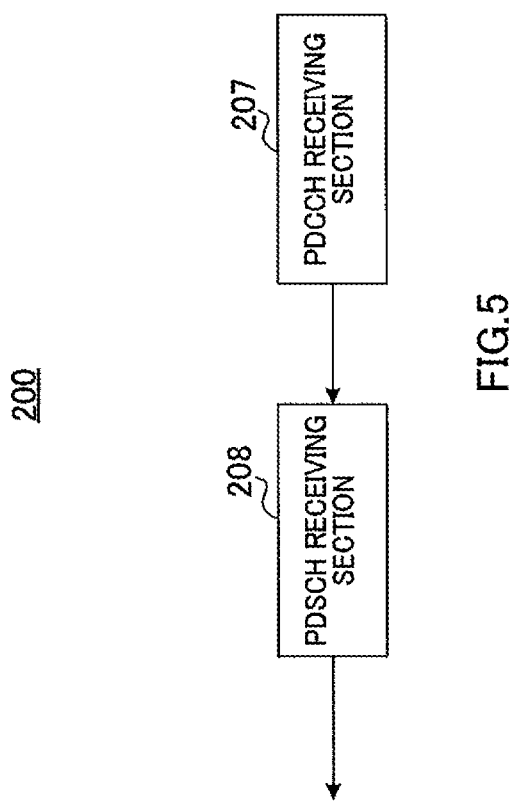
FIG. 5 is a principal block diagram of a terminal according to Embodiment 1 of the present invention.

FIG. 5 illustrates principal components of terminal 200 according to the present embodiment. In terminal 200 shown in FIG. 5, PDCCH receiving section 207 blind-decodes a search space having a plurality of DCI allocation region candidates (that is, blind decoding region candidates in terminal 200) configured in a PDCCH region to which a PDCCH using CRSs that can be received by all the terminals is mapped and an R-PDCCH region to which an R-PDCCH using CRSs or DM-RS for each terminal is mapped, and obtains allocation control information (that is, DCI) transmitted using the PDCCH and R-PDCCH. PDSCH receiving section 208 receives downlink data signals on the basis of the allocation control information for terminal 200 disposed in any one of the plurality of DCI allocation region candidates.

However, the ratio of the number of DCI allocation region candidates in the R-PDCCH region to the number of DCI allocation region candidates in the PDCCH region in a search space configured in terminal 200 using DM-RSs in the R-PDCCH region is equal to or greater than the number of DCI allocation region candidates in the R-PDCCH region to the number of DCI allocation region candidates in the PDCCH region in a search space configured in terminal 200 using CRSs in the R-PDCCH region.

[Configuration of Base Station 100]

Figure 6:
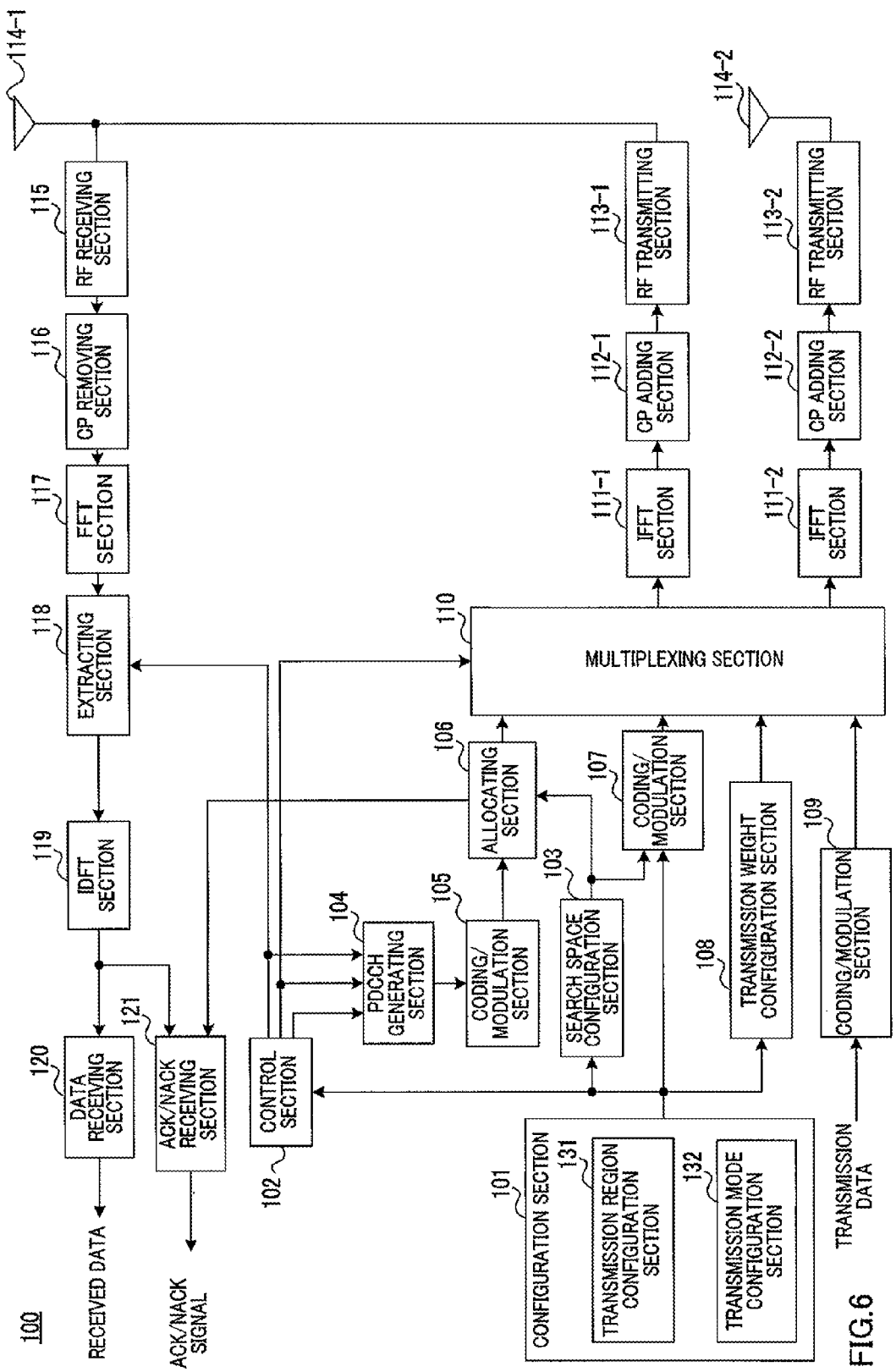
FIG. 6 is a block diagram illustrating the configuration of the base station according to Embodiment 1 of the present invention.

FIG. 6 is a block diagram illustrating the configuration of base station 100 according to Embodiment 1 of the claimed invention.

In base station 100 shown in FIG. 6, configuration section 101 configures a resource region for use in the transmission of DCI to terminal 200 (transmission region) and also configures each transmission mode for uplink and downlink for terminal 200. The configuration of a resource region and a transmission mode is performed for each terminal 200 to be configured.

Specifically, configuration section 101 includes transmission region configuration section 131 and transmission mode configuration section 132.

Transmission region configuration section 131 configures whether or not to include an R-PDCCH region in addition to a PDCCH region for each terminal 200 as a region for use in the transmission of DCI (transmission region). For example, when there is concern that the PDCCH region might become tight or when it is determined that interference in the PDCCH region is large, transmission region configuration section 131 configures the DCI transmission region so as to include the R-PDCCH region in addition to the PDCCH region. Examples of the case where there is concern that the PDCCH region might become tight include a case where many terminals are connected to base station 100 and a case where there are many terminals 200 to which spatial multiplexing MIMO transmission adaptable to a plurality of layers is allocated. That is, transmission region configuration section 131 determines whether blind decoding is performed, for each terminal, on only a PDCCH region or on both a PDCCH region and an R-PDCCH region (or only on an R-PDCCH region).

Furthermore, transmission region configuration section 131 configures a reference signal for use in each transmission region. To be more specific, transmission region configuration section 131 configures a CRS as a reference signal for use in a PDCCH region. Furthermore, when the DCI transmission region is configured to also include an R-PDCCH region, transmission region configuration section 131 configures one of a CRS and DM-RS as a reference signal for use in the R-PDCCH region. For example, when it is determined that terminal 200 is located at a cell edge covered by base station 100 and the intensity of the received signal (received signal level) needs to be improved, transmission region configuration section 131 configures a DM-RS as a reference signal for use in an R-PDCCH region to which a control signal (that is, DCI) for terminal 200 is mapped based on features of the DM-RS (see FIG. 3). Alternatively, when it is determined that terminal 200 is moving fast, transmission region configuration section 131 configures a CRS as a reference signal for use in an R-PDCCH region to which a control signal for terminal 200 is mapped based on features of the CRS (see FIG. 3).

Furthermore, transmission mode configuration section 132 configures, based on a propagation path situation for each terminal 200 or the like, the DCI format and transmission mode (for example, spatial multiplexing MIMO transmission, beam forming transmission, and non-consecutive band allocation) of each of uplink and downlink for terminal 200.

Configuration section 101 then outputs configuration information containing the information indicating the transmission region of DCI, information indicating a reference signal for use in the transmission region of DCI and information indicating the transmission mode configured in each terminal 200 to control section 102, search space configuration section 103, coding/modulation section 107 and transmission weight configuration section 108. These items of information contained in the configuration information are reported to each terminal 200 via coding/modulation section 107 as upper layer control information (referred to as "RRC control information" or "RRC signaling"). Furthermore, since the reference signal for use in a PDCCH region is fixed to a CRS, configuration section 101 may output only information indicating a reference signal for use in an R-PDCCH region. Alternatively, when a reference signal for use in an R-PDCCH region is fixed to one of CRS and DM-RS beforehand, configuration section 101 need not output information indicating a reference signal. These items of information outputted from configuration section 101 may b e simultaneously transmitted or transmitted at different timings.

Control section 102 generates allocation control information according to the configuration information inputted from configuration section 101.

To be more specific, control section 102 generates allocation control information containing MCS information corresponding to one transport block transmitted, resource (RB) allocation information and a new data indicator (NDI) or the like. As the resource allocation information, control section 102 generates uplink resource allocation information indicating an uplink resource (for example, a Physical Uplink Shared Channel (PUSCH)) to which uplink data from terminal 200 is allocated, or downlink resource allocation information indicating a downlink resource (for example, a Physical Downlink Shared Channel (PDSCH)) to which downlink data to terminal 200 is allocated.

Furthermore, on the basis of the configuration information received from configuration section 101, control section 102 generates allocation control information according to a DCI format based on a transmission mode of the uplink from terminal 200 (i.e., one of DCI 0A, 0B and 4), a DCI format based on a transmission mode of the downlink (one of DCI 1, 1B, 1D, 2, 2A, 2B and 2C) or a DCI format common to all the terminals (DCI 0/1A).

For example, during normal data transmission, control section 102 generates allocation control information in a format depending on the transmission mode for each terminal 200 (one of DCI 1, 1B, 1D, 2, 2A, 2B and 2C or one of DCI 0A, 0B and 4). As a result, data can be transmitted at the transmission mode configured for each terminal 200, which improves throughput.

However, an abrupt change in the condition of a propagation path or a change in interference from an adjacent cell may cause frequent errors in receiving data in the transmission mode configured for each terminal 200. In this case, control section 102 generates allocation control information in the format (DCI 0/1A) common to all the terminals and transmits data in a robust default transmission mode. As a result, robust data transmission is allowed even if a propagation environment is abruptly changed.

Also, when upper-layer control information (i.e., RRC signaling) is transmitted for the notification of a transmission mode change under deteriorated conditions of a propagation path, control section 102 generates allocation control information (i.e., DCI 0/1A) common to all the terminals and transmits the information using the default transmission mode. The number of information bits of DCI 0/1A common to all the terminals is smaller than that of DCI 1, 1B, 1D, 2, 2A, 2B, 2C, 0A, 0B and 4 depending on a particular transmission mode. For this reason, if the same number of CCEs is set, DCI 0/1A can allow transmission at a lower coding rate than that related to DCI 1, 1B, 1D, 2, 2A, 2B, 2C, 0A, 0B and 4. Thus, use of DCI 0/1A in control section 102 under a deteriorated condition of a propagation path enables terminal 200 having a poor condition of a propagation path to receive allocation control information (and data) with a low error rate.

Control section 102 also generates allocation control information for common channels (for example, DCI 1C and 1A) for the allocation of data common to a plurality of terminals, such as broadcasting and paging information, in addition to the allocation control information for the allocation of terminal-specific data.

Control section 102 outputs MCS information and an NDI to PDCCH generating section 104, uplink resource allocation information to PDCCH generating section 104 and extracting section 118, and downlink resource allocation information to PDCCH generating section 104 and multiplexing section 110, among the generated items of allocation control information for the allocation of terminal-specific data. Control section 102 also outputs the generated allocation control information for a common channel to PDCCH generating section 104.

Search space configuration section 103 configures a common search space (C-SS) and specific search space (UE-SS) on the basis of a transmission region of DCI and a reference signal used, indicated by the configuration information inputted from configuration section 101. The common search space (C-SS) is a search space common to all the terminals, and the specific search space (UE-SS) is a search space specific to each terminal as described above.

Specifically, search space configuration section 103 configures prepared CCEs (for example, CCEs from leading to 16th ones) as a C-SS. A CCE is a basic unit of the control information disposed.

Search space configuration section 103 also configures a UE-SS for each terminal. For example, search space configuration section 103 determines a UE-SS for a certain terminal on the basis of the ID of the terminal, a CCE number obtained by calculations using a hash function for randomization, and the number of CCEs (L) that form a search space. A UE-SS can be configured in each of the PDCCH region and R-PDCCH region.

Figure 7:
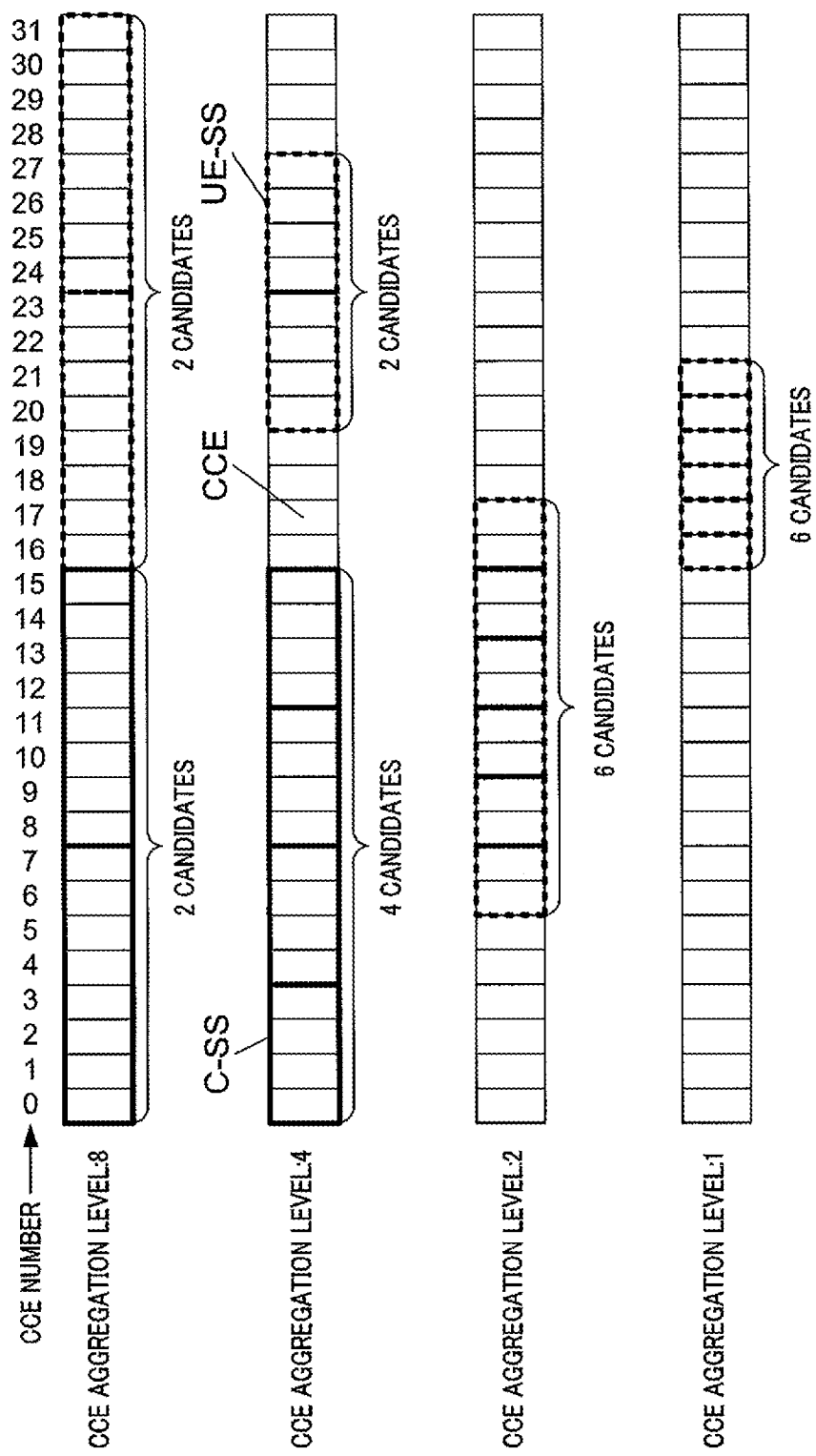
FIG. 7 is a diagram illustrating search spaces configured in the terminal according to Embodiment 1 of the present invention.

FIG. 7 is a diagram illustrating an example of configuration of a C-SS and a UE-SS for a certain terminal.

In FIG. 7, with respect to CCE aggregation level 4 of a PDCCH, four DCI allocation region candidates (i.e., CCEs 0 to 3, CCEs 4 to 7, CCEs 8 to 11, and CCEs 12 to 15) are configured as a C-SS. Also, with respect to CCE aggregation level 8 of the PDCCH, two DCI allocation region candidates (i.e., CCEs 0 to 7 and CCEs 8 to 15) are configured as another C-SS. In other words, in FIG. 7, the six DCI allocation region candidates in total are configured as the C-SSs.

Furthermore, in FIG. 7, with respect to CCE aggregation level 1, six DCI allocation region candidates (i.e., each of CCEs 16 to 21) are configured as a UE-SS. With respect to CCE aggregation level 2, six DCI allocation region candidates (i.e., obtained by partitioning CCEs 6 to 17 into sets of 2) are configured as another UE-SS. With respect to CCE aggregation level 4, two DCI allocation region candidates (i.e., CCEs 20 to 23 and CCEs 24 to 27) are configured as yet another UE-SS. With respect to CCE aggregation level 8, two DCI allocation region candidates (i.e., CCEs 16 to 23 and CCEs 24 to 31) are configured as still another UE-SS. In other words, in FIG. 7, 16 DCI allocation region candidates in total are configured as the UE-SSs.

Furthermore, when both a PDCCH region and an R-PDCCH region are configured as DCI transmission regions, search space configuration section 103 configures search spaces (C-SS and UE-SS) having the aforementioned plurality of DCI allocation region candidates in the PDCCH region and R-PDCCH region. Details of the search space configuration processing of search space configuration section 103 will be described later.

Search space configuration section 103 outputs search space information indicating the configured C-SS and UE-SS of each terminal to allocating section 106 and coding/modulation section 107.

Returning to FIG. 6, PDCCH generating section 104 generates DCI containing allocation control information for the allocation of terminal-specific data inputted from control section 102 (that is, uplink resource allocation information, downlink resource allocation information, MCS information and NDI or the like for each terminal, and uplink resource allocation information or downlink resource allocation information) or DCI containing allocation control information for a common channel (that is, broadcast information and paging information common to terminals or the like). At this time, PDCCH generating section 104 adds CRC bits to the uplink allocation control information and the downlink allocation control information generated for each terminal and masks (or scrambles) the CRC bits with a terminal ID. PDCCH generating section 104 then outputs the masked DCI to coding/modulation section 105.

Coding/modulation section 105 modulates the DCI received from PDCCH generating section 104 after coding and outputs the modulated signals to allocating section 106. Coding/modulation section 105 determines a coding rate set on the basis of channel quality indicator (CQI) information reported from each terminal so as to achieve a sufficient reception quality in each terminal. For example, as a distance between a terminal and a cell boundary decreases (i.e., as the channel quality of a terminal deteriorates), the coding rate to be set by coding/modulation section 105 decreases.

Allocating section 106 allocates, to each of CCEs or R-CCEs in a C-SS, or CCEs or R-CCEs in a UE-SS for each terminal, which are indicated by search space information inputted from search space configuration section 103, DCI containing allocation control information for a common channel and DCI containing allocation control information for the allocation of terminal-specific data to each terminal, which are inputted from coding/modulation section 105. For example, allocating section 106 selects one DCI allocation region candidate from a group of DCI allocation region candidates in a C-SS (for example, see FIG. 7). Allocating section 108 then allocates DCI containing allocation control information for a common channel to a CCE (or an R-CCE; hereinafter, sometimes simply referred to as "CCE" without distinguishing "CCE" from "R-CCE") in the selected DCI allocation region candidate.

In the case where a DCI format for the allocation target terminal is a DCI format dependent on a transmission mode (for example, DCI 1, 1B, 1D, 2, 2A, 2B, 2C, 0A, 0B and 4), allocating section 106 allocates a CCE in a UE-SS configured for the allocation target terminal to DCI. On the other hand, in the case where a DCI format for the allocation target terminal is a format common to all the terminals (for example, DCI 0/1A), allocating section 106 allocates a CCE in a C-SS or a CCE in a UE-SS configured for the allocation target terminal to DCI.

The CCE aggregation level to be allocated to one DCI item depends on the coding rate and the number of DCI bits (namely, the amount of allocation control information). For example, more physical resources are required for a coding rate set to be low of DCI for a terminal located around a cell boundary. For this reason, allocating section 106 allocates more CCEs to DCI for a terminal located around a cell boundary.

Allocating section 106 then outputs information about the CCEs allocated to the DCI to multiplexing section 110 and ACK/NACK receiving section 121. Allocating section 106 outputs the coded/modulated DCI to multiplexing section 109.

Coding/modulation section 107 modulates the configuration information inputted from configuration section 101 and search space information inputted from search space configuration section 103 (that is, upper-layer control information) after channel coding and outputs the modulated configuration information and search space information to multiplexing section 110.

Transmission weight configuration section 108 configures a transmission weight (precoding weight) for a terminal using DM-RSs as reference signals for demodulation based on the configuration information inputted from configuration section 101 and outputs the configured transmission weight to multiplexing section 110.

Coding/modulation section 109 modulates the input transmission data (downlink data) after channel coding and outputs the modulated transmission data signals to multiplexing section 110.

Multiplexing section 110 multiplexes the coded/modulated DCI signal inputted from allocating section 106, the configuration information and search space information (that is, upper-layer control information) inputted from coding/modulation section 107, and the data signals (namely, PDSCH signals) inputted from coding/modulation section 109 in the time-domain and the frequency-domain.

Here, multiplexing section 110 multiplies DCI information and a PDSCH signal or the like in an R-PDCCH region for a terminal using DM-RSs as reference signals for demodulation, by a transmission weight inputted from transmission weight configuration section 108, and outputs the weighted signals to Inverse Fast Fourier Transform (IFFT) section 111 for each antenna. Furthermore, multiplexing section 110 performs spatial frequency block coding (SFBC) processing on a signal for which no transmission weight is configured (DCI information in a PDCCH region or the like) and outputs the signal to Inverse Fast Fourier Transform (IFFT) section 111 for each antenna. Furthermore, multiplexing section 110 maps the PDCCH signals and the data signals (PDSCH signals) on the basis of the downlink resource allocation information inputted from control section 102. Multiplexing section 110 may also map the configuration information and search space information onto the PDSCH.

IFFT sections 111-1 and 111-2, CP (Cyclic Prefix) adding sections 112-1 and 112-2 and RF transmitting sections 113-1 and 113-2 are provided for antennas 114-1 and 114-2 correspondingly.

IFFT sections 111-1 and 111-2 convert the multiplexed signals from multiplexing section 110 for each antenna into a time waveform and CP adding sections 112-1 and 112-2 add a CP to the time waveform to obtain OFDM signals.

Transmission RF sections 113-1 and 113-2 perform radio processing for transmission (for example, up-conversion or digital-analog (D/A) conversion) on the OFDM signals inputted from CP adding sections 112-1 and 112-2 and transmit the resultant received signals via antennas 114-1 and 114-2.

On the other hand, RF receiving section 115 also performs radio processing for reception (for example, down-conversion or analog-digital (A/D) conversion) on radio signals received via antenna 114-1 at a receiving band and outputs the resultant received signals to CP removing section 116.

CP removing section 116 removes the CP from the received signals and fast Fourier transform (FFT) section 117 converts the received signals from which the CP is removed into frequency-domain signals.

Extracting section 118 extracts uplink data from the frequency-domain signals received from FFT section 117 on the basis of uplink resource allocation information received from control section 102 and Inverse Discrete Fourier transform (IDFT) section 119 converts the extracted signals into time-domain signals and outputs the time-domain signals to data receiving section 120 and ACK/NACK receiving section 121.

Data receiving section 120 decodes the time-domain signals inputted from IDFT section 119. Data receiving section 120 then outputs decoded uplink data as received data.

ACK/NACK receiving section 121 extracts, from the time-domain signals received from IDFT section 119, ACK/NACK signals from each terminal for the downlink data (PDSCH signals). Specifically, ACK/NACK receiving section 121 extracts the ACK/NACK signals from an uplink control channel (e.g., a Physical Uplink Control Channel (PUCCH) on the basis of the information inputted from allocating section 106. The uplink control channel is associated with the CCEs used for the transmission of the downlink allocation control information corresponding to the downlink data.

ACK/NACK receiving section 121 then determines the ACK or NACK of the extracted ACK/NACK signals.

One reason that the CCEs and the PUCCH are associated with each other is to obviate the need for signaling sent by the base station to notify each terminal of a PUCCH for use in transmitting ACK/NACK signals from the terminal, which thereby allows downlink communication resources to be efficiently used. Consequently, in accordance with the association between the CCEs and the PUCCH, each terminal determines a PUCCH for use in transmitting ACK/NACK signals on the basis of the CCEs to which downlink allocation control information (DCI) for the terminal is mapped.

[Configuration of Terminal 200]

Figure 8:
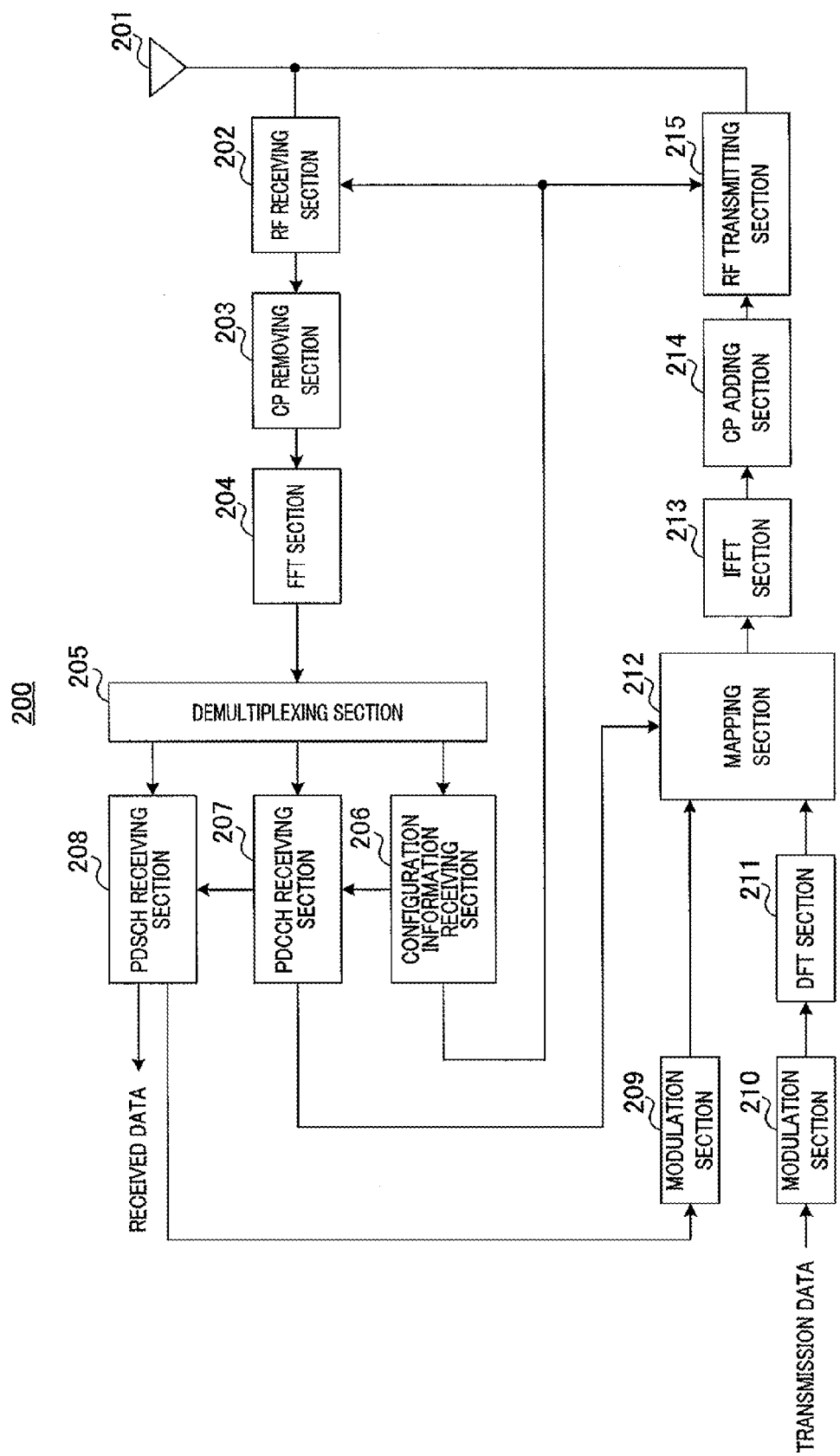
FIG. 8 is a block diagram illustrating the configuration of the terminal according to Embodiment 1 of the present invention.

FIG. 8 is a block diagram illustrating the configuration of terminal 200 according to Embodiment 1 of the present invention. Terminal 200 receives downlink data and transmits an ACK/NACK signal corresponding to the downlink data to base station 100 using a PUCCH which is an uplink control channel.

In terminal 200 shown in FIG. 8, RF receiving section 202 configures a reception band based on band information received from configuration information receiving section 206. RF reception section 202 performs radio processing for reception (e.g., down-conversion or analog-digital (A/D) conversion) on radio signals (i.e., OFDM signals in this case) received via antenna 201 at the reception band and outputs resultant received signals to CP removing section 203. The received signals may include a PDSCH signal, DCI, and upper-layer control information including configuration information and search space information. The DCI (allocation control information) for terminal 200 is allocated to a common search space (C-SS) configured for terminal 200 and other terminals or to a specific search space (UE-SS) configured for terminal 200.

CP removing section 203 removes a CP from the received signals and FFT section 204 converts the received signals from which the CP is removed into frequency-domain signals. The frequency-domain signals are outputted to demultiplexing section 205.

Demultiplexing section 205 outputs a component of signals received from FFT section 204 that may include DCI (i.e., signals extracted from a PDCCH region and an R-PDCCH region) to PDCCH receiving section 207. Demultiplexing section 205 also outputs upper-layer control signals (e.g., RRC signaling) including configuration information to configuration information receiving section 206 and data signals (i.e., PDSCH signals) to PDSCH receiving section 208.

Configuration information receiving section 206 reads, from the upper-layer control signals inputted from demultiplexing section 205, band information configured for the terminal, information indicating a terminal ID configured for the terminal, search space information configured for the terminal, information indicating a reference signal configured for the terminal and information indicating a transmission mode configured for the terminal.

The band information configured for the terminal is outputted to PDCCH receiving section 207, RF receiving section 202 and RF transmitting section 215. The information indicating a terminal ID set for the terminal is outputted to PDCCH receiving section 207 as terminal ID information. The search space information configured for the terminal is outputted to PDCCH receiving section 207 as search space region information. The information indicating a reference signal set for the terminal is outputted to PDCCH receiving section 207 as reference signal information. The information indicating a transmission mode configured for the terminal is outputted to PDCCH receiving section 207 as transmission mode information.

PDCCH receiving section 207 blind-decodes (monitors) the DCI inputted from demultiplexing section 205 to obtain DCI for the terminal. PDCCH receiving section 207 performs blind-decoding for a DCI format for the allocation of data common to all the terminals (for example, DCI 0/1A), a DCI format dependent on the transmission mode configured for the terminal (for example, one of DCI 1, 1B, 1D, 2, 2A, 2B, 2C, 0A, 0B and 4), and a DCI format for the allocation of channels common to all the terminals (for example, DCI 1C and 1A). This operation creates DCI containing allocation control information on the DCI formats.

To be more specific, PDCCH receiving section 207 blind-decodes a C-SS indicated by the search space region information inputted from configuration information receiving section 206 in a DCI format for the allocation of a common channel (DCI 1C and 1A) and in a DCI format (DCI 0/1A) for the allocation of data common to all the terminals. That is, for each region candidate targeted for blind decoding in a C-SS (i.e., candidates of a CCE region allocated to terminal 200), PDCCH receiving section 207 demodulates and decodes the size of the DCI format for common channel allocation and the size of the DCI format for the allocation of data common to all the terminals. For the decoded signals, PDCCH receiving section 207 demasks CRC bits with an ID common to a plurality of terminals. PDCCH receiving section 207 then determines signals for which "CRC=OK" is found (i.e. no error is found) as a result of the demasking to be DCI containing allocation control information for a common channel. For the decoded signals, PDCCH receiving section 207 further demasks the CRC bits with the ID of the terminal indicated by the terminal ID information. PDCCH receiving section 207 then determines signals for which "CRC=OK" is found (i.e. no error is found) as a result of the demasking to be DCI containing allocation control information for the terminal. In other words, PDCCH receiving section 207 determines, in a C-SS, whether allocation control information on DCI 0/1A is for a common channel or for the allocation of data to the terminal with a terminal ID (i.e., an ID common to a plurality of terminals or the ID of terminal 200).

PDCCH receiving section 207 calculates a UE-SS for the terminal for each CCE aggregation level with the terminal ID indicated by the terminal ID information inputted from configuration information receiving section 206. For each blind decoding region candidate (CCE candidate of each CCE aggregation level) in the obtained UE-SS, PDCCH receiving section 207 then demodulates and decodes the size of the DCI format corresponding to the transmission mode configured for the terminal (the transmission mode indicated by the transmission mode information) and the size of the DCI format common to all the terminals (DCI 0/1A). For the decoded signals, PDCCH receiving section 207 demasks CRC bits with the ID of the terminal. PDCCH receiving section 207 determines signals for which "CRC=OK" is found (i.e. no error is found) as a result of demasking to be DCI for the terminal.

Even if the search space region indicated by the search space region information inputted from configuration information receiving section 206 includes an R-PDCCH region, PDCCH receiving section 207 blind-decodes (monitors) search spaces configured for the PDCCH region and R-PDCCH region and acquires DCI for the terminal transmitted using the PDCCH and R-PDCCH as in the case of the aforementioned PDCCH region.

If PDCCH receiving section 207 receives no search space region information (i.e., if base station 100 transmits no search space region information) from configuration information receiving section 206, PDCCH receiving section 207 may perform blind decoding in a transmission region of a plurality of items of DCI which may be directed to terminal 200 without considering the search spaces of terminal 200.

Upon reception of downlink allocation control information, PDCCH receiving section 207 outputs downlink resource allocation information contained in the DCI for the terminal to PDSCH receiving section 208 and upon reception of uplink allocation control information, PDCCH receiving section 207 outputs uplink resource allocation information to mapping section 212. PDCCH receiving section 207 also outputs the CCE number for the CCE used for the transmission of the DCI for the terminal (i.e., CCE used for the transmission of the signals for which "CRC=OK" is found) to mapping section 212 (CCE number for the leading CCE if the CCE aggregation level is plural). The details of blind decoding (monitoring) in the PDCCH receiving section 207 will be described later.

PDSCH receiving section 208 extracts received data (i.e., downlink data) from the PDSCH signals inputted from demultiplexing section 205 on the basis of the downlink resource allocation information received from PDCCH receiving section 207. That is, PDSCH receiving section 208 receives downlink data (downlink data signal) based on downlink resource allocation information (allocation control information) for terminal 200 allocated to one of a plurality of DCI allocation region candidates (blind decoding region candidates). PDSCH receiving section 208 also detects any error in the extracted received data (i.e., downlink data). If an error is found in the received data as a result of the error detection, PDSCH receiving section 208 generates NACK signals as ACK/NACK signals. If no error is found in the received data, PDSCH receiving section 208 generates ACK signals as ACK/NACK signals. The ACK/NACK signals are outputted to modulating section 209.

Modulating section 209 modulates the ACK/NACK signals inputted from PDSCH receiving section 208 and outputs the modulated ACK/NACK signals to mapping section 212.

Modulating section 210 modulates transmission data (i.e., uplink data) and outputs the modulated data signal to DFT section 211.

DFT section 211 converts the data signals received from modulating section 210 into the frequency-domain and outputs a plurality of resultant frequency components to mapping section 212.

Mapping section 212 maps the frequency component corresponding to the data signal among a plurality of frequency components inputted from DFT section 211 to a PUSCH in accordance with the uplink resource allocation information inputted from PDCCH receiving section 207. Mapping section 212 also identifies a PUCCH in accordance with the CCE number inputted from PDCCH receiving section 207. Mapping section 212 then maps the ACK/NACK signals inputted from modulating section 209 to the identified PUCCH.

IFFT section 213 converts the plurality of frequency components mapped to the PUSCH into a time-domain waveform. CP adding section 214 adds a CP to the time-domain waveform.

RF transmitting section 215 can vary the range for transmission. RF transmitting section 215 determines a specific transmission range on the basis of the band information received from configuration information receiving section 206. RF transmitting section 215 then performs transmission radio processing (for example, up-conversion or digital-analog (D/A) conversion) on the CP-added signals and transmits the resultant signals via antenna 201

[Operations of Base Station 100 and Terminal 200]

Operations of base station 100 and terminal 200 having the above-described configurations will be described with reference to FIG. 9A and FIG. 9B.

In the following description, 6 DCI allocation region candidates (that is, blind decoding region candidates) in total are configured as C-SSs; 4 candidates (16 CCEs (=4 CCEs×4 candidates)) for CCE aggregation level 4 and 2 candidates (16 CCEs (=8 CCEs×2 candidates)) for CCE aggregation level 8. Furthermore, 16 DCI allocation region candidates (that is, blind decoding region candidates) in total are configured as UE-SSs; 6 candidates (6 CCEs (=1 CCE×6 candidates)), 6 candidates (12 CCEs (=2 CCEs×6 candidates)), 2 candidates (8 CCEs (4 CCEs×2 candidates)) and 2 candidates (16 CCEs (=8 CCEs×2 candidates)) for CCE aggregation levels 1, 2, 4 and 8 respectively. That is, search spaces (C-SS and UE-SS) composed of 22 DCI allocation region candidates (that is, blind decoding region candidates) in total are configured for each terminal.

Furthermore, a case will be described here where configuration section 101 of base station 100 configures both the PDCCH region and the R-PDCCH region for terminal 200 as PDCCH transmission regions. In this case, the above 22 DCI allocation region candidates (that is, blind decoding region candidates) are each configured in one of the PDCCH region and an R-PDCCH region. In other words, the sum of the number of DCI allocation region candidates configured in a PDCCH region and the number of DCI allocation region candidates configured in an R-PDCCH region amounts to 22.

Furthermore, configuration section 101 configures a CRS as a reference signal for use in a PDCCH region and configures one of a CRS and a DM-RS as a reference signal for use in an R-PDCCH region.

Search space configuration section 103 configures a common search space (C-SS) and a specific search space (UE-SS) based on a PDCCH transmission region indicated by the configuration information inputted from configuration section 101 and reference signals used.

To be more specific, when using both a PDCCH region and an R-PDCCH region as a region for transmitting a PDCCH to terminal 200, search space configuration section 103 configures a search space in the PDCCH region (C-SS or UE-SS) and a search space (C-SS or UE-SS) in the R-PDCCH region respectively. In this case, search space configuration section 103 configures search spaces for each terminal so that the ratio of DCI allocation region candidates in the R-PDCCH region to the DCI allocation region candidates in the PDCCH region is greater in a terminal for which a DM-RS is indicated as a reference signal for demodulation in the R-PDCCH region (terminal using DM-RSs in the R-PDCCH region) than in a terminal for which a CRS is indicated as a reference signal for demodulation in the R-PDCCH region (terminal using CRSs in the R-PDCCH region).

When using only an R-PDCCH region as a region for transmitting a PDCCH to terminal 200, search space configuration section 103 configures search spaces (C-SS and UE-SS) of terminal 200 in the PDCCH region.

Figure 9A:
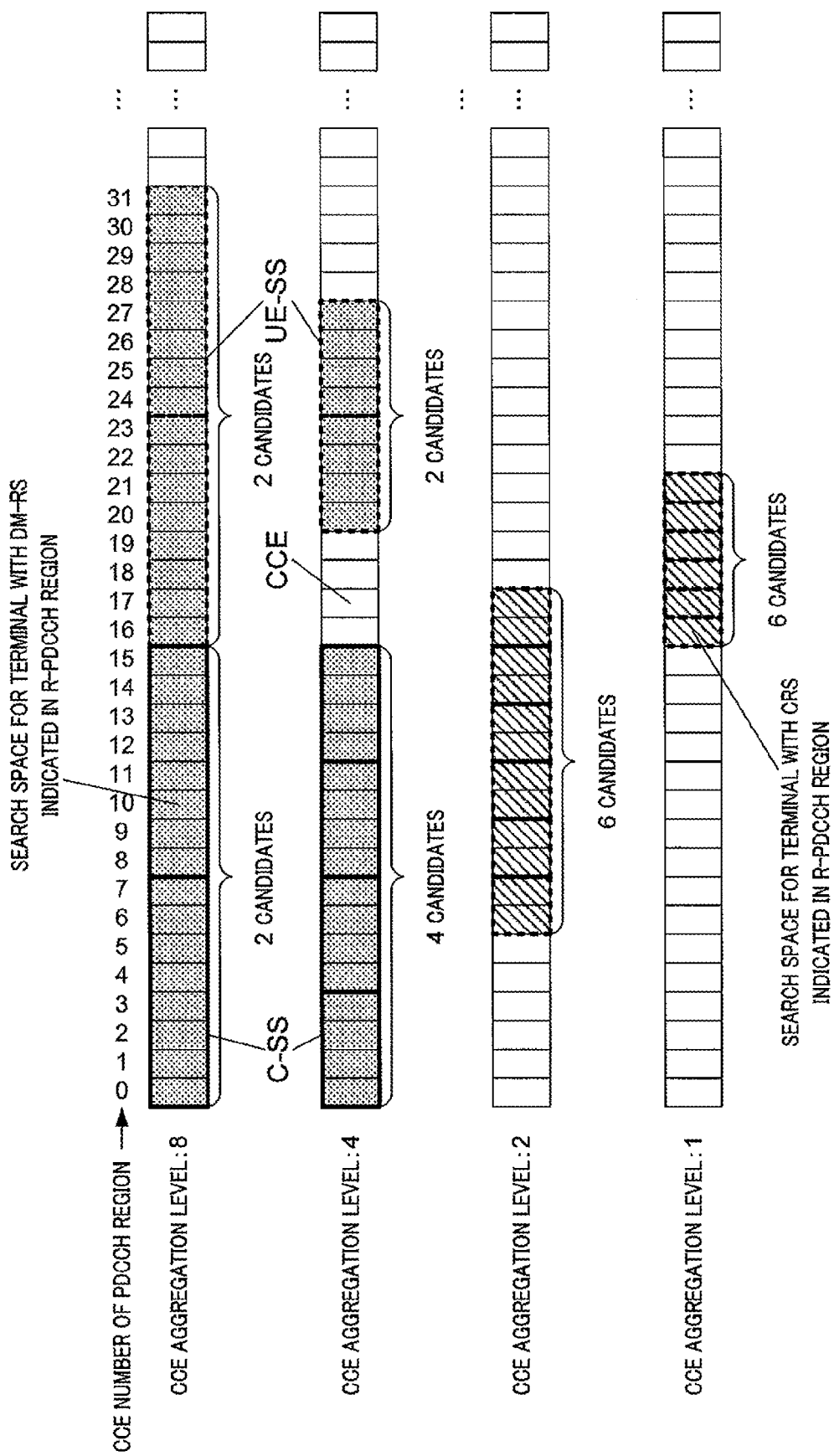
FIG. 9A is a diagram illustrating an example of search space configuration in a PDCCH region according to Embodiment 1 of the present invention.

For example, as shown in FIG. 9A, for a certain terminal using CRSs in the R-PDCCH region, search space configuration section 103 configures UE-SSs of 12 candidates in total in the PDCCH region; 6 candidates of CCE aggregation level 2 and 6 candidates of CCE aggregation level 1. Furthermore, as shown in FIG. 9B, for a certain terminal using CRSs in the R-PDCCH region, search space configuration section 103 configures C-SSs of 6 candidates in total in the R-PDCCH region; 2 candidates of CCE aggregation level 8 and 4 candidates of CCE aggregation level 4, and UE-SSs of 4 candidates in total; 2 candidates of CCE aggregation level 8 and 2 candidates of CCE aggregation level 4. Here, as shown in FIG. 10, if the number of DCI allocation region candidates in the PDCCH region for a terminal using CRSs in the R-PDCCH region is assumed to be $N_A$ and the number of DCI allocation region candidates in the R-PDCCH region is assumed to be $N_B$, $N_A=12$ and $N_B=10$ in FIG. 9A and FIG. 9B respectively.

On the other hand, as shown in FIG. 9A, for a certain terminal using DM-RSs in an R-PDCCH region, search space configuration section 103 configures C-SSs of 6 candidates in total in a PDCCH region; 2 candidates of CCE aggregation level 8 and 4 candidates of CCE aggregation level 4, and configures UE-SSs of 4 candidates in total; 2 candidates of CCE aggregation level 8 and 2 candidates of CCE aggregation level 4. Furthermore, as shown in FIG. 9B, for a certain terminal using DM-RSs in an R-PDCCH region, search space configuration section 103 configures UE-SSs of 12 candidates in total in an R-PDCCH region; 6 candidates of CCE aggregation level 2 and 6 candidates of CCE aggregation level 1. Here, as shown in FIG. 10, if the number of DCI allocation region candidates in a PDCCH region for a terminal using DM-RSs in the R-PDCCH region is assumed to be $N_C$ and the number of DCI allocation region candidates in the R-PDCCH region is assumed to be $N_D$, then $N_C=10$ and $N_D=12$ in FIG. 9A and FIG. 9B respectively.

That is, search space configuration section 103 configures search spaces (C-SS and UE-SS) so that a ratio of the number of DCI allocation region candidates $N_D$ in the R-PDCCH region to the number of DCI allocation region candidates $N_C$ in the PDCCH region ($N_D/N_C$) in terminal 200 using DM-RSs in the R-PDCCH region is equal to or above a ratio of the number of DCI allocation region candidates $N_B$ in the R-PDCCH region to the number of DCI allocation region candidates $N_A$ in the PDCCH region ($N_B/N_A$) in terminal 200 using CRSs in the R-PDCCH region. That is, search space configuration section 103 configures the allocation of search spaces between the PDCCH region and R-PDCCH region so as to satisfy ($N_B/N_A \leq N_D/N_C$).

In other words, the ratio of the number of blind decoding region candidates $N_D$ in the R-PDCCH region to the number of blind decoding region candidates $N_C$ in the PDCCH region ($N_D/N_C$) in terminal 200 using DM-RSs in the R-PDCCH region is equal to or above the ratio of the number of blind decoding region candidates $N_B$ in the R-PDCCH region to the number of blind decoding region candidates $N_A$ in the PDCCH region ($N_B/N_A$) in terminal 200 using CRSs in the R-PDCCH region.

Allocating section 106 then allocates DCI containing allocation control information to CCEs in C-SSs or UE-SSs shown in FIG. 9A and FIG. 9B.

To be more specific, allocating section 106 allocates DCI containing allocation control information for common channels (e.g., DCI 1C and 1A) to CCEs in C-SSs shown in FIG. 9A and FIG. 9B. Furthermore, allocating section 106 allocates DCI containing allocation control information for the allocation of data common to all the terminals (e.g., DCI 0/1A) to CCEs in CSSs or CCEs in UE-SSs shown in FIG. 9A and FIG. 9B. Furthermore, allocating section 106 allocates DCI containing allocation control information dependent on the transmission mode configured in the terminal (e.g., uplink (DCI 0A, 0B and 4) and downlink (DCI 1, 1B, 1D, 2, 2A, 2B and 2C)) to CCEs in UE-SSs shown in FIG. 9A and FIG. 9B.

In contrast, in terminal 200, PDCCH receiving section 207 blind-decodes DCI containing allocation control information for common channels (e.g., DCI 1C and 1A) and DCI containing allocation control information for the allocation of data common to all the terminals (e.g., DCI 0/1A) for C-SSs shown in FIG. 9A and FIG. 9B. Furthermore, for UE-SSs shown in FIG. 9A and FIG. 9B, PDCCH receiving section 207 blind-decodes DCI containing allocation control information for the allocation of data common to all the terminals (e.g., DCI 0/1A) and DCI containing allocation control information dependent on the transmission mode (e.g., uplink (DCI 0A, 0B and 4), downlink (DCI 1, 1B, 1D, 2, 2A, 2B and 2C)) configured for terminal 200.

That is, terminal 200 performs blind decoding on two DCI formats (DCI 1C, 1A and DCI 0/1A) for C-SSs. On the other hand, terminal 200 performs blind decoding on three DCI formats (DCI dependent on the uplink transmission mode (DCI 0A, 0B and 4), DCI dependent on the downlink transmission mode (DCI 1, 1B, 1D, 2, 2A, 2B and 2C) and DCI 0/1A) for UE-SSs.

Blind decoding in terminal 200 described above is summarized as follows: 36 (=12 candidates×3 DCI formats) blind decoding operations in total are performed for UE-SSs of 12 candidates in a PDCCH region (FIG. 9A) for a terminal using CRSs in the R-PDCCH region. Furthermore, 12 (=6 candidates×2 DCI formats) blind decoding operations in total are performed for C-SSs of 6 candidates and 12 (=4 candidates×3 DCI formats) blind decoding operations in total are performed for UE-SSs of 4 candidates in the R-PDCCH region (FIG. 9B).

Furthermore, a terminal using DM-RSs in the R-PDCCH region performs 12 (=6 candidates×2 DCI formats) blind decoding operations in total for C-SSs of 6 candidates in the PDCCH region (FIG. 9A) and 12 (=4 candidates×3 DCI formats) blind decoding operations in total for UE-SSs of 4 candidates. Furthermore, the terminal performs 36 (=12 candidates×3 DCI formats) blind decoding operations for UE-SSs of 12 candidates in the R-PDCCH region (FIG. 9B).

That is, the ratio of the number of blind decoding operations in the R-PDCCH region to the number of blind decoding operations in the PDCCH region of the terminal using DM-RSs in the R-PDCCH region is greater than that of the terminal using CRSs in the R-PDCCH region. To be more specific, in terminal 200, the ratio (36/24) of the number of blind decoding operations in the R-PDCCH region (36 in FIG. 9B) to the number of blind decoding operations in the PDCCH region (24 in FIG. 9A) in terminal 200 using DM-RSs in the R-PDCCH region is equal to or greater than the ratio (24/36) of the number of blind decoding operations in the R-PDCCH region (24 in FIG. 9B) to the number of blind decoding operations in the PDCCH region (36 in FIG. 9A) in terminal 200 using CRSs in the R-PDCCH region.

Thus, more DCI allocation region candidates (blind decoding region candidates) are more likely to be configured in an R-PDCCH region for a terminal using DM-RSs in the R-PDCCH region than a terminal using CRSs in the R-PDCCH region. That is, with the terminal using DM-RSs in the R-PDCCH region, DCI is more likely to be allocated to the R-PDCCH region.

Here, as shown in FIG. 3, use of DM-RSs is effective for a terminal located at a cell edge or a terminal whose received signal level is low. That is, base station 100 is more likely to instruct terminal 200 located at a cell edge and receiving large interference from other cells (other cell interference) (or terminal 200 whose received signal level is low) to use DM-RSs in the R-PDCCH region.

Furthermore, an R-PDCCH region is more likely to be able to reduce other cell interference than a PDCCH region through, for example, interference control.

Thus, base station 100 configures search spaces so that DCI is more likely to be allocated to a terminal using DM-RSs (e.g., terminal 200 located near a cell edge) in an R-PDCCH region. In this way, the terminal using DM-RSs achieves an effect of improving received signal power of a PDCCH using DM-RSs (see FIG. 3) while reducing influences of other cell interference, and can thereby secure desired receiving quality.

Here, for example, base station 100 allocates data for a terminal using CRSs in an R-PDCCH region within a search space using relatively more CCEs in a PDCCH region (that satisfies, for example, $N_B \geq N_A$) so as to satisfy a relationship of $(N_B/N_A \leq N_D/N_C)$. On the other hand, base station 100 allocates data for a terminal using DM-RSs in an R-PDCCH region within a search space using relatively more CCEs in an R-PDCCH region (that satisfies, for example, $N_C \leq N_D$).

This makes it possible to achieve a load balance of PDCCHs to which control information for each terminal is allocated, that is, to uniformly map PDCCHs onto a PDCCH region and an R-PDCCH region. That is, it is possible to avoid cases where PDCCHs cannot be transmitted within a limited region because PDCCHs are biased to a specific region. Thus, it is possible to prevent one of the PDCCH region and R-PDCCH region from becoming tight as the number of communicating terminals increases. Furthermore, preventing the R-PDCCH region from becoming tight makes it possible to avoid an adverse influence of data allocation on a relay station (a terminal under the control of a relay station) and prevent the PDSCH region from becoming tight. This prevents system throughput from deteriorating.

Furthermore, each terminal moves in a cell covered by base station 100. For example, in a cell covered by base station 100, there are terminals in a variety of situations such as a terminal moving fast, terminal moving slowly, terminal located near a cell edge or terminal located near the center of the cell. For such terminals, base station 100 may use a PDCCH region or R-PDCCH region using CRSs (reference signals with which a frequency diversity effect can be achieved) for DCI for the terminal moving fast (whose received signal level fluctuates violently). Furthermore, base station 100 may use an R-PDCCH region using DM-RSs (reference signals with which received signal power can be improved) for DCI for the terminal located near a cell edge (whose received signal level is low). That is, using a PDCCH region and an R-PDCCH region as the PDCCH transmission region, base station 100 can configure search spaces capable of securing desired receiving quality regardless of the moving speed or location area or the like of a terminal.

Thus, base station 100 determines which region (PDCCH region or R-PDCCH region) is used to transmit DCI in consideration of the situation of each terminal (e.g., position of the terminal, scale of other cell interference, traffic situation (e.g., "the PDCCH region becomes tight as the number of communicating terminals increases") or the like). Furthermore, when allocating DCI for a terminal to an R-PDCCH region, base station 100 configures one of CRS and DM-RS as a reference signal for demodulation in the R-PDCCH region. In this case, base station 100 configures search spaces in the PDCCH region and R-PDCCH region so as to satisfy the above-described relationship of $(N_B/N_A \leq N_D/N_C)$.

Thus, it is possible to prevent throughput deterioration in the entire system caused by the PDCCH region or R-PDCCH region becoming tight. Furthermore, each terminal can receive DCI using a resource (transmission region of a PDCCH) suited to the situation of each terminal and secure desired receiving quality in the terminal.

Therefore, according to the present embodiment, even when DCI for a terminal connected to a base station is allocated to a PDCCH region and an R-PDCCH region, it is possible to secure desired receiving quality in the terminal without causing system throughput to deteriorate.

In the present embodiment, when a terminal using CRSs in an R-PDCCH region and a terminal using DM-RSs in an R-PDCCH region coexist, base station 100 configures search spaces in the PDCCH region and R-PDCCH region so as to satisfy the aforementioned relationship of $(N_B/N_A \leq N_D/N_C)$. However, when a terminal using CRSs in an R-PDCCH region and a terminal using DM-RSs in an R-PDCCH region coexist, base station 100 may also cause the number of DCI allocation region candidates (number of blind decoding region candidates) $N_B$ in the R-PDCCH region for a terminal using CRSs in the R-PDCCH region to be equal to or below the number of DCI allocation region candidates (number of blind decoding region candidates) $N_D$ ($N_B \leq N_D$) in the R-PDCCH region for a terminal using DM-RSs in the R-PDCCH region. Here, if the number of DCI allocation region candidates contained in a search space configured for each terminal is assumed to be constant (e.g., 22 candidates in FIG. 9A and FIG. 9B), satisfying the relationship of $(N_B \leq N_D)$ is equivalent to satisfying the relationship of $(N_B/N_A \leq N_D/N_C)$ as in the case of the present embodiment.

Similarly, base station 100 may also cause the number of DCI allocation region candidates (number of blind decoding region candidates) $N_A$ in the PDCCH region for a terminal using CRSs in the R-PDCCH region to be equal to or above the number of DCI allocation region candidates (number of blind decoding region candidates) $N_C$ ($N_A \geq N_C$) in the PDCCH region for a terminal using DM-RSs in the R-PDCCH region. In this case, if the number of DCI allocation region candidates contained in a search space configured for each terminal is also assumed to be constant (e.g., 22 candidates in FIG. 9A and FIG. 9B), satisfying the relationship of $(N_A \geq N_C)$ is equivalent to satisfying the relationship of $(N_B/N_A \leq N_D/N_C)$ as in the case of the present embodiment.

Alternatively, in the present embodiment, base station 100 may also configure search spaces of each terminal so as to satisfy the relationship of $(N_A \geq N_C)$ and satisfy the relationship of $(N_B \leq N_D)$ at the same time. At this time, the ratio between $N_A$ and $N_B$, and the ratio between $N_C$ and $N_D$ can take any value. For example, the ratio between $N_C$ and $N_D$ ($N_C:N_D$) may be $N_C:N_D=12:10$ or $N_C:N_D=10:12$.

Alternatively, in the present embodiment, base station 100 may also dispose C-SSs in a PDCCH region and dispose UE-SSs in an R-PDCCH region, for example, so as to satisfy the relationship of $(N_A \geq N_C)$ and the relationship of $(N_B \leq N_D)$ at the same time.

For example, base station 100 configures search spaces as shown in FIG. 9A and FIG. 9B, resulting in $N_A=12$, $N_B=10$, $N_C=10$ and $N_D=12$, which satisfies $(N_A \geq N_C)$ and $(N_B \leq N_D)$.

That is, base station 100 configures search spaces so that in the R-PDCCH region, the number of DCI allocation region candidates (number of blind decoding region candidates) $N_D$ for a terminal using DM-RSs is greater than the number of DCI allocation region candidates (number of blind decoding region candidates) $N_B$ for a terminal using CRSs. As in the case of the present embodiment, it is possible for a terminal using DM-RSs to obtain an effect of improving received signal power of a PDCCH using DM-RSs (see FIG. 3) while suppressing influences of other cell interference.

Furthermore, when $(N_A \geq N_C)$ and $(N_B \leq N_D)$ are satisfied, the number of DCI allocation region candidates (number of blind decoding region candidates) $N_B$ for a terminal using CRSs becomes smaller than the number of DCI allocation region candidates (number of blind decoding region candidates) $N_D$ for a terminal using DM-RSs in the R-PDCCH region, whereas in the PDCCH region, the number of DCI allocation region candidates (number of blind decoding region candidates) $N_A$ for a terminal using CRSs becomes greater than the number of DCI allocation region candidates (number of blind decoding region candidates) $N_C$ for a terminal using DM-RSs. This makes it possible to maintain a load balance of PDCCHs in the PDCCH region and R-PDCCH region as a whole.

Embodiment 2

A case has been described in Embodiment 1 where a terminal using CRSs and a terminal using DM-RSs coexist in an R-PDCCH region. In contrast, a case will be described in the present embodiment where reference signals used for each terminal are fixedly configured in an R-PDCCH region.

Hereinafter, search space configuration methods 1 to 3 according to the present embodiment will be described more specifically.

Since the basic configurations of a base station and a terminal according to the present embodiment are common to those in Embodiment 1, these configurations will be described using FIG. 6 and FIG. 8.

In the following description, as in the case of Embodiment 1, 6 DCI allocation region candidates (that is, blind decoding region candidates) in total are configured as C-SSs; 4 candidate (16 CCEs) for CCE aggregation level 4 and 2 candidates (16 CCEs) for CCE aggregation level 8. Furthermore, 16 DCI allocation region candidates (that is, blind decoding region candidates) in total are configured as UE-SSs; 6 candidates (6 CCEs), 6 candidates (12 CCEs), 2 candidates (8 CCEs), 2 candidates (16 CCEs) corresponding to CCE aggregation levels 1, 2, 4 and 8 respectively. That is, search spaces (C-SS and UE-SS) composed of 22 DCI allocation region candidates in total (that is, blind decoding region candidates) are configured for each terminal.

Furthermore, as in the case of Embodiment 1, for C-SSs, terminal 200 (PDCCH receiving section 207) performs blind decoding for two DCI formats; DCI containing allocation control information for common channels (e.g., DCI 1C and 1A) and DCI containing allocation control information for the allocation of data common to all the terminals (e.g., DCI 0/1A). For UE-SSs, terminal 200 (PDCCH receiving section 207) performs blind decoding for three DCI formats; DCI containing allocation control information for the allocation of data common to all the terminals (for example, DCI 0/1A), DCI containing allocation control information dependent on the transmission mode configured for terminal 200 (for example, uplink (DCI 0A, 0B and 4), and downlink (DCI 1, 1B, 1D, 2, 2A, 2B and 2C)).

Furthermore, as in the case of Embodiment 1, as shown in FIG. 10, the number of DCI allocation region candidates (number of blind decoding region candidates) in a PDCCH region for a terminal using CRSs in an R-PDCCH region is assumed to be $N_A$ and the number of DCI allocation region candidates (number of blind decoding region candidates) in an R-PDCCH region is assumed to be $N_B$. Furthermore, as shown in FIG. 10, the number of DCI allocation region candidates (number of blind decoding region candidates) in a PDCCH region for a terminal using DM-RSs in an R-PDCCH region is assumed to be $N_C$ and the number of DCI allocation region candidates (number of blind decoding region candidates) in an R-PDCCH region is assumed to be $N_D$.

<Configuration Method 1 (when Configuring Only CRSs in R-PDCCH Region)>

According to configuration method 1, search space configuration section 103 of base station 100 configures search spaces so that the number of DCI allocation region candidates (number of blind decoding region candidates) $N_B$ in R-PDCCH region becomes equal to or above the number of DCI allocation region candidates (number of blind decoding region candidates) $N_A$ in a PDCCH region $(N_A \leq N_B)$.

For example, as shown in FIG. 11, for a certain terminal, search space configuration section 103 configures C-SSs of 6 candidates in total in a PDCCH region; 2 candidates of CCE aggregation level 8 and 4 candidates of CCE aggregation level 4 and configures UE-SSs of 4 candidates in total; 2 candidates of CCE aggregation level 8 and 2 candidates of CCE aggregation level 4. Furthermore, as shown in FIG. 11, for a certain terminal, search space configuration section 103 configures UE-SSs of 12 candidates in total in an R-PDCCH region; 6 candidates of CCE aggregation level 2 and 6 candidate of CCE aggregation level 1. Thus, the number of DCI allocation region candidates (number of blind decoding region candidates) $N_A$ in the PDCCH region shown in FIG. 11 is 10 and the number of DCI allocation region candidates (number of blind decoding region candidates) $N_B$ in the R-PDCCH region is 12. That is, in FIG. 11, the relationship of $(N_A \leq N_B)$ is satisfied.

In contrast, PDCCH receiving section 207 of terminal 200 blind-decodes DCI for the C-SSs and UE-SSs shown in FIG. 11 according to search space region information inputted from configuration information receiving section 206. In FIG. 11, PDCCH receiving section 207 blind decodes for only C-SSs of CCE aggregation levels 4 and 8 and for only UE-SSs of CCE aggregation levels 4 and 8 in the PDCCH region, and blind decodes for only UE-SSs of CCE aggregation levels 1 and 2 in the R-PDCCH region.

That is, PDCCH receiving section 207 performs 12 (=6 candidates×2 types) blind decoding operations for C-SSs configured for the PDCCH region shown in FIG. 11 and performs 12 (=4 candidates×3 types) blind decoding operations for UE-SSs configured for the PDCCH region shown in FIG. 11. On the other hand, PDCCH receiving section 207 performs 36 (=12 candidates×3 types) blind decoding operations for UE-SSs configured for the R-PDCCH region shown in FIG. 11.

That is, in FIG. 11, the number of blind decoding operations (36 operations) in the R-PDCCH region is greater than the number of blind decoding operations (24 operations) in the PDCCH region.

Here, according to configuration method 1, the same reference signal (CRS) is used for terminal 200 in both the PDCCH region and R-PDCCH region. That is, there is no difference in reference signals used in the PDCCH region and R-PDCCH region for terminal 200 for which the search spaces shown in FIG. 11 are configured. On the other hand, as described above, other cell interference is more likely to be reduced in the R-PDCCH region than in the PDCCH region.

Therefore, as shown in FIG. 11, base station 100 configures search spaces so that the number of DCI allocation region candidates (number of blind decoding region candidates) $N_B$ in the R-PDCCH region is greater than the number of DCI allocation region candidates (number of blind decoding region candidates) $N_A$ in the PDCCH region ($N_A \leq N_B$), and terminal 200 is thereby more likely to be able to receive control information allocated to terminal 200 in the R-PDCCH region where other cell interference is more likely to be reduced.

Furthermore, as shown in FIG. 11, by using the PDCCH region and R-PDCCH region as PDCCH transmission regions for terminal 200, base station 100 can select a transmission region to transmit DCI depending on the moving speed (high-speed or low-speed) of terminal 200 or the location area (center of the cell or cell edge) of terminal 200. That is, base station 100 can configure search spaces capable of securing desired receiving quality regardless of the moving speed or location area or the like of the terminal.

Thus, according to configuration method 1, when DCI for a terminal connected to a base station is allocated to a PDCCH region and an R-PDCCH region, it is possible to secure desired receiving quality in the terminal by further reducing the possibility of receiving other cell interference. Furthermore, robust PDCCH reception performance can be secured depending on the situation of the terminal.

Configuration method 1 may satisfy not only the configuration of search spaces (allocation of search spaces) shown in FIG. 11 but also the relationship of ($N_A \leq N_B$). For example, UE-SSs of 10 candidates (e.g., 10 candidates in total of CCE aggregation levels 2, 4 and 8 among 16 candidates) may be configured in the PDCCH region ($N_A$=10) and C-SSs of 6 candidates and UE-SSs of 6 candidates (6 candidates of CCE aggregation level 1); 12 candidates in total, may be configured in the R-PDCCH region ($N_B$=12). Alternatively, C-SSs of 6 candidates may be configured in the PDCCH region ($N_A$=6) and UE-SSs of 16 candidates (16 candidates in total of CCE aggregation levels 1, 2, 4 and 8) may be configured in the R-PDCCH region ($N_B$=16).

<Configuration Method 2 (when Configuring Only DM-RSs in R-PDCCH Region)>

According to configuration method 2, search space configuration section 103 of base station 100 configures search spaces so that the number of DCI allocation region candidates (number of blind decoding region candidates) $N_D$ in an R-PDCCH region is equal to or above the number of DCI allocation region candidates (number of blind decoding region candidates) $N_C$ in a PDCCH region ($N_C \leq N_D$).

For example, as in the case of configuration method 1, as shown in FIG. 11, for a certain terminal, search space configuration section 103 configures C-SSs of 6 candidates in total in the PDCCH region; 2 candidates of CCE aggregation level 8 and 4 candidates of CCE aggregation level 4, and configures UE-SSs of 4 candidates in total; 2 candidates of CCE aggregation level 8 and 2 candidates of CCE aggregation level 4. Furthermore, as shown in FIG. 11, for a certain terminal, search space configuration section 103 configures UE-SSs of 12 candidates in total in the R-PDCCH region; 6 candidates of CCE aggregation level 2 and 6 candidates of CCE aggregation level 1. Thus, the number of DCI allocation region candidates (number of blind decoding region candidates) $N_C$ in the PDCCH region shown in FIG. 11 is 10, and the number of DCI allocation region candidates (number of blind decoding region candidates) $N_D$ in the R-PDCCH region is 12. That is, in FIG. 11, the relationship of ($N_C \leq N_D$) is satisfied.

In contrast, PDCCH receiving section 207 of terminal 200 blind-decodes DCI for the C-SSs and UE-SSs shown in FIG. 11 according to search space region information inputted from configuration information receiving section 206. In FIG. 11, PDCCH receiving section 207 performs blind decoding only for C-SSs of CCE aggregation levels 4 and 8 and for UE-SSs of CCE aggregation levels 4 and 8 in the PDCCH region, and performs blind decoding only for UE-SSs of CCE aggregation levels 1 and 2 in the R-PDCCH region.

That is, as in the case of configuration method 1, PDCCH receiving section 207 performs 12 (=6 candidates×2 types) blind decoding operations for C-SSs configured in the PDCCH region shown in FIG. 11 and performs 12 (=4 candidates×3 types) blind decoding operations for UE-SSs. Furthermore, as in the case of configuration method 1, PDCCH receiving section 207 performs 36 (=12 candidates×3 types) blind decoding operations for UE-SSs configured in the R-PDCCH region shown in FIG. 11.

That is, in FIG. 11, the number of blind decoding operations (36 operations) in the R-PDCCH region is greater than the number of blind decoding operations (24 operations) in the PDCCH region.

Here, according to configuration method 2, CRSs are used in the PDCCH region and DM-RSs are used in the R-PDCCH region for terminal 200. Furthermore, as described above, use of DM-RSs is effective for a terminal located at a cell edge or the like or a terminal whose received signal level is low. Furthermore, the R-PDCCH region is more likely to be able to reduce other cell interference through interference control or the like than the PDCCH region.

Thus, by making the number of blind decoding region candidates $N_D$ in the R-PDCCH region greater than the number of blind decoding region candidates $N_C$ in the PDCCH region ($N_C \leq N_D$), terminal 200 using DM-RSs can obtain an effect of improving received signal power of a PDCCH using DM-RSs (see FIG. 3) while suppressing influences of other cell interference in the R-PDCCH region. Thus, desired receiving quality in terminal 200 can be secured.

Furthermore, as shown in FIG. 11, by using the PDCCH region and R-PDCCH region as PDCCH transmission regions for terminal 200, base station 100 can select a transmission region using an appropriate reference signal (CRS or DM-RS) to transmit DCI depending on the moving speed (high-speed or low-speed) of terminal 200 or the location area (center of the cell or cell edge) of terminal 200. That is, base station 100 can configure search spaces capable of securing desired receiving quality regardless of the moving speed or location area or the like of the terminal.

Thus, according to configuration method 2, when DCI for a terminal connected to a base station is allocated to a PDCCH region and an R-PDCCH region, it is also possible to secure desired receiving quality in the terminal by further reducing the possibility of receiving other cell interference. Furthermore, robust PDCCH reception performance can be secured depending on the situation of the terminal.

A case has been described in configuration method 2 where only DM-RSs are configured in the R-PDCCH region. However, configuration method 2 is likewise applicable to a case where DM-RSs are indicated in a terminal in which CRSs or DM-RSs may be indicated in the R-PDCCH region.

At this time, in the case where CRSs are indicated in a terminal in which CRSs or DM-RSs may be indicated in the R-PDCCH region, search space configuration section 103 of base station 100 may configure search spaces so that the number of DCI allocation region candidates (number of blind decoding region candidates) $N_A$ in the PDCCH region becomes equal to or above the number of DCI allocation region candidates (number of blind decoding region candidates) $N_B$ in the R-PDCCH region ($N_A \geq N_B$). For example, for a certain terminal using CRSs in the R-PDCCH region, search space configuration section 103 configures UE-SSs of 12 candidates in total in the PDCCH region; 6 candidates of CCE aggregation level 2 and 6 candidates of CCE aggregation level 1 ($N_A$=12). Furthermore, in the R-PDCCH region, search space configuration section 103 configures C-SSs of 6 candidates in total; 2 candidates of CCE aggregation level 8 and 4 candidates of CCE aggregation level 4, and UE-SSs of 4 candidates in total; 2 candidates of CCE aggregation level 8 and 2 candidates of CCE aggregation level 4 ($N_B$=10).

In contrast, PDCCH receiving section 207 of terminal 200 performs 36 (=12 candidates×3 types) blind decoding operations for UE-SSs in the PDCCH region. Furthermore, PDCCH receiving section 207 performs 12 (=6 candidate×2 types) blind decoding operations for C-SSs in the R-PDCCH region and performs 12 (=4 candidates×3 types) blind decoding operations for UE-SSs. Thus, the number of blind decoding operations (36 operations) in the PDCCH region is greater than the number of blind decoding operations (24 operations) in the R-PDCCH region.

Thus, as described above, it is possible to secure desired receiving quality for a terminal using DM-RSs and maintain a load balance of PDCCHs in the PDCCH region and the R-PDCCH region as a whole.

<Configuration Method 3 (when Configuring Only DM-RSs in R-PDCCH Region)>

According to configuration method 3, search space configuration section 103 of base station 100 configures C-SSs only in a PDCCH region.

For example, for a certain terminal, search space configuration section 103 configures C-SSs of 6 candidates in total in the PDCCH region; 2 candidates of CCE aggregation level 8 and 4 candidates of CCE aggregation level 4. On the other hand, for a certain terminal, search space configuration section 103 arbitrarily configures 6 candidates, 6 candidates, 2 candidates and 2 candidates of CCE aggregation levels 1, 2, 4 and 8 respectively which are UE-SSs in the PDCCH region and R-PDCCH region.

That is, search space configuration section 103 configures C-SSs of 6 candidates in the PDCCH region and UE-SSs of ($N_C$-6) candidates and configures only UE-SSs of $N_D$ candidates in the R-PDCCH region. In this case, the relationship of ($N_C \leq N_D$) may be satisfied as in the case of configuration method 2, for example.

Thus, PDCCH receiving section 207 of terminal 200 performs 12 (=6 candidates×2 types) blind decoding operations for C-SSs in the PDCCH region and (($N_C$-12) candidates×3 types) blind decoding operations for UE-SSs. On the other hand, PDCCH receiving section 207 performs 0 blind decoding operations (no blind decoding operations) for C-SSs in the R-PDCCH region and performs ($N_D$ candidate×3 types) blind decoding operations for UE-SSs.

Here, as shown in FIG. 3, precoding is not applied to reference signals and data signals in the transmission region using CRSs, whereas precoding is applied to reference signals and data signals in the transmission region using DM-RSs (here, R-PDCCH region). Therefore, for example, when C-SSs are configured in the R-PDCCH region using DM-RSs, precoding is also applied to the C-SSs with a transmission weight optimized for a certain terminal. For this reason, there may be cases where other terminals cannot receive DCI allocated to CCEs in a C-SS.

In contrast, according to configuration method 3, search space configuration section 103 configures C-SSs only in a PDCCH region where only CRSs (reference signals without precoding) are used, and all the terminals can receive DCI allocated to CCEs in the C-SS.

Thus, according to configuration method 3, PDCCH reception performance in C-SSs for all the terminals can be secured.

A case has been described in configuration method 3 where only DM-RSs are configured in the R-PDCCH region. However, configuration method 3 is likewise applicable to a case where DM-RSs are indicated in a terminal in which CRSs or DM-RSs may be indicated in the R-PDCCH region. In this case, the relationship of ($N_B/N_A \leq N_D/N_C$) may be satisfied as in the case of Embodiment 1.

Search space configuration methods 1 to 3 according to the present embodiment have been described so far.

Thus, according to the present embodiment, when DCI for a terminal connected to a base station is mapped onto a PDCCH region and an R-PDCCH region, even when reference signals used for each terminal are fixedly configured in the R-PDCCH region, desired receiving quality for the terminal can be secured in the PDCCH region or R-PDCCH region.

Embodiment 3

The present embodiment will describe a case where search spaces are configured for each DCI format.

Since basic configurations of a base station and a terminal according to the present embodiment are common to those in Embodiment 1, these configurations will be described using FIG. 6 and FIG. 8.

Furthermore, in the following description as in the case of Embodiment 1, 6 DCI allocation region candidates (that is, blind decoding region candidates) in total are configured as C-SSs; 4 candidates (16 CCEs) for CCE aggregation level 4 and 2 candidates (16 CCEs) for CCE aggregation level 8. Furthermore, 16 DCI allocation region candidates (that is, blind decoding region candidates) in total are configured as UE-SSs; 6 candidates (6 CCEs), 6 candidates (12 CCEs), 2 candidates (8 CCEs) and 2 candidates (16 CCEs) for CCE aggregation levels 1, 2, 4 and 8 respectively. That is, search spaces (C-SS and UE-SS) composed of 22 DCI allocation region candidates in total (that is, blind decoding region candidates) are configured for each terminal.

Furthermore, as in the case of Embodiment 1, terminal 200 (PDCCH receiving section 207) performs blind decoding for C-SSs in two DCI formats; DCI containing allocation control information for common channels (e.g., DCI 1C and 1A) and DCI containing allocation control information for the allocation of data common to all the terminals (e.g., DCI 0/1A). Terminal 200 (PDCCH receiving section 207) performs blind decoding for UE-SSs in three DCI formats; DCI containing allocation control information for the allocation of data common to all the terminals (for example, DCI 0/1A), and DCI containing allocation control information dependent on the transmission mode configured for terminal 200 (for example, uplink (DCI 0A, 0B and 4), and downlink (DCI 1, 1B, 1D, 2, 2A, 2B and 2C)).

For example, when base station 100 configures only CRSs in an R-PDCCH region as in the case of configuration method 1 in Embodiment 2, a case will be described where base station 100 configures search spaces so that the number of DCI allocation region candidates (number of blind decoding region candidates) $N_B$ in the R-PDCCH region is equal to or above the number of DCI allocation region candidates (number of blind decoding region candidates) $N_A$ in the PDCCH region ($N_A \leq B_B$).

Figure 12A:
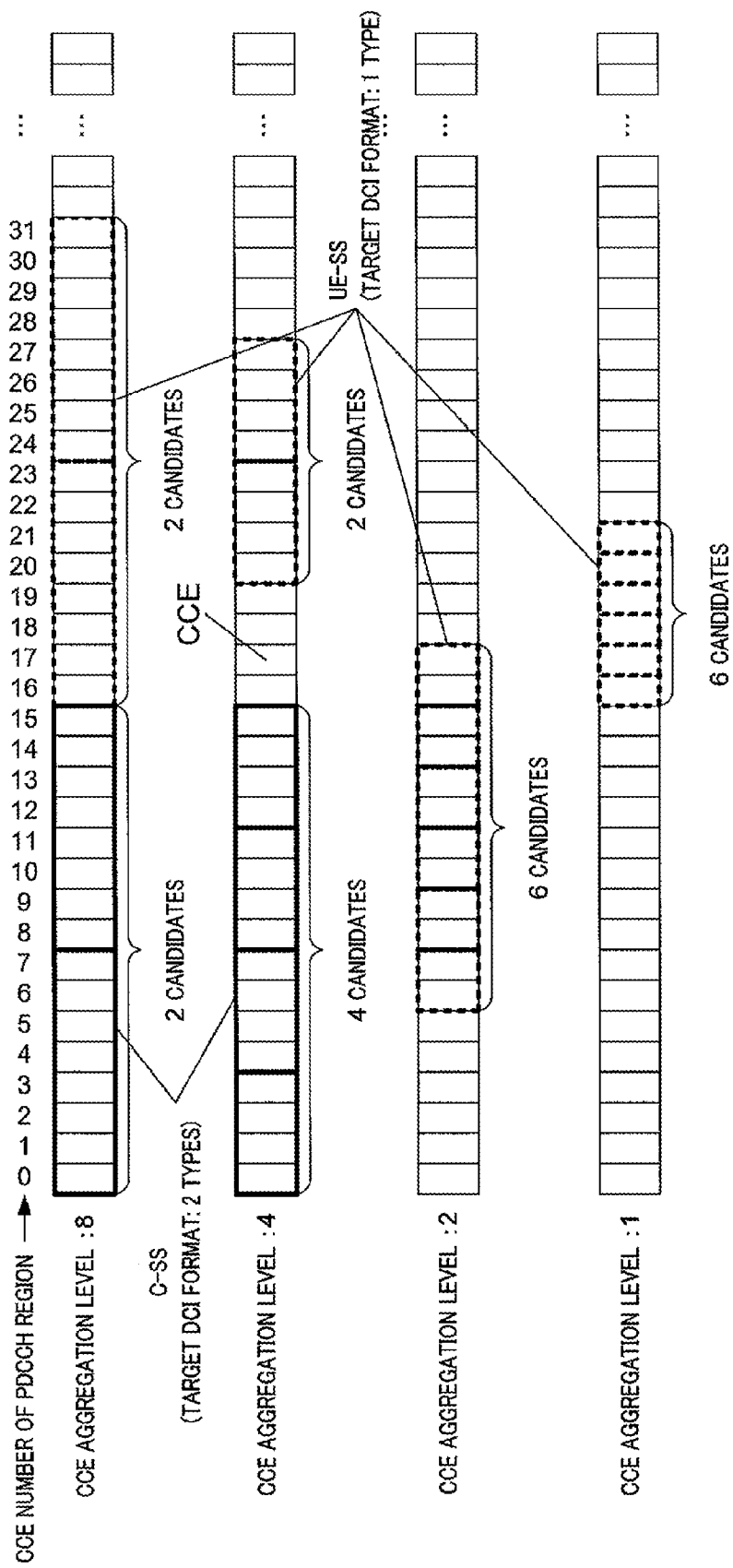
FIG. 12A is a diagram illustrating an example of search space configuration in a PDCCH region according to Embodiment 3 of the present invention.
Figure 12B:
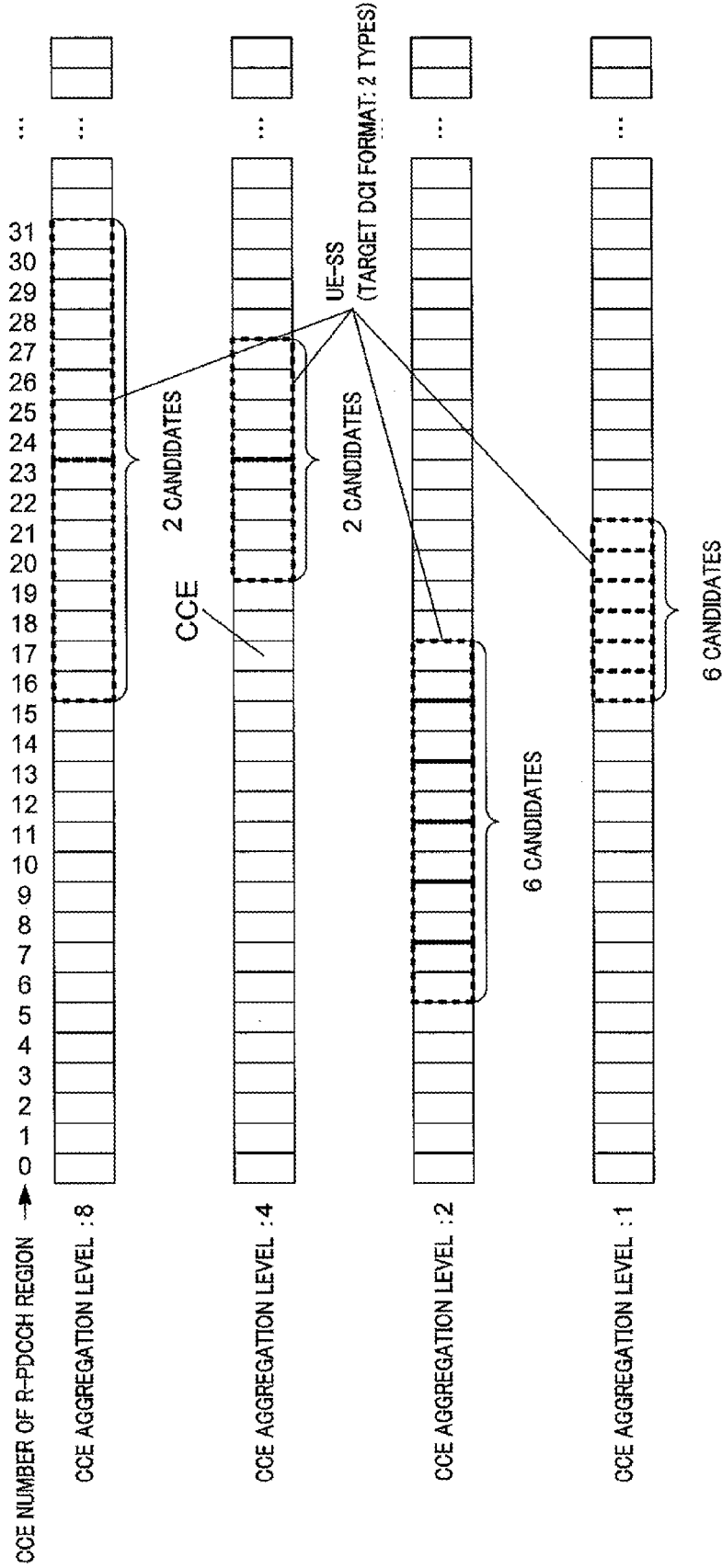
FIG. 12B is a diagram illustrating an example of search space configuration in an R-PDCCH region according to Embodiment 3 of the present invention.

In this case, as shown in FIG. 12A, in a PDCCH region for a certain terminal, search space configuration section 103 configures C-SSs corresponding to two DCI formats (12 candidates (=6 candidates×2 types)) and configures UE-SSs corresponding to one DCI format (16 candidates). Furthermore, as shown in FIG. 12B, in an R-PDCCH region for a certain terminal, search space configuration section 103 configures UE-SSs corresponding to two DCI formats (32 candidates (=16 candidates×2 types)). Therefore, in FIG. 12A and FIG. 12B, the number of DCI allocation region candidates (number of blind decoding region candidates) $N_B$ (=32) in the R-PDCCH region is greater than the number of DCI allocation region candidates (number of blind decoding region candidates) $N_A$ (=28) in the PDCCH region.

In contrast, PDCCH receiving section 207 of terminal 200 blind-decodes DCI for C-SSs and UE-SSs shown in FIG. 12A and FIG. 12B according to search space region information inputted from configuration information receiving section 206. To be more specific, PDCCH receiving section 207 performs 12 (=6 candidates×2 types) blind decoding operations for C-SSs in the PDCCH region shown in FIG. 12A and performs 16 (=16 candidates×1 types) blind decoding operations for UE-SSs. Thus, the number of blind decoding operations in the PDCCH region shown in FIG. 12A is 28.

Furthermore, PDCCH receiving section 207 blind-decodes UE-SSs corresponding to two DCI formats (16 candidates) in the R-PDCCH region shown in FIG. 12B.

That is, in FIG. 12A and FIG. 12B, the number of blind decoding operations (36 operations) in the R-PDCCH region is greater than the number of blind decoding operations (24 operations) in the PDCCH region.

That is, terminal 200 is more likely to be able to receive DCI for terminal 200 in an R-PDCCH region where other cell interference is more likely to be reduced. Thus, when DCI for a terminal connected to a base station is mapped onto a PDCCH region and an R-PDCCH region, the present embodiment further reduces the possibility of receiving other cell interference, and can thereby secure desired receiving quality in the terminal.

Furthermore, according to the present embodiment, the base station configures search spaces for each DCI format. The base station can configure search spaces for each DCI format in an appropriate transmission region of the PDCCH region or R-PDCCH region depending on features of each DCI format (e.g., usage frequency, receiving quality at a location where usage is anticipated). Thus, the terminal can receive DCI of each DCI format with desired receiving quality.

To be more specific, since the number of information bits of DCI 0/1A is smaller than the number of information bits of other DCI formats dependent on the transmission mode, if the same number of CCEs is configured, DCI 0/1A allows transmission with a lower coding rate than DCI 1, 1B, 1D, 2, 2A, 2B and 2C, 0A, 0B and 4. That is, when DCI 0/1A is configured by focusing on the fact that DCI 0/1A is a format less likely to be influenced by a propagation path situation than other DCI formats, the base station may configure DCI 0/1A in the PDCCH region, and configure DCI 0A, 0B and 4 dependent on the uplink transmission mode and DCI 1, 1B, 1D, 2, 2A, 2B and 2C dependent on the downlink transmission mode in the R-PDCCH region. That is, the base station configures a common DCI format with the small amount of information in the PDCCH region. This makes it possible to alleviate the tight condition of the PDCCH region (resources dependent on the uplink transmission mode are allocated to the R-PDCCH region), reduce influences of interference (DCI less likely to be influenced by a propagation path situation is allocated to the PDCCH region), and thereby achieve their respective required receiving qualities.

The present embodiment is applicable not only to above-described configuration method 1 but also to Embodiment 1 and configuration methods 2 and 3 of Embodiment 2. For example, as in the case of Embodiment 1, applying the present embodiment to these embodiments can prevent throughput deterioration caused by the tight condition of a PDCCH region or R-PDCCH region in the entire system. Moreover, each terminal is allowed to receive DCI using resources (PDCCH transmission region) suitable for a situation of each terminal and it is possible to secure desired receiving quality for each terminal.

Furthermore, in the present embodiment, the base station and the terminal may also store allocation patterns (e.g., FIG. 13) of DCI allocation region candidates (blind decoding region candidates) in the respective search spaces of the PDCCH region and R-PDCCH region. For example, in FIG. 13, "∘" indicates that a search space for the corresponding DCI format is configured for an allocation region corresponding to "∘," and "-" indicates that a search space for the corresponding DCI format is configured for allocation region corresponding to "-." For example, in the case of search spaces of pattern number 4 shown in FIG. 13, a C-SS corresponding to two DCI formats (DCI 1C and DCI 0/1A) and a UE-SS corresponding to one DCI format (one of DCI 1, 1B, 1D, 2, 2A, 2B and 2C) are configured in the PDCCH region, and a UE-SS corresponding to two DCI formats (DCI 0/1A and DCI 0A, 0B and 4) is configured in the R-PDCCH region. The same applies to search spaces with other pattern numbers shown in FIG. 13. For example, the base station may report pattern numbers shown in FIG. 13 to each terminal depending on the situation (moving speed, position or the like) of each terminal. Alternatively, the base station may select a search space that allows the blocking probability to be reduced every time (e.g., for each subframe) and report the selected pattern number to the terminal.

Furthermore, the present embodiment has described configuration method 1 of Embodiment 2 as an example. However, as in the case of configuration method 2 or 3 of Embodiment 2, the present embodiment may also be applied to a case where base station 100 configures only DM-RSs in an R-PDCCH region. That is, the present embodiment may be applied to a case where search spaces are configured so that the number of DCI allocation region candidates (number of blind decoding region candidates) $N_D$ in an R-PDCCH region is equal to or above the number of DCI allocation region candidates (number of blind decoding region candidates) $N_C$ in a PDCCH region ($N_C \leq N_D$).

Embodiment 4

A case has been described in Embodiment 3 where the base station configures a transmission region (PDCCH region or R-PDCCH region) depending on features of each DCI format. The present embodiment will describe a specific example of the above configuration processing in the base station according to Embodiment 3.

Since basic configurations of a base station and a terminal according to the present embodiment are common to those in Embodiment 1, these configurations will be described using FIG. 6 and FIG. 8.

Allocating section 106 of base station 100 disposes DCI containing allocation control information for common channels (e.g., DCI 1C and 1A) and DCI containing allocation control information for the allocation of data common to all the terminals (e.g., DCI 0/1A) in a PDCCH region, and disposes DCI containing allocation control information dependent on the transmission mode (e.g., uplink (DCI 0A, 0B and 4), downlink (DCI 1, 1B, 1D, 2, 2A, 2B and 2C)) configured for terminal 200 in an R-PDCCH region.

That is, allocating section 106 allocates allocation control information in a format common to all the terminals to search spaces configured in the PDCCH region and allocates allocation control information in a format corresponding to a transmission mode configured for terminal 200 to search spaces configured in the R-PDCCH region.

Operation of search space configuration section 103 may be similar to those of Embodiments 1 to 3.

In contrast, PDCCH receiving section 207 of terminal 200 blind-decodes DCI for C-SSs and UE-SSs according to search space region information inputted from configuration information receiving section 206.

To be more specific, PDCCH receiving section 207 performs blind decoding for C-SSs in the PDCCH region in DCI 1C and DCI 0/1A formats and performs blind decoding for UE-SSs in a DCI format (DCI 0/1A) used commonly in plurality of transmission modes. As the number of blind decoding operations in the PDCCH region, 12 (=6 candidates×2 types (DCI 1C and DCI 0/1A, DCI formats 0 and 1A are blind-decoded as one type) blind decoding operations are performed for C-SSs and 16 (=16 candidates×1 type) blind decoding operations are performed for UE-SSs. Thus, the number of blind decoding operations in the PDCCH region is 28.

Furthermore, PDCCH receiving section 207 performs blind decoding operations in a DCI format determined dependently of the transmission mode in the R-PDCCH region. In the R-PDCCH region, PDCCH receiving section 207 blind-decodes a DCI format dependent on the downlink transmission mode and a DCI format dependent on the uplink transmission mode. When a transmission mode supporting only DCI 0 is selected in control information for an uplink, PDCCH receiving section 207 blind-decodes DCI 0 in both the PDCCH region and the R-PDCCH region.

When PDCCH receiving section 207 blind-decodes 2 DCI formats in the R-PDCCH region, if 16 candidates are blind-decoded in the respective DCI formats, the number of blind decoding operations in the R-PDCCH region is doubled to 32.

When terminal 200 configures the number of blind decoding operations as described above, the number of blind decoding operations (32 operations) in the R-PDCCH region is greater than the number of blind decoding operations (28 operations) in the PDCCH region.

That is, terminal 200 is more likely to receive DCI for terminal 200 in the R-PDCCH region where other cell interference is more likely to be reduced.

Thus, when DCI for a terminal connected to a base station is mapped to a PDCCH region and an R-PDCCH region, the present embodiment can further reduce the possibility of receiving other cell interference. This allows desired receiving quality in the terminal to be secured.

Furthermore, according to the present embodiment, the base station configures search spaces for each DCI format. By so doing, the base station can configure search spaces for each DCI format in an appropriate transmission region among the PDCCH region and the R-PDCCH region depending on features of each DCI format (e.g., usage frequency and receiving quality at a location where usage is anticipated).

On a downlink, a DCI format commonly used among a plurality of transmission modes is used mainly when receiving quality drastically deteriorates or when a change in the transmission mode cannot be followed or the like. Therefore, the usage frequency of a DCI format dependent on the transmission mode is considered to be higher than the usage frequency of a DCI format commonly used among a plurality of transmission modes regardless of the transmission mode. As in the case of the present embodiment, the terminal disposes a DCI format with a high usage frequency in the R-PDCCH region, and the R-PDCCH region is thereby mainly used. By so doing, the base station can more easily control interference with other cells caused by the R-PDCCH in the frequency-domain. Furthermore, the terminal can receive DCI transmitted with interference controlled with desired receiving quality.

Furthermore, the number of information bits of DCI 0/1A is less than the number of information bits of other DCI dependent on the transmission mode. For this reason, when the same number of CCEs is configured, the base station can transmit data at a lower coding rate in DCI 0/1A than in DCI 1, 1B, 1D, 2, 2A, 2B and 2C, 0A, 0B and 4. That is, when DCI 0/1A is configured by focusing on the fact that DCI 0/1A is a format less likely to be influenced by a propagation path situation than other DCI formats, the base station configures DCI 0/1A in the PDCCH region and configures DCI 1, 1B, 1D, 2, 2A, 2B and 2C, 0A, 0B and 4 dependent on the transmission mode in the R-PDCCH region. This makes it possible to reduce the tight condition of the PDCCH region (resources dependent on the transmission mode are allocated to the R-PDCCH region), reduce influences of interference (DCI less likely to be influenced by the propagation path situation is allocated to the PDCCH region), and thereby achieve their respective required receiving qualities.

Furthermore, when DCI 0/1A is configured in the PDCCH region and search spaces in the R-PDCCH region are thereby changed, even if the terminal fails to receive a control signal for reporting a change in the search spaces and a difference in recognition of the search spaces is produced between the terminal and the base station, the terminal can receive DCI 0/1A transmitted in the PDCCH region and continue communication. Furthermore, even for a period during which search spaces are changed in the R-PDCCH region, the terminal can receive DCI 0/1A transmitted to the PDCCH region and continue communication.

A case has been described in the present embodiment where when a transmission mode supporting only DCI 0 is selected in uplink control information, the terminal blind-decodes DCI 0 in both the PDCCH region and the R-PDCCH region. However, the terminal may also blind-decode DCI 0 only in the PDCCH region. By so doing, it is possible to reduce the number of decoding operations on the uplink control information.

Embodiment 5

A case has been described in Embodiment 3 where attention is focused on whether a DCI format is dependent on the transmission mode or not as an example of configuring search spaces for each DCI format. In contrast, the present embodiment will describe a case where attention is focused on DCI format family 1 and DCI format family 2 as an example of configuring search spaces for each DCI format.

Figure 14:
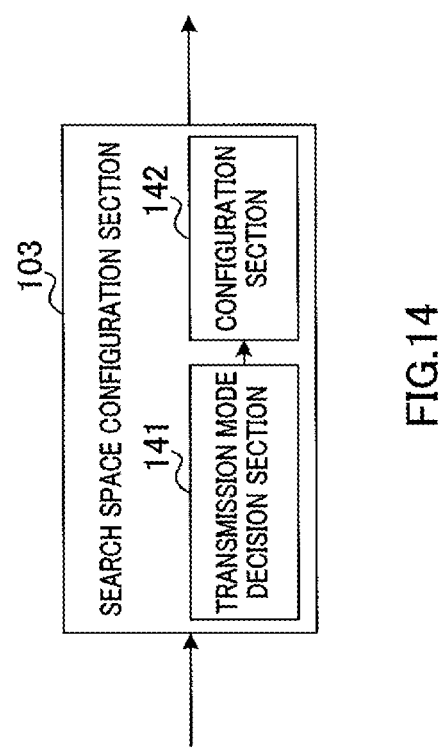
FIG. 14 is a block diagram illustrating an internal configuration of a search space configuration section according to Embodiment 5 of the present invention.

Since basic configurations of a base station and a terminal according to the present embodiment are common to those in Embodiment 1, these configurations will be described using FIG. 6 and FIG. 8. In the present embodiment, operation of search space configuration section 103 of base station 100 shown in FIG. 6 is different from that of Embodiment 1. FIG. 14 illustrates an internal configuration of search space configuration section 103 according to the present embodiment.

As shown in FIG. 14, search space configuration section 103 according to the present embodiment has a configuration including transmission mode decision section 141 and configuration section 142.

Transmission mode decision section 141 decides a transmission mode configured for terminal 200 using configuration information inputted from configuration section 101. To be more specific, transmission mode decision section 141 decides using the configuration information whether the downlink transmission mode configured for terminal 200 is a transmission mode including DCI format family 1 or a transmission mode including DCI format family 2. Transmission mode decision section 141 outputs the decided transmission mode to configuration section 142.

Configuration section 142 configures common search spaces (C-SSs) and specific search spaces (UE-SSs) based on a DCI transmission region indicated by the configuration information inputted from configuration section 101 (only PDCCH region or R-PDCCH region, or both PDCCH region and R-PDCCH region) and the transmission mode inputted from transmission mode decision section 141.

For example, a case will be described where both a PDCCH region and an R-PDCCH region are configured as DCI transmission regions. Upon deciding that a transmission mode including DCI format family 1 is configured as the DCI format dependent on the transmission mode among downlink transmission modes, configuration section 142 configures DCI allocation region candidates (blind decoding region candidates) of specific search spaces (UE-SSs) in the PDCCH region. On the other hand, upon deciding that a transmission mode including DCI format family 2 is configured as the downlink transmission mode, configuration section 142 configures DCI allocation region candidates (blind decoding region candidates) of specific search spaces (UE-SSs) in the PDCCH region and the R-PDCCH region, and configuration section 142 further configures DCI allocation region candidates in a DCI format not dependent on the transmission mode in the PDCCH region, and configures DCI allocation region candidates in a DCI format dependent on the transmission mode in the R-PDCCH region.

The present embodiment does not impose any restrictions on whether C-SSs should be configured in the PDCCH region or R-PDCCH region. However, configuration section 142 may configure C-SSs in the PDCCH region in consideration that a load balance should be kept between the PDCCH region and R-PDCCH region or that an error resistant DCI format should be disposed in C-SSs.

Furthermore, configuration section 142 may configure a DCI format subjected to Temporary C-RNTI which is used only for RACH processing in the PDCCH region. This is because the configuration such as allocation of the R-PDCCH region or the like is not performed at timing of RACH processing.

Allocating section 106 allocates DCI containing allocation control information to CCEs in C-SSs or UE-SSs using search space information from search space configuration section 103.

To be more specific, allocating section 106 allocates DCI corresponding to DCI format family 2 (e.g., DCI 2, 2A, 2B and 2C) of allocation control information dependent on the transmission mode configured for the terminal to CCEs in UE-SSs in the R-PDCCH region.

Furthermore, allocating section 106 allocates DCI corresponding to DCI format family 1 (e.g., DCI 1, 1B and 1D) of allocation control information dependent on the transmission mode configured for the terminal to CCEs in UE-SSs in the PDCCH region.

Furthermore, allocating section 106 allocates DCI containing allocation control information for common channels (e.g., DCI 1C and 1A) to CCEs in C-SSs. Furthermore, allocating section 106 allocates DCI containing allocation control information for the allocation of data used in a plurality of transmission modes (e.g., DCI 0/1A) to CCEs in C-SSs or CCEs in UE-SSs.

In contrast, in terminal 200, PDCCH receiving section 207 blind-decodes DCI containing allocation control information for common channels (e.g., DCI 1C and 1A) and DCI containing allocation control information for the allocation of data used in plurality of transmission modes (e.g., DCI 0/1A) for C-SSs indicated by a search space region indicated by the search space region information inputted from configuration information receiving section 206. Furthermore, PDCCH receiving section 207 blind-decodes DCI containing allocation control information for the allocation of data used in a plurality of transmission modes (e.g., DCI 0/1A) and DCI containing allocation control information dependent on the transmission mode configured for terminal 200 (e.g., uplink (DCI 0A, 0B and 4), downlink (DCI 1, 1B and 1D, 2, 2A, 2B and 2C)) for UE-SSs indicated by a search space region indicated by the search space region information inputted from configuration information receiving section 206.

That is, for C-SSs, terminal 200 performs blind decoding on two DCI formats (DCI 1C and 1A and DCI 0/1A). On the other hand, for UE-SSs, terminal 200 performs blind decoding on three DCI formats (DCI dependent on the uplink transmission mode (DCI 0A, 0B and 4), DCI dependent on the downlink transmission mode (DCI 1, 1B, 1D, 2, 2A, 2B and 2C) and DCI 0/1A). However, when the uplink transmission mode supports only DCI0, terminal 200 performs blind decoding on two DCI formats.

When the search space region information is predetermined by a cell ID or the like or even when the search space region information is decided not to be updated, if the transmission mode configured for terminal 200 includes DCI format family 2, PDCCH receiving section 207 may perform blind decoding for UE-SSs limited to the R-PDCCH region. Furthermore, when the transmission mode configured for terminal 200 includes DCI format family 1, PDCCH receiving section 207 may perform blind decoding for UE-SSs limited to the PDCCH region. Furthermore, PDCCH receiving section 207 may perform blind decoding for C-SSs limited to the PDCCH region.

Even when the search space region information is not updated (when configuration information from an upper layer is not updated simultaneously with update of the transmission mode), if a transmission mode including DCI format family 1 is configured, PDCCH receiving section 207 may perform blind decoding for UE-SSs limited to the PDCCH region.

For example, a case will be described where a transmission mode including DCI format family 2 is configured and both a PDCCH region and an R-PDCCH region are configured in the search space region information. That is, terminal 200 performs blind decoding for UE-SSs in both the PDCCH region and the R-PDCCH region. In this case, when the search space region information is not updated and the transmission mode is changed to one including DCI format family 1, PDCCH receiving section 207 performs blind decoding operations for UE-SSs limited to the PDCCH region. That is, although the search space region information is configured such that the R-PDCCH region is included as a search space, if a transmission mode including DCI format family 1 is configured, PDCCH receiving section 207 blind-decodes only the PDCCH region as a search space.

Furthermore, when the transmission mode is changed to a transmission mode including DCI format family 2 again, terminal 200 may use the configuration of the newest R-PDCCH region in the reported configuration information. By so doing, terminal 200 need not configure an R-PDCCH region every time the transmission mode is changed, and can thereby reduce control signals for configuring the R-PDCCH region.

Here, among the downlink DCI formats (DCI 1A, 1, 1B and 1D, 2, 2A, 2B and 2C), DCI format family 2 (DCI 2, 2A, 2B and 2C) is control information to allocate spatial multiplexing MIMO transmission corresponding to a plurality of layers. Thus, DCI format family 2 has more information bits than other downlink DCI formats. Furthermore, a terminal to which DCI format family 2 is applied is a terminal supporting spatial multiplexing MIMO transmission adaptable to a plurality of layers. Thus, DM-RSs are more likely to be indicated to be used as reference signals for the terminal.

Furthermore, as shown in FIG. 15, when reference signals used are CRSs, a frequency diversity effect is obtained in the PDCCH region in common among terminals. For this reason, when reference signals used are CRSs, there are assumed to be no differences in reception performance (e.g., reception SINR) depending on the location where search spaces are configured. On the other hand, as shown in FIG. 15, when reference signals used are DM-RSs, the location where search spaces are configured is an R-PDCCH region. When reference signals used are DM-RSs, it is possible to obtain an effect that a frequency resource having good reception performance is specifically selected for the corresponding terminal (frequency selectivity effect) and a precoding gain through beam forming specifically adjusted for the terminal. For this reason, when reference signals used are DM-RSs, improvement in reception performance (reception SINR) can be expected.

That is, when reference signals used are DM-RSs, it is possible to further improve reception performance (reception SINR) and reduce the number of CCEs required compared to a case where reference signals used are CRSs. That is, the greater the number of information bits of control information used, the greater the effect of a reduction in the number of CCEs used becomes.

Thus, when a transmission mode including DCI format family 2 with many information bits is configured, base station 100 (search space configuration section 103) configures more UE-SSs in the R-PDCCH region and allocating section 106 allocates DCI to CCEs in UE-SSs configured in the R-PDCCH region. By so doing, DM-RSs are more likely to be configured in the transmission mode including DCI format family 2. It is thereby possible to reduce the number of CCEs used in the transmission mode including DCI format family 2 and reduce the resource amount used in the PDCCH region and R-PDCCH region as a whole. In other words, when the resource amount used is assumed to be constant, more terminals can be accommodated.

Furthermore, for example, in a HetNet environment, since an arrangement of resources in the PDCCH region is defined beforehand by a cell ID or the like, it is difficult to avoid interference. In contrast, in the HetNet environment, since an arrangement of resources in the R-PDCCH region can be scheduled, it is possible to avoid interference. Thus, interference among cells is more likely to be reduced through interference control or the like in an R-PDCCH region than in a PDCCH region. That is, the reception performance (reception SINR) is more likely to be improved in an R-PDCCH region than in a PDCCH region.

Figure 16:
FIG. 16 is a diagram illustrating features of a downlink DCI format according to Embodiment 5 of the present invention.

On the other hand, when the same number of CCEs is configured in a downlink DCI format, as shown in FIG. 16, a DCI format with more information bits has a larger M-ary modulation value and a higher coding rate. That is, as shown in FIG. 16, a DCI format with more information bits has lower error resistance.

Thus, when a transmission mode including DCI format family 2 with more information bits is configured, base station 100 (search space configuration section 103) configures more UE-SSs in the R-PDCCH region and allocating section 106 allocates DCI to CCEs in UE-SSs configured in the R-PDCCH region. By so doing, it is possible to transmit a DCI format of weak error resistance (DCI format family 2) in the R-PDCCH region having better reception performance than in the PDCCH region. That is, search space configuration section 103 can configure search spaces capable of securing desired receiving quality for the DCI format of low error resistance (DCI format family 2).

In contrast, when the same number of CCEs is configured in a downlink DCI format, as shown in FIG. 16, a DCI format having fewer information bits has a smaller M-ary modulation value and a lower coding rate. That is, as shown in FIG. 16, a DCI format having fewer information bits has higher error resistance.

Among downlink DCI formats (DCI 1A, 1, 1B and 1D, 2, 2A, 2B and 2C), DCI format family 1 (DCI 1, 1B and 1D) is control information for allocating transmission corresponding to a single layer. For this reason, DCI format family 1 has fewer information bits than DCI format family 2.

Therefore, when a transmission mode including DCI format family 1 having fewer information bits is configured, base station 100 (search space configuration section 103) configures more UE-SSs in the PDCCH region and allocating section 106 allocates DCI to CCEs in UE-SSs configured in the PDCCH region. By so doing, a DCI format having high error resistance (DCI format family 1) is transmitted in the PDCCH region of poorer reception performance than the R-PDCCH region. That is, even when transmitting a DCI format having high error resistance in a transmission region of poor reception performance, search space configuration section 103 can configure search spaces capable of securing desired receiving quality.

Furthermore, by configuring a DCI format having low error resistance (DCI format family 2) in the R-PDCCH region and configuring a DCI format having high error resistance (DCI format family 1) in the PDCCH region, base station 100 can keep a load balance relating to resource utilization between the PDCCH region and R-PDCCH region.

In this way, base station 100 determines in which region (PDCCH region or R-PDCCH region) DCI should be transmitted in consideration of the situation of each terminal (e.g., position of the terminal, magnitude of other cell interference, traffic situation (e.g., "PDCCH region is becoming tight as the number of communicating terminals increases") or the like). To be more specific, the base station configures a specific DCI format having the large amount of information (e.g., DCI format family 2) in the R-PDCCH region. Furthermore, the base station configures a specific DCI format having the small amount of information (DCI format family 1) in the PDCCH region.

Thus, it is possible to prevent throughput deterioration caused by the tight condition of the PDCCH region or R-PDCCH region in the entire system. Furthermore, each terminal can receive DCI using resources (PDCCH transmission region) suitable for a situation of each terminal and secure desired receiving quality in the terminal.

Therefore, according to the present embodiment, even when DCI for a terminal connected to a base station is allocated to a PDCCH region and an R-PDCCH region, it is possible to secure desired receiving quality in the terminal without causing system throughput to deteriorate.

The present embodiment has described a DCI format dependent on a downlink transmission mode in particular. However, the present embodiment may also apply operation similar to that of DCI format family 2 to DCI format 4 (DCI 4) in which spatial multiplexing MIMO transmission is allocated in a DCI format dependent on an uplink transmission mode. Furthermore, the above-described operation whereby DCI format 4 is configured in an R-PDCCH region may be limited to only a case where DCI format family 2 is used as a downlink transmission mode.

Embodiment 6

A case has been described in Embodiments 1 to 3 where the base station configures search spaces based on the relationship of the number of DCI allocation region candidates (number of blind decoding region candidates) between a PDCCH region and an R-PDCCH region in the terminal. In contrast, in the present embodiment, the base station configures search spaces based on the relationship in a search space size (the number of CCEs constituting a search space) between a PDCCH region and an R-PDCCH region.

Since basic configurations of a base station and a terminal according to the present embodiment are common to those in Embodiment 1, these configurations will be described using FIG. 6 and FIG. 8.

In the following description, as in the case of Embodiment 1, 6 DCI allocation region candidates (blind decoding region candidates) in total (total 32 CCEs); 4 candidates (16 CCEs) for CCE aggregation level 4 and 2 candidates (16 CCEs) for CCE aggregation level 8, are configured as C-SSs. Furthermore, 16 DCI allocation region candidates (blind decoding region candidates) (total 42 CCEs) in total; 6 candidates (6 CCEs), 6 candidates (12 CCEs), 2 candidates (8 CCEs) and 2 candidates (16 CCEs) for CCE aggregation levels 1, 2, 4 and 8 respectively are configured as UE-SSs. That is, search spaces (C-SS and UE-SS) composed of 74 CCEs in total are configured for each terminal.

Search space configuration section 103 of base station 100 according to the present embodiment configures search spaces for each terminal so that the ratio of the search space size (that is, the number of CCEs constituting a search space) in an R-PDCCH region to the search space size in a PDCCH region is greater in a terminal using DM-RSs in the R-PDCCH region than in a terminal using CRSs in the R-PDCCH region.

Figure 17A:
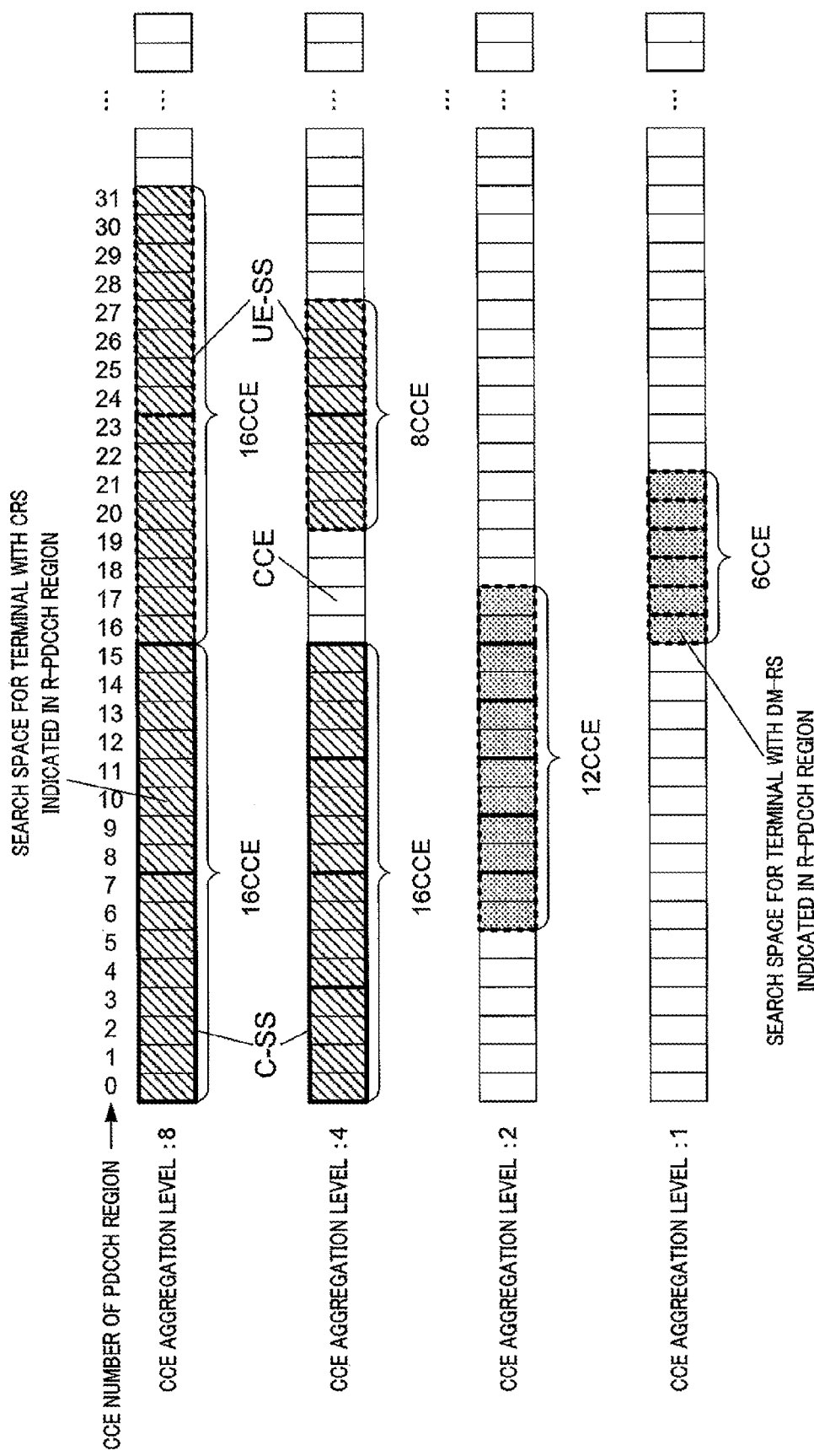
FIG. 17A is a diagram illustrating an example of search space configuration in a PDCCH region according to Embodiment 6 of the present invention.
Figure 17B:
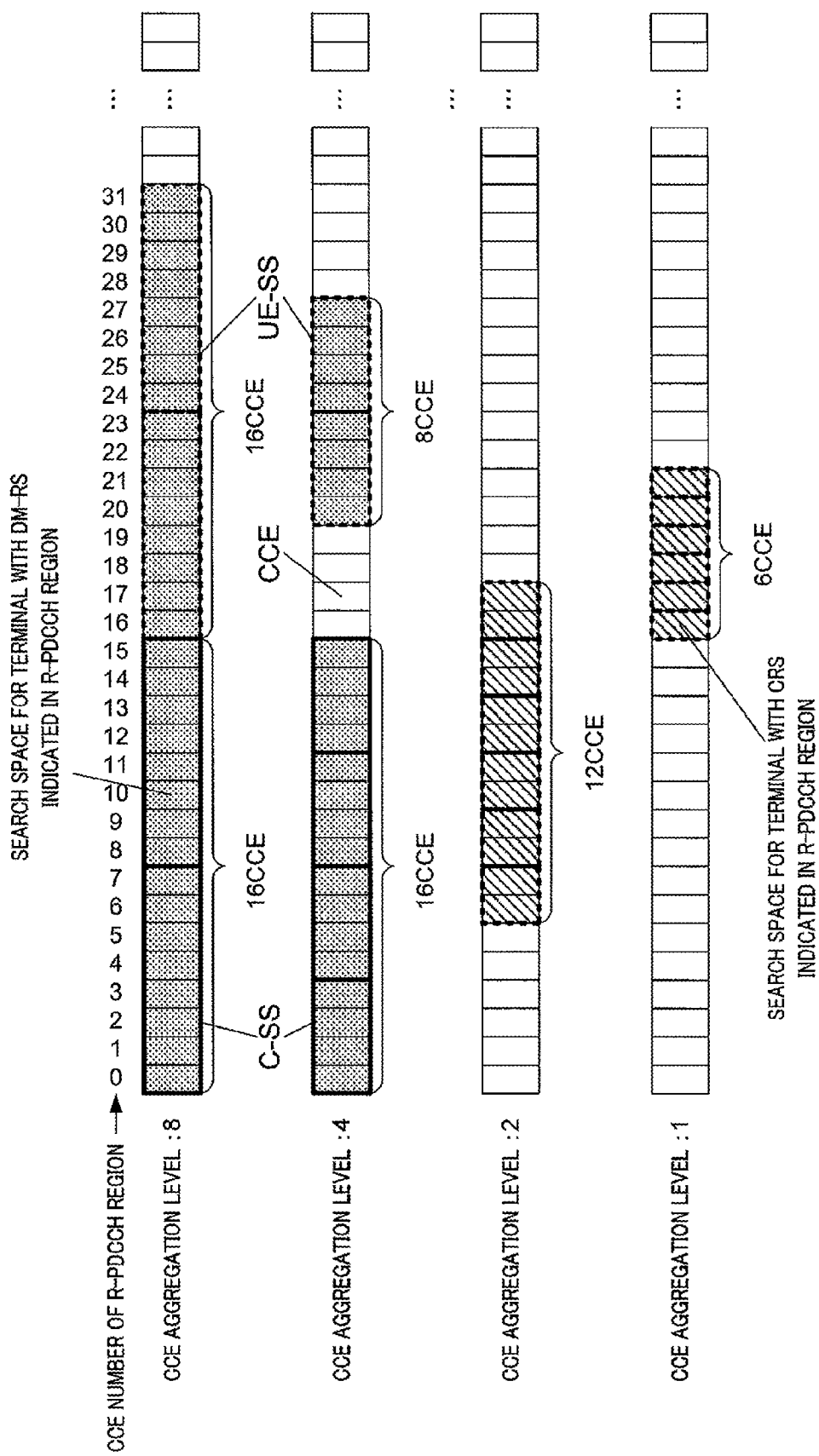
FIG. 17B is a diagram illustrating an example of search space configuration in an R-PDCCH region according to Embodiment 6 of the present invention.

For example, as shown in FIG. 17A, for a certain terminal using CRSs in the R-PDCCH region, search space configuration section 103 configures C-SSs of 32 CCEs in total; candidates (16 CCEs) of CCE aggregation level 8 and 4 candidates (16 CCEs) of CCE aggregation level 4, and configures UE-SSs of 24 CCEs in total; 2 candidates (16 CCEs) of CCE aggregation level 8 and 2 candidates (8 CCEs) of CCE aggregation level 4 in the PDCCH region. Furthermore, as shown in FIG. 17B, for a certain terminal using CRSs in the R-PDCCH region, search space configuration section 103 configures UE-SSs of 18 CCEs in total; 6 candidates (12 CCEs) of CCE aggregation level 2 and 6 candidates (6 CCEs) of CCE aggregation level 1 in the R-PDCCH region.

On the other hand, as shown in FIG. 17A, for a certain terminal using DM-RSs in the R-PDCCH region, search space configuration section 103 configures UE-SSs of 18 CCEs in total; 6 candidates (12 CCEs) of CCE aggregation level 2 and 6 candidates (6 CCEs) of CCE aggregation level 1 in the PDCCH region. Furthermore, as shown in FIG. 17B, for a certain terminal using DM-RSs in the R-PDCCH region, search space configuration section 103 configures C-SSs of 32 CCEs in total; candidates (16 CCEs) of CCE aggregation level 8 and 4 candidates (16 CCEs) of CCE aggregation level 4 in the R-PDCCH region, and configures UE-SSs of 24 CCEs in total; 2 candidates (16 CCEs) of CCE aggregation level 8 and 2 candidates (8 CCEs) of CCE aggregation level 4.

That is, search space configuration section 103 configures search spaces (C-SS and UE-SS) so that the ratio of the search space size (56 CCEs) in the R-PDCCH region to the search space size (18 CCEs) in the PDCCH region for terminal 200 using DM-RSs in the R-PDCCH region (56/18) is equal to or greater than the ratio of the search space size (18 CCEs) in the R-PDCCH region to the search space size (56 CCEs) in the PDCCH region in terminal 200 using CRSs in the R-PDCCH region (18/56).

The configuration of search spaces is not limited to the above-described one, but as shown in configuration method 3 of Embodiment 2, for a certain terminal using DM-RSs in the R-PDCCH region, C-SSs of 32 CCEs in total may be configured in the PDCCH region; 2 candidates (16 CCEs) of CCE aggregation level 8 and 4 candidates (16 CCEs) of CCE aggregation level 4, and UE-SSs of 32 CCEs in total may be configured in the R-PDCCH region; 2 candidates (16 CCEs) of CCE aggregation level 8, 2 candidates (8 CCEs) of CCE aggregation level 4, 6 candidates (12 CCEs) of CCE aggregation level 2 and 6 candidates (6 CCEs) of CCE aggregation level 1. In this case, search spaces (C-SS and UE-SS) are also configured so that the ratio of the search space size (32 CCEs) in the R-PDCCH region to the search space size (32 CCEs) in the PDCCH region for terminal 200 using DM-RSs in the R-PDCCH region (32/32) is equal to or above the ratio of the search space size (18 CCEs) in the R-PDCCH region to the search space size (56 CCEs) in the PDCCH region for terminal 200 using CRSs in the R-PDCCH region (18/56).

That is, as shown in FIG. 17B, in the R-PDCCH region, search space configuration section 103 can configure search spaces using more CCEs for a terminal using DM-RSs in the R-PDCCH region (terminal having greater other cell interference) than a terminal using CRSs in the R-PDCCH region.

Furthermore, as described above, other cell interference is more likely to be reduced in the R-PDCCH region than in the PDCCH region through interference control or the like.

Thus, for a terminal using DM-RSs, DCI is more likely to be received in the R-PDCCH region that occupies a greater part (more CCEs) of the configured search space. Therefore, the terminal using DM-RSs obtains a PDCCH received signal power improving effect using DM-RSs (see FIG. 3) while suppressing influences from other cell interference in the R-PDCCH region, and can thereby secure desired receiving quality in the terminal.

Here, for example, for a terminal using CRS s in the R-PDCCH region, base station 100 allocates data in search spaces using relatively more CCEs in the PDCCH region. On the other hand, for a terminal using DM-RSs in the R-PDCCH region, base station 100 allocates data in search spaces using relatively more CCEs in the R-PDCCH region. This makes it possible to maintain a load balance in a PDCCH to which control information for each terminal is allocated. That is, it is possible to avoid PDCCHs from being biased to a specific region preventing PDCCHs from being transmitted within a limited region. This prevents throughput deterioration caused by the tight condition of the PDCCH region and R-PDCCH region.

Furthermore, base station 100 may use, for example, a PDCCH region or an R-PDCCH region using CRSs (reference signals capable of obtaining a frequency diversity effect) for DCI for a terminal that is moving fast (with a violent fluctuation in the received signal level). On the other hand, base station 100 may use an R-PDCCH region using DM-RSs (reference signals that allow received signal power to be improved) for DCI for a terminal located near a cell edge (with a low received signal level). This makes it possible to realize search space allocation capable of securing desired receiving quality regardless of the moving speed or location area or the like of a terminal. This allows each terminal to receive DCI using resources suitable for a situation of each terminal (PDCCH transmission region) and secure desired receiving quality of the terminal.

Thus, according to the present embodiment, even when mapping DCI for a terminal connected to a base station onto the PDCCH region and R-PDCCH region, it is possible to secure desired receiving quality in a terminal without causing system throughput to deteriorate.

A case has been described in the present embodiment where a terminal using CRSs and a terminal using DM-RSs coexist in the R-PDCCH region. In contrast, the present embodiment is also applicable to a case where reference signals used for each terminal in an R-PDCCH region are fixedly configured. For example, base station 100 may configure search spaces so that the search space size in the R-PDCCH region is equal to or greater than the search space size in the PDCCH region as in the case of configuration method 1 in Embodiment 2 (when DCI allocation region candidates are used).

Figure 18:
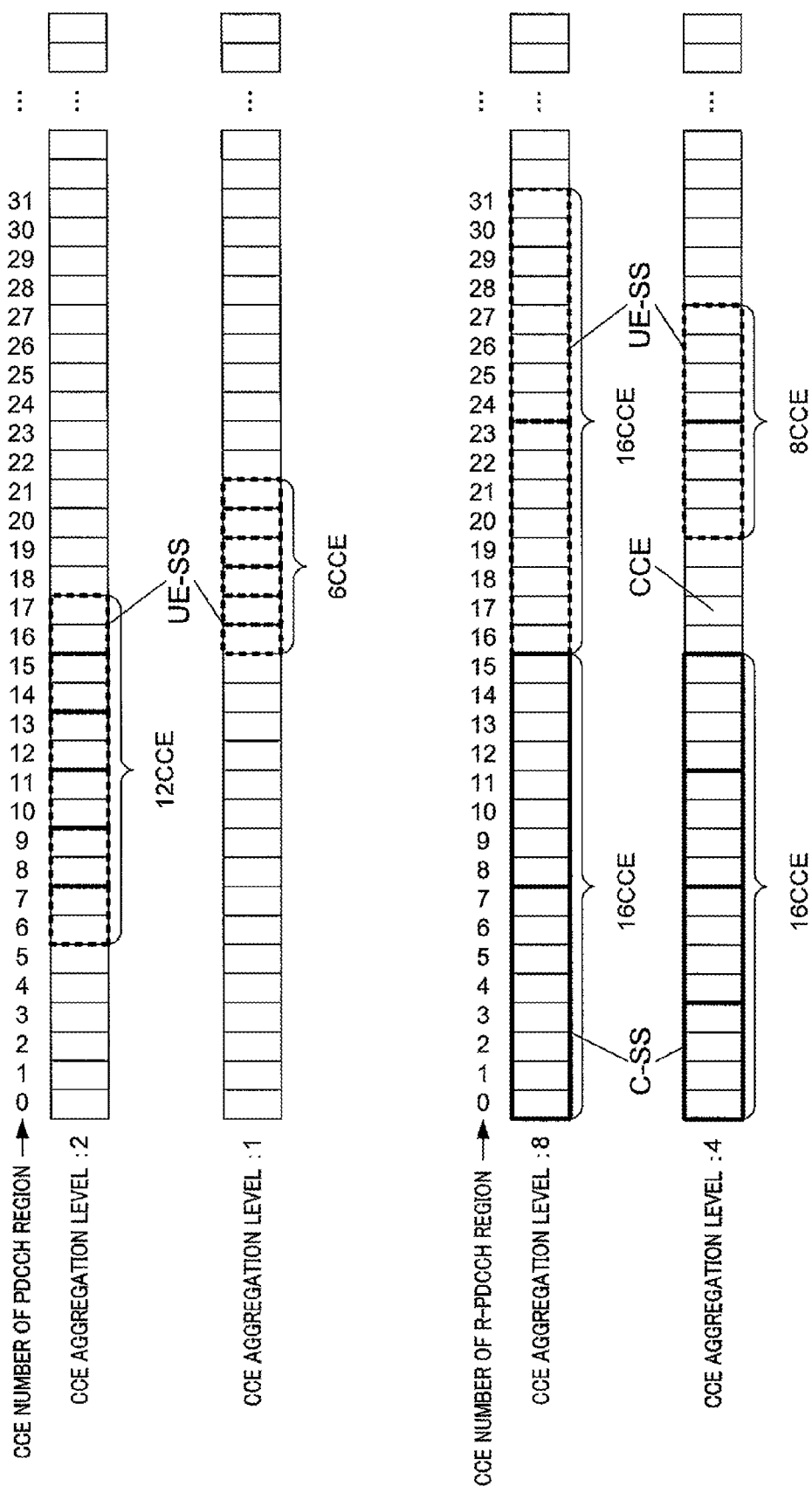
FIG. 18 is a diagram illustrating an example of search space configuration according to a variation of Embodiment 6 of the present invention.

For example, as shown in FIG. 18, search space configuration section 103 configures UE-SSs of 18 CCEs in total in a PDCCH region for a certain terminal using only CRSs in an R-PDCCH region and configures C-SSs of 32 CCEs in total and UE-SSs of 24 CCEs in total in the R-PDCCH region. That is, in FIG. 18, the search space size in the R-PDCCH region (56 CCEs) is greater than the search space size in the PDCCH region (18 CCEs).

Thus, by increasing the ratio of the search space configured in the R-PDCCH region among search spaces configured in terminal 200, terminal 200 is more likely to receive DCI in the R-PDCCH region that occupies a greater part (more CCEs) of the configured search space. This allows terminal 200 to suppress influences of other cell interference and secure desired receiving quality.

Furthermore, the present embodiment is not limited to Embodiment 1 and configuration method 1 of Embodiment 2, but may configure search spaces based on a search space size in the same way as configuration methods 2 and 3 of Embodiment 2 and Embodiment 3 (when the number of blind decoding operations is used).

Embodiment 7

The present embodiment will describe a case where a TDM+FDM configuration is applied to an R-PDCCH region. However, suppose whether the R-PDCCH region has an FDM configuration or a TDM+FDM configuration is configured beforehand.

Figure 19:
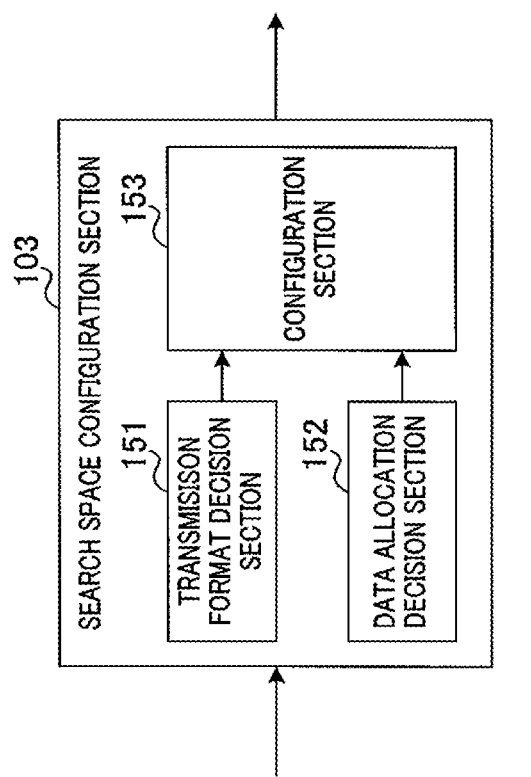
FIG. 19 is a block diagram illustrating an internal configuration of a search space configuration section according to Embodiment 7 of the present invention.

Since basic configurations of a base station and a terminal according to the present embodiment are common to those in Embodiment 1, these configurations will be described using FIG. 6 and FIG. 8. In the present embodiment, operation of search space configuration section 103 of base station 100 shown in FIG. 6 is different from that of Embodiment 1. FIG. 19 shows an internal configuration of search space configuration section 103 according to the present embodiment.

In base station 100 according to the present embodiment, search space configuration section 103 adopts a configuration including transmission format decision section 151, data allocation decision section 152 and configuration section 153.

Transmission format decision section 151 decides a DCI format configured for terminal 200 using configuration information inputted from configuration section 101. To be more specific, transmission format decision section 151 decides whether or not the transmission format configured for terminal 200 is a common DCI format and whether or not the transmission format is DCI 1A corresponding to downlink allocation control information subject to consecutive band allocation. Transmission format decision section 151 outputs the decision result to configuration section 153.

Data allocation decision section 152 decides whether or not transmission data is allocated to terminal 200. Data allocation decision section 152 outputs the decision result to configuration section 153.

Configuration section 153 configures common search spaces (C-SSs) and specific search spaces (UE-SSs). For example, when both a PDCCH region and an R-PDCCH region are configured as DCI transmission regions, configuration section 153 configures search spaces (C-SS and UE-SS) having the aforementioned plurality of DCI allocation region candidates in the PDCCH region and R-PDCCH region.

Particularly, configuration section 153 configures search spaces for disposing DCI 0 which is a common DCI format and which corresponds to uplink allocation control information subject to consecutive band allocation based on a DCI transmission region indicated by the configuration information inputted from configuration section 101 (only PDCCH region or R-PDCCH region, or both PDCCH region and R-PDCCH region), the decision result inputted from transmission format decision section 151 (DCI 1A or not) and the decision result inputted from data allocation decision section 152 (presence or absence of data allocation).

To be more specific, as shown in FIG. 20, when DCI 1A is configured for terminal 200 (format 1A: Yes) or when there is data allocation (data allocation: Yes), configuration section 153 configures search spaces (C-SS or UE-SS) for disposing DCI 0 in the PDCCH region. As described above, to suppress an increase in the number of blind decoding operations, C-SSs are more likely to be indicated for DCI 0.

On the other hand, as shown in FIG. 20, when DCI 1A is not configured for terminal 200 (format 1A: No) and when there is no data allocation (data allocate: No), configuration section 153 configures search spaces (C-SS or UE-SS) for disposing DCI 0 in slot 1 (2nd slot) of the R-PDCCH region. UE-SSs are more likely to be indicated for DCI 0 also in consideration of a case where DM-RSs are configured in the R-PDCCH region.

Allocating section 106 then allocates DCI containing allocation control information to CCEs in C-SSs or UE-SSs using search space information from search space configuration section 103. In particular, allocating section 106 allocates DCI corresponding to DCI 0 to a transmission region (PDCCH region or slot 1 (2nd slot) of the R-PDCCH region) configured by configuration section 153 of search space configuration section 103.

In contrast, PDCCH receiving section 207 in terminal 200 blind-decodes DCI containing allocation control information for common channels (e.g., DCI 1C and 1A) and DCI containing allocation control information for the allocation of data common to all the terminals (e.g., DCI 0/1A) for C-SSs indicated by a search space region indicated by the search space region information inputted from configuration information receiving section 206. Furthermore, PDCCH receiving section 207 blind-decodes DCI containing allocation control information for the allocation of data common to all the terminals (e.g., DCI 0/1A) and DCI containing allocation control information dependent on the transmission mode configured for terminal 200 (e.g., uplink (DCI 0A, 0B and 4), downlink (DCI 1, 1B and 1D, 2, 2A, 2B and 2C)) for UE-SSs indicated by the search space region indicated by the search space region information inputted from configuration information receiving section 206. Particularly, PDCCH receiving section 207 specifies search spaces in which DCI 0 for terminal 200 is disposed based on the detection result of DCI 1A for terminal 200 and the presence or absence of data allocation for terminal 200.

The search space configuration method according to the present embodiment will be described more specifically below.

As described above, the following matters should be considered about an R-PDCCH region in a TDM+FDM configuration with respect to a relay station (relay node).

(a) A DL grant is transmitted in slot 0 (1st slot) and a UL grant is transmitted in slot 1 (2nd slot).

(b) When a data signal (PDSCH) is indicated by an R-PDCCH, a PDSCH is transmitted using only slot 1 or both slot 0 and slot 1 (that is, data transmission in only slot 0 is not possible).

The above-described matters about the R-PDCCH region with respect to the relay station are also more likely to be applicable to the R-PDCCH region with respect to the terminal.

Thus, as shown in case 1 in FIG. 21, when DCI 1A is configured in the PDCCH region as a DL grant for terminal 200, search space configuration section 103 configures a search space for disposing DCI 0 in the PDCCH region.

Upon detecting DCI 1A (DL grant) for terminal 200 in the PDCCH region, PDCCH receiving section 207 decides that DCI 0 for terminal 200 is configured in the PDCCH region. PDCCH receiving section 207 then limits blind decoding on DCI 0 to the PDCCH region.

Thus, as shown in case 1 in FIG. 21, since DCI 1A and DCI 0 are disposed together in the PDCCH region, base station 100 can allocate data in the R-PDCCH region. Alternatively, base station 100 can use the R-PDCCH region as a PDSCH and an R-PDCCH for another apparatus (relay station or other terminal).

As shown in case 2 in FIG. 21, when DCI 1A for terminal 200 is not configured and data is allocated, search space configuration section 103 configures a search space for disposing DCI 0 in the PDCCH region.

When no DCI 1A for terminal 200 is not detected in the PDCCH region, PDCCH receiving section 207 decides that DCI 0 directed to terminal 200 is configured in slot 1 (2nd slot) of the PDCCH region or R-PDCCH region. PDCCH receiving section 207 then limits blind decoding on DCI 0 to slot 1 (2nd slot) of the PDCCH region or R-PDCCH region. For example, as a result of detecting downlink control information (DCI 1, 1B and 1D, 2, 2A, 2B and 2C) dependent on the transmission mode in slot 0 (1st slot) of the R-PDCCH region, if data allocation is found, PDCCH receiving section 207 decides that DCI 0 is configured in the PDCCH region. PDCCH receiving section 207 then limits blind decoding on DCI 0 to the PDCCH region.

Thus, as shown in case 2 in FIG. 21, base station 100 can allocate a DL grant to slot 0 (1st slot) in the R-PDCCH region and allocate data to slot 1 (2nd slot) in the R-PDCCH region.

Furthermore, as shown in case 3 in FIG. 21, when no DCI 1A for terminal 200 is configured and no data allocation is found, search space configuration section 103 configures a search space for disposing DCI 0 in slot 1 (2nd slot) of the R-PDCCH region.

When DCI 1A for terminal 200 is not detected in the PDCCH region, and data allocation is not found as a result of detecting downlink control information dependent on the transmission mode for terminal 200 (DCI 1, 1B and 1D, 2, 2A, 2B and 2C) in slot 0 (1st slot) of the R-PDCCH region, PDCCH receiving section 207 decides that DCI 0 is configured in slot 1 (2nd slot) of the R-PDCCH region. PDCCH receiving section 207 then limits blind decoding on DCI 0 to slot 1 (2nd slot) of the R-PDCCH region.

Thus, as shown in case 3 in FIG. 21, base station 100 disposes DCI 0 in the R-PDCCH region, and can thereby reduce the resource amount (that is, overhead) used in the PDCCH region. Alternatively, base station 100 can use the PDCCH region for other terminals.

When no search space region information is inputted from configuration information receiving section 206 (when base station 100 does not transmit search space information), PDCCH receiving section 207 may perform blind decoding in a plurality of DCI transmission regions which may be directed to terminal 200 without being aware of search spaces of terminal 200.

In this case, PDCCH receiving section 207 may also decide blind decoding locations of DCI 0 based on whether DCI 1A is detected in the PDCCH region or not and whether data is allocated or not. Whether data is allocated or not is decided based on whether a DCI format of downlink allocation control information dependent on the transmission mode is detected in slot 0 (1st slot) of the R-PDCCH region or not.

That is, upon detecting DCI 1A in the PDCCH region, PDCCH receiving section 207 decides that DCI 0 is also configured in the same search space and blind-decodes the PDCCH region. On the other hand, upon not detecting DCI 1A (nor detecting DCI 0 in the PDCCH region), PDCCH receiving section 207 decides that DCI 0 is disposed in slot 1 (2nd slot) of the R-PDCCH region.

When no data allocation is found as a result of detecting a DCI format of downlink allocation control information dependent on the transmission mode in slot 0 (1st slot) of the R-PDCCH region, PDCCH receiving section 207 decides that DCI 0 is disposed in slot 1 (2nd slot) of the R-PDCCH region. Furthermore, when data allocation is found (and DCI 0 is not detected in the PDCCH region), PDCCH receiving section 207 may decide that uplink allocation control information dependent on the transmission mode (one of DCI 0A, 0B and 4) is disposed in slot 1 (2nd slot) of the R-PDCCH region and perform blind decoding.

In this way, according to the present embodiment, when the R-PDCCH region has a TDM+FDM configuration, the base station disposes DCI 0 in the PDCCH region or slot 1 (2nd slot) of the R-PDCCH region based on the presence or absence of DCI 1A and the presence or absence of data allocation. This allows the base station to improve flexibility of scheduling and effectively use resources. Furthermore, since DCI 0 is also disposed in slot 1 (2nd slot) of the R-PDCCH region, it is possible to reduce resources used in the PDCCH region. Furthermore, DCI 0 is also disposed in slot 1 (2nd slot) of the R-PDCCH region, which increases the probability that the number of necessary CCEs may be reduced as described above, and it is possible to reduce resources used in the PDCCH region and R-PDCCH region as a whole. In other words, when the resource amount used is assumed to be constant, more terminals can be accommodated.

Thus, according to the present embodiment, even when DCI for a terminal connected to a base station is mapped onto a PDCCH region and an R-PDCCH region, it is possible to secure desired receiving quality in the terminal without causing system throughput to deteriorate.

Each embodiment of the present invention has been described hereinbefore.

In each embodiment above, the base station and terminal may store allocation patterns (e.g., FIG. 22) of blind decoding region candidates in respective search spaces of the PDCCH region and R-PDCCH region. For example, in the case of search spaces in pattern number 2 shown in FIG. 22, C-SSs of 6 candidates in total; 2 candidates of CCE aggregation level 8 and 4 candidates of CCE aggregation level 4, and UE-SSs of 4 candidates in total; 2 candidates of CCE aggregation level 8 and 2 candidates of CCE aggregation level 4 are configured in the PDCCH region, and UE-SSs of 12 candidates in total; 6 candidates of CCE aggregation level 2 and 6 candidates of CCE aggregation level 1 are configured in the R-PDCCH region. The same applies to search spaces with other pattern numbers shown in FIG. 22. For example, the base station may report pattern numbers shown in FIG. 22 to the terminal depending on the situation (moving speed, position or the like) of each terminal. Alternatively, the base station may select a search space that allows a blocking probability to be reduced every time (e.g., subframe by subframe) and report the selected pattern number to the terminal.

Furthermore, the present invention is not limited to the above embodiments, but may be implemented modified in various ways. For example, the present invention may be implemented by combining the respective embodiments as appropriate depending on the situation of each terminal.

Furthermore, Cell-Radio Network Temporary Identifier (C-RNTI) may also be used for the terminal ID in the above embodiments.

Furthermore, the expression "DCI format common to all the terminals" in the above embodiments may also be read as "DCI format independent of a transmission mode."

Although a case has been described in the above embodiments where DCI 0/1A is used as "DCI format common to all the terminals," the present invention is not limited to this, but any format may be used if it can be used regardless of a transmission mode.

Furthermore, a case has been described in the above embodiments where DCI 0A, 0B, 1, 1B, 1D, 2 or 2A is used as DCI dependent on the transmission mode. However, formats other than DCI 1, 1B, 1D, 2, 2A, 2B, 2C, 0A, 0B and 4 may also be used as DCI dependent on the transmission mode.

Furthermore, consecutive band allocation transmission may also be included as an uplink or downlink transmission mode. For a terminal in which this transmission mode is set, DCI dependent on the transmission mode is DCI 0 (uplink) and DCI 1A (downlink) respectively. In this case, since the DCI format common to all the terminals and the format dependent on the transmission mode are identical, blind decoding may be performed for UE-SSs on one format for the uplink and downlink respectively. One format in total is used in the case of consecutive band allocation for both the uplink and downlink. Thus, configuring DCI 0/1A for DCI dependent on the transmission mode having a wider search space can prevent an increase in the blocking probability for a terminal to which PDCCH can be allocated using only DCI 0/1A because its propagation path situation is originally poor.

Furthermore, CCEs described in the above embodiments are logical resources and when CCEs are disposed in actual physical time/frequency resources, CCEs are disposed distributed over the entire bandwidth within a component band. Furthermore, if only CCEs are divided based on the unit of component band as logical resources, CCEs may be disposed in actual physical time/frequency resources distributed over the entire system band (that is, over all component bands).

Furthermore, the terminal may be called "UE" and the base station may be called "Node B" or "BS (Base Station)." Furthermore, the terminal ID may be called "ID" or "UE-ID."

In the foregoing embodiments, the present invention is configured with hardware by way of example, but the invention may also be provided by software in cooperation with hardware.

The functional blocks used in the description of the embodiments may be typically implemented as an LSI, an integrated circuit. They may be individual chips, or some of or all of them may be integrated into a single chip. "LSI" is used here, but "IC," "system LSI," "super LSI," or "ultra LSI" may also be adopted depending on the degree of integration.

Alternatively, circuit integration may also be implemented using a dedicated circuit or a general processor other than an LSI. After an LSI is manufactured, an FPGA (field programmable gate array) or a reconfigurable processor which enables the reconfiguration of connection and setting of circuit cells in an LSI may be used.

If integrated circuit technology appears to replace LSIs as a result of the advancement of semiconductor technology or other derivative technology, the functional blocks could be integrated using this technology. Biotechnology can also be applied.

The disclosure of the specification, the drawings, and the abstract included in Japanese Patent Application No. 2010-

164307, filed on Jul. 21, 2010, and Japanese Patent Application No. 2011-045088 filed on Mar. 2, 2011, is incorporated herein by reference in its entirety.

INDUSTRIAL APPLICABILITY

The present invention is useful for a mobile communication system.

REFERENCE SIGNS LIST 100 base station
101, 142, 153 configuration section
102 control section
103 search space configuration section
104 PDCCH generating section
105, 107, 109 coding/modulation section
106 allocating section
108 transmission weight configuration section
110 multiplexing section
111, 213 IFFT section
112, 214 CP adding section
113, 215 RF transmitting section
114, 201 antenna
115, 202 RF receiving section
116, 203 CP removing section
117, 204 FFT section
118 extracting section
119 IDFT section
120 data receiving section
121 ACK/NACK receiving section
200 terminal
205 demultiplexing section
206 configuration information receiving section
207 PDCCH receiving section
208 PDSCH receiving section
209, 210 modulation section
211 DFT section
212 mapping section
141 transmission mode decision section
151 transmission format decision section
152 data allocation decision section

The invention claimed is:

1. A communication apparatus comprising:
search space configuration circuitry which, in operation, configures on a single cell, a common search space in a Physical Downlink Control Channel (PDCCH) region of a subframe and configures on the single cell, a user-specific search space in an extended Physical Downlink Control Channel (extended PDCCH) defined within a Physical Downlink Shared Channel (PDSCH) region of the subframe, the common search space including a plurality of first mapping candidates and the user-specific search space including a plurality of second mapping candidates, wherein a number of the second mapping candidates included in the user-specific search space equals to or is more than a number of the first mapping candidates included in the common search space;
a mapper which, in operation, maps first downlink control information to one of the plurality of first mapping candidates in the common search space, and maps second downlink control information to one of the plurality of second mapping candidates in the user-specific search space within the single cell, the first downlink control information being control information that is common to a plurality of terminal apparatuses, and the second downlink control information being control information that is directed to at least one specific terminal apparatus of the plurality of terminal apparatuses; and
a transmitter which, in operation, transmits a control signal including the mapped first downlink control information and the mapped second downlink control information, and transmits search space information over a higher layer, the search space information indicating the user-specific search space configured in the extended PDCCH within the single cell to be decoded by one of the plurality of terminal apparatuses.

2. The communication apparatus according to claim 1, wherein
each of the plurality of first mapping candidates and each of the plurality of second mapping candidates are comprised of one control channel element (CCE) or a plurality of aggregated CCEs;
the number of the first mapping candidates is a sum of numbers of mapping candidates, the numbers respectively corresponding to a plurality of CCE aggregation levels defined in the common search space; and
the number of the second mapping candidates is a sum of numbers of mapping candidates, the numbers respectively corresponding to a plurality of CCE aggregation levels defined in the user-specific search space.

3. The communication apparatus according to claim 1, wherein
the CCE aggregation levels defined in the common search space are four and eight; and
when the CCE aggregation levels is four, the number of mapping candidates is four; and
when the CCE aggregation levels is eight, the number of mapping candidates is two.

4. The communication apparatus according to claim 1, wherein a demodulation reference signal (DM-RS) is mapped as a reference signal to the extended PDCCH.

5. The communication apparatus according to claim 1, wherein the mapper maps a common reference signal (CRS) in the common search space as a reference signal and maps demodulation reference signal (DM-RS) in the user-specific search space as the reference signal.

6. The communication apparatus according to claim 1, wherein each of the plurality of first mapping candidates and each of the plurality of second mapping candidates are decoded at a terminal apparatus, for each of a plurality of DCI formats.

7. The communication apparatus according to claim 1, wherein a temporary cell-radio network temporary identifier (C-RNTI) is applied to the PDCCH region.

8. The communication apparatus according to claim 1, wherein each of the plurality of first mapping candidates included in the common search space and each of the plurality of second mapping candidates included in the user-specific search space that is directed to a terminal apparatus are subjected to a blind decoding by the terminal apparatus by using a same terminal ID of the terminal apparatus itself.

9. A communication method comprising:
configuring on a single cell, a common search space in a Physical Downlink Control Channel (PDCCH) region of a subframe and configuring on the single cell, a user-specific search space in an extended Physical Downlink Control Channel (extended PDCCH) defined within a Physical Downlink Shared Channel (PDSCH) region of the subframe, the common search space including a plurality of first mapping candidates and the user-specific search space including a plurality of second mapping candidates, wherein a number of the second mapping candidates included in the user-specific search space equals to or is more than a number of the first mapping candidates included in the common search space;

mapping first downlink control information to one of the plurality of first mapping candidates in the common search space, and mapping second downlink control information to one of the plurality of second mapping candidates in the user-specific search space within the single cell, the first downlink control information being control information that is common to a plurality of terminal apparatuses, and the second downlink control information being control information that is directed to at least one specific terminal apparatus of the plurality of terminal apparatuses; and transmitting a control signal including the mapped first downlink control information and the mapped second downlink control information, and transmitting search space information over a higher layer, the search space information indicating the user-specific search space configured in the extended PDCCH within the single cell to be decoded by one of the plurality of terminal apparatuses.

10. The communication method according to claim 9, wherein
each of the plurality of first mapping candidates and each of the plurality of second mapping candidates are comprised of one control channel element (CCE) or a plurality of aggregated CCEs;
the number of the first mapping candidates is a sum of numbers of mapping candidates, the numbers respectively corresponding to a plurality of CCE aggregation levels defined in the common search space; and
the number of the second mapping candidates is a sum of numbers of mapping candidates, the numbers respectively corresponding to a plurality of CCE aggregation levels defined in the user-specific search space.

11. The communication method according to claim 9, wherein
the CCE aggregation levels defined in the common search space are four and eight; and
when the CCE aggregation levels is four, the number of mapping candidates is four; and
when the CCE aggregation levels is eight, the number of mapping candidates is two.

12. The communication method according to claim 9, wherein the mapping includes mapping a demodulation reference signal (DM-RS) as a reference signal to the extended PDCCH.

13. The communication method according to claim 9, wherein the mapping includes mapping a common reference signal (CRS) in the common search space as a reference signal and mapping a demodulation reference signal (DM-RS) in the user-specific search space as the reference signal.

14. The communication method according to claim 9, wherein each of the plurality of first mapping candidates and the plurality of second mapping candidates are decoded at a terminal apparatus, for each of a plurality of DCI formats.

15. The communication method according to claim 9, wherein a temporary cell-radio network temporary identifier (C-RNTI) is applied to the PDCCH region.

16. The communication method according to claim 9, wherein each of the plurality of first mapping candidates included in the common search space and each of the plurality of second mapping candidates included in the user-specific search space that is directed to a terminal apparatus are subjected to a blind decoding by the terminal apparatus by using a same terminal ID of the terminal apparatus itself.

* * * * *